(12) United States Patent
Rovira Mas et al.

(10) Patent No.: US 11,751,497 B2
(45) Date of Patent: Sep. 12, 2023

(54) METHOD, SYSTEM AND ROBOT FOR AUTONOMOUS NAVIGATION THEREOF BETWEEN TWO ROWS OF PLANTS

(71) Applicant: UNIVERSITAT POLITECNICA DE VALENCIA, Valencia (ES)

(72) Inventors: Francisco Rovira Mas, Valencia (ES); Andrés Cuenca Cuenca, Valencia (ES); Verónica Saiz Rubio, Valencia (ES)

(73) Assignee: UNIVERSITAT POLITECNICA DE VALENCIA

( * ) Notice: Subject to any disclaimer, the term of this patent is extended or adjusted under 35 U.S.C. 154(b) by 172 days.

(21) Appl. No.: 17/388,169

(22) Filed: Jul. 29, 2021

(65) Prior Publication Data

US 2022/0030759 A1 Feb. 3, 2022

(30) Foreign Application Priority Data

Jul. 31, 2020 (EP) ..................................... 20382716

(51) Int. Cl.
*A01B 69/04* (2006.01)
*B60W 60/00* (2020.01)
(Continued)

(52) U.S. Cl.
CPC ....... *A01B 69/008* (2013.01); *B60W 50/0098* (2013.01); *B60W 60/0025* (2020.02);
(Continued)

(58) Field of Classification Search
CPC ............ A01B 69/008; B60W 50/0098; B60W 60/0025; B60W 2050/0031;
(Continued)

(56) References Cited

U.S. PATENT DOCUMENTS 8,954,193 B2 * 2/2015 Sandin ................. G05D 1/0261
701/28
2004/0264761 A1 * 12/2004 Mas ........................ G06T 7/593
382/154

(Continued)

OTHER PUBLICATIONS

"Center-based clustering for line detection and application to crop rows detection", Vidovic et al., Computers and Electronics in Agriculture 109 (2014) 212-220 (Year: 2014).*

(Continued)

*Primary Examiner* — Peter D Nolan
*Assistant Examiner* — Tanya C Sienko
(74) *Attorney, Agent, or Firm* — Tristan A. Fuierer; Casimir Jones, SC

(57) ABSTRACT

A method, system and robot, wherein the robot includes two or more sensing devices, sensor A and sensor B, mounted thereon and moves forward along an axis parallel to the rows of plants, being autonomously steered by exerting angular corrections to place the robot as close as possible to the centerline between the rows of plants, wherein the method and system includes the following:
(ii) dividing a two-dimensional grid of square cells into groups of cells;
(iii) obtaining data points using sensor A and sensor B;
(vii) moving the robot:
(a) by turning right; or
(b) by turning left; or
(c) forward without turning,
depending on whether each group of cells is calculated as low-activated, high-activated or not activated using the data points.

13 Claims, 17 Drawing Sheets

(51) Int. Cl.
*G06V 20/10* (2022.01)
*B60W 50/00* (2006.01)

(52) U.S. Cl.
CPC ..... *G06V 20/10* (2022.01); *B60W 2050/0031* (2013.01); *B60W 2300/15* (2013.01); *B60W 2420/42* (2013.01); *B60W 2420/50* (2013.01); *B60W 2420/54* (2013.01)

(58) Field of Classification Search
CPC ......... B60W 2300/15; B60W 2420/42; B60W 2420/50; B60W 2420/54; G06V 20/10
See application file for complete search history.

(56) References Cited

U.S. PATENT DOCUMENTS

| | | | |
|---|---|---|---|
| 2013/0325242 A1 | 12/2013 | Cavender-Bares et al. | |
| 2015/0142250 A1 | 5/2015 | Cavender-Bares et al. | |
| 2017/0325444 A1 | 11/2017 | Crinklaw et al. | |
| 2019/0235512 A1* | 8/2019 | Sinyavskiy | G05D 1/0217 |
| 2021/0000006 A1* | 1/2021 | Ellaboudy | G06V 20/56 |
| 2022/0026911 A1* | 1/2022 | Sinyavskiy | G05D 1/0217 |

OTHER PUBLICATIONS

"Automatic detection of crop rows based on multi-ROIs" Jiang et al., Expert Systems with Applications 42 (2015) 2429-2441 (Year: 2015).*
"Recognising plants with ultrasonic sensing for mobile robot navigation", Harper et al., Robotics and Autonomous Systems 34 (2001) 71-82 (Year: 2001).*
"Automatic expert system based on images for accuracy crop row detection in maize fields", Guerrero et al., Expert Systems with Applications 40 (2013) 656-664 (Year: 2013).*
"Path Tracking Control of Field Information-Collecting Robot Based on Improved Convolutional Neural Network Algorithm", Gu et al., Sensors 2020, 20, 797; (Year: 2020).*
"A Novel Autonomous Robot for Greenhouse Applications", Grimstad et al., 2018 IEEE/RSJ International Conference on Intelligent Robots and Systems (IROS) Madrid, Spain, Oct. 1-5, 2018 (Year: 2018).*
"Agricultural Robotics for Field Operations" by Fountas et al., Sensors 2020, 20, 2672; (Year: 2020).*
"Development of Field Furrow Mobile Robot (Moving System on Path for Maintain Environment)" Y.Tanaka et al., Proceedings of IEEE/RSJ International Conference on Intelligent Robots and Systems (IROS '94) IEEE publication 2002 (Year: 2002).*
"Navigation System of the Autonomous Agricultural Robot "BoniRob"", P.Biber et al., accessed via www.cs.cmu.edu/~mbergerm/agrobotics2012/01Biber.pdf (Year: 2012).*
"Agricultural robots for field operations: Concepts and components", A. Bechar et al., Biosystems Engineering 149 (2016) 94-111 (Year: 2016).*
E.J. Van Henten et al., An Autonomous Robot for Harvesting Cucumbers in Greenhouses, Autonomous Robots, 13, 241-258, 2002.
E.J. Van Henten et al., Cropscout—a mini field robot for research on precision agriculture, Proceedings of the 2nd Field Robot Event 2004, Wageningen University, The Netherlands, Jun. 17, 2004, 47-60, XP002528702.
Extended European Search Report for EP 20382716.

* cited by examiner

A.

B.

Control point in the trajectory (points separated about 1 m)

A.

B.

METHOD, SYSTEM AND ROBOT FOR AUTONOMOUS NAVIGATION THEREOF BETWEEN TWO ROWS OF PLANTS

CROSS REFERENCE TO RELATED APPLICATIONS

This application is filed under 35 U.S.C. § 119(a) and claims priority to European Patent Application No. EP20382716, filed 31 Jul. 2020 and entitled "Method, system and robot for autonomous navigation thereof between two rows of plants" in the name of Francisco ROVIRA M A S et al., which is incorporated herein by reference in its entirety.

FIELD OF THE INVENTION

The present invention relates to the field of agricultural robotics, in particular to autonomous navigation of agricultural robots.

BACKGROUND TO THE INVENTION

Autonomous navigation of an orderly array of quasi-parallel rows of plants is an immense challenge because no two rows are equal, and even repeating autonomous navigation of the same rows may pose challenges depending on, for example, the wind, soil conditions, terrain and the ever-changing illumination thereof.

In seeking to provide uniformity, GPS-based autonomous guidance was developed extensively for agricultural equipment operating within commodity crop fields, typically for tractors, harvesters and self-propelled sprayers, when GPS selective availability was cancelled by the US Department of Defense for free civilian use. However, this development did not extend to orchards and groves due to the uncertain GPS signal visibility and multipath errors caused by dense—sometimes tall—canopies.

It is the problem to provide a method or system for autonomous navigation of a robot between two rows of plants which is reliable and functions under ever-changing environmental conditions, without collisions.

BRIEF DESCRIPTION OF THE INVENTION

The present invention relates to a method for autonomous navigation of a robot between two rows of plants spaced Q metres apart, wherein said robot comprises two sensing devices, sensor A and sensor B, mounted at a position O thereon and moves forward along a y-axis being autonomously steered by exerting angular corrections to place the robot as close as possible to the centerline, wherein each sensing device is a device which detects electromagnetic waves or detects sound waves, and wherein when both devices detect:
 (A) electromagnetic waves, sensor A detects said waves at a frequency and/or field-of-view different from that of the waves detected by sensor B; and
 (B) sound waves, sensor A detects said waves at a frequency and/or field-of-view different from that of the waves detected by sensor B, and
 wherein said y-axis is a horizontal axis and a x-axis is a horizontal axis perpendicular to said y-axis,
 and wherein said method comprises the following steps:
 (i) defining a two-dimensional grid of square cells in said plane, wherein said grid is $X_G$ cells in width and $Y_G$ cells in length, and said cells have sides of length c, wherein:
  (a) said width extends horizontally $|X_{min}|$ metres away from O to the left along said x-axis and horizontally $X_{max}$ metres away from O to the right along said x-axis; and
  (b) said length extends horizontally $Y_{max}$ metres away from O along said y-axis; wherein:

$X_{min} = -X_G \cdot c/2;$ $X_{max} = X_G \cdot c/2;$ $Y_{max} = Y_G \cdot c;$ $X_G$ is a whole number selected from between 2 and 1000;
   $Y_G$ is a whole number selected from between 3 and 1500; and
   c is a number selected from between 0.01 and 0.5 m; and
  (c) each cell (h,v) is assigned a coordinate comprising a first number, h, and a second number, v, wherein h is a number from 1 to $X_G$ and v is a number from 1 to $Y_G$, wherein:

$h = h' + 1;$ and $v = v' + 1;$ wherein:
   h' is the number of said cells, counted along said x-axis starting from the left-most cell, which separate said cell (h,v) from the outside of said two-dimensional grid; and
   v' is the number of said cells, counted along said y-axis starting from the cell that is most remote from said robot, which separate said cell (h,v) from the outside of said two-dimensional grid;
 (ii) dividing the two-dimensional grid of square cells into $I_G \cdot J_G$ groups of cells, wherein each group is $X_G/J_G$ cells in width and $Y_G/I_G$ cells in length, wherein:
  (a) $I_G$ is 3;
  (b) $J_G$ is 2; and
  (c) each group of cells (i,j) ($om_{ij}$) is assigned a coordinate comprising a first number, i, and a second number, j, wherein i is a number from 1 to $I_G$ and j is a number from 1 to $J_G$, wherein $i = i' + 1,$ and $j = j' + 1,$ wherein:
   i' is the number of said groups of cells, counted along said y-axis starting from the group of cells that is most remote from said robot, which separate said group of cells from the outside of said two-dimensional grid; and
   j' is the number of said groups of cells, counted along said x-axis starting from the left-most group of cells, which separate said group of cells (i,j) ($om_{ij}$) from the outside of said two-dimensional grid;
 (iii) obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max} - Z_{min}$ metres along a z-axis, wherein said z-axis is a vertical axis perpendicular to said x-axis and said y-axis, and said surface is the surface of an object, wherein:

$Z_{min}$ is a value selected from −0.5 to 0.5 metres;
$Z_{max}$ is a value selected from 1 to 5 metres;
wherein:
  (a) each data point obtained using sensor A is assigned a coordinate comprising a first number, $x^L$, and a second number, $y^L$ wherein:
    $x^L$ is the distance along the x-axis from said data point to O; and
    $y^L$ is the distance along the y-axis from said data point to O, wherein the coordinate of position O is (0,0); and
  (b) each data point obtained using sensor B is assigned a coordinate comprising a first number, $x^V$, and a second number, $y^V$ wherein:
    $x^V$ is the distance along the x-axis from said data point to O; and
    $y^V$ is the distance along the y-axis from said data point to O, wherein the coordinate of position O is (0,0);
(iv) converting each data point into a discretized data point, wherein:
  (a) data point $(x^L, y^L)$ is converted to a discretized data point $(L_V, L_H)$, according to the following formulae:

$L_V = \|y^L/C\|$; and $L_H = \|(x^L - X_{min})/C\|$;

(b) data point $(x^V, y^V)$ is converted to a discretized data point $(V_V, V_H)$ according to the following formulae:

$V_V = \|y^V/C\|$; and $V_H = \|(x^V - X_{min})/C\|$;

(v) calculating a fusion function value, $\Gamma(h,v)$, for each cell $(h,v)$ of said two-dimensional grid according to the following formula (1):

$$\Gamma(h,v) = K_V \gamma^V(V_V, V_H) + K_L \gamma^L(L_V, L_H) \quad (1)$$

wherein:
  $K_L$ is a non-negative integer selected from between 0 and 5;
  $\gamma^L(L_V, L_H)$ is a whole number calculated from a number $D_N(L_H, L_V)$ of discretized data points $(L_V, L_H)$ for which $L_V = v$ and $L_H = h$;
  $K_V$ is a non-negative integer selected from between 0 and 5;
  $\gamma^V(V_V, V_H)$ is a whole number calculated from a number $D_N(V_H, V_V)$ of discretized data points $(V_V, V_H)$ for which $V_V = v$ and $V_H = h$;
(vi) calculating for each group of cells (i,j) ($om_{ij}$):
  (a) the cumulative total of fusion function values, $CUM_{ij}(h)$, of all cells in said group of cells which have a coordinate with the same h value; and
  (b) the sum of all cumulative totals of fusion function values, $SUM_{ij}$, in said group of cells; wherein when:
    $SUM_{ij} \geq \|0.4 \cdot \overline{OM}\|$ said group of cells is classified as high-activated; and
    $SUM_{ij} \geq \|0.2 \cdot \overline{OM}\|$ and $< \|0.4 \cdot \overline{OM}\|$ said sub-volume is classified as low-activated,
    wherein OM is the maximum $SUM_{ij}$ value determined for any group of cells (i,j) ($om_{ij}$) in said two-dimensional grid;
wherein
(vii) the robot moves:
  (a) through a plane defined by said y-axis and said x-axis towards a target point $P_t$ placed ahead of the robot, on the centerline parallel to a detected left row and separated from it by a distance Q/2:
    when out of the set $S_R$ consisting of the groups of cells (1,1), (2,1), (3,1) and (1,2):
      $om_{11}$ is high-activated, or
      $om_{11}$ is high-activated and $om_{21}$ is low-activated, or
      $om_{11}$ is low-activated and $om_{21}$ is high-activated, or
      $om_{21}$ is low-activated, or
      $om_{21}$ is low-activated and $om_{31}$ is low-activated, or
      $om_{31}$ is low-activated, or
      $om_{21}$ is low-activated and $om_{21}$ is high-activated,
      and no other group of cells in said set $S_R$ or the groups of cells (2,2) or (3,2) is activated; or
  (b) through a plane defined by said y-axis and said x-axis towards a target point $P_t$ placed ahead of the robot, on the centerline parallel to a detected right row and separated from it by a distance Q/2:
    when out of the set $S_L$ consisting of the groups of cells (1,2), (2,2), (3,2) and (1,1):
      $om_{12}$ is high-activated, or
      $om_{12}$ is high-activated and $om_{22}$ is low-activated, or
      $om_{12}$ is low-activated and $om_{22}$ is high-activated, or
      $om_{22}$ is low-activated, or
      $om_{22}$ is low-activated and $om_{32}$ is low-activated, or
      $om_{32}$ is low-activated, or
      $om_{11}$ is low-activated and $om_{22}$ is high-activated,
      and no other group of cells in said set $S_L$ or the groups of cells (2,1) or (3,1) is activated; or
  (c) through a plane defined by said y-axis and said x-axis towards a target point $P_t$ placed ahead of the robot, on the centerline equidistant to both detected rows:
    when out of the set $S_R$ consisting of the groups of cells (1,1), (2,1), (3,1) and (1,2):
      $om_{11}$ is high-activated, or
      $om_{11}$ is high-activated and $om_{21}$ is low-activated, or
      $om_{11}$ is low-activated and $om_{21}$ is high-activated, or
      $om_{21}$ is low-activated, or
      $om_{21}$ is low-activated and $om_{31}$ is low-activated, or
      $om_{31}$ is low-activated, or
      $om_{12}$ is low-activated and $om_{21}$ is high-activated,
      and no other group of cells in said set $S_R$ or the groups of cells (2,2) or (3,2) is activated; and
    when out of the set $S_L$ consisting of the groups of cells (1,2), (2,2), (3,2) and (1,1):
      $om_{12}$ is high-activated, or
      $om_{12}$ is high-activated and $om_{22}$ is low-activated, or
      $om_{12}$ is low-activated and $om_{22}$ is high-activated, or
      $om_{22}$ is low-activated, or
      $om_{22}$ is low-activated and $om_{32}$ is low-activated, or
      $om_{32}$ is low-activated, or
      $om_{11}$ is low-activated, $om_{22}$ is high-activated,
      and no other group of cells in said set $S_L$ or the groups of cells (2,1) or (3,1) is activated.

In addition, the present invention relates to a system for autonomous navigation of a robot between two rows of plants spaced Q metres apart, wherein said robot comprises two sensing devices, sensor A and a sensor B, mounted at a position O thereon and moves forward along a y-axis being autonomously steered by exerting angular corrections to place the robot as close as possible to the centerline, wherein each sensing device is a device which detects electromagnetic waves or detects sound waves, and wherein when both devices detect:
(A) electromagnetic waves, sensor A detects said waves at a frequency and/or field-of-view different from that of the waves detected by sensor B; and
(B) sound waves, sensor A detects said waves at a frequency and/or field-of-view different from that of the waves detected by sensor B, and wherein said y-axis is a horizontal axis and said x-axis is a horizontal axis perpendicular to said y-axis, and wherein said system comprises the following:
(i) means for defining a two-dimensional grid of square cells in said plane, wherein said grid is $X_G$ cells in width and $Y_G$ cells in length, and said cells have sides of length c, wherein:
(a) said width extends horizontally $|X_{min}|$ metres away from O to the left along said x-axis and horizontally $X_{max}$ metres away from O to the right along said x-axis; and
(b) said length extends horizontally $Y_{max}$ metres away from O along said y-axis; wherein:

$X_{min} = -X_G \cdot c/2$;

$X_{max} = X_G \cdot c/2$;

$Y_{max} = Y_G \cdot c$ $X_G$ is a whole number selected from between 2 and 1000
$Y_G$ is a whole number selected from between 3 and 1500; and
c is a number selected from between 0.01 and 0.5 m, and
(c) each cell (h,v) is assigned a coordinate comprising a first number, h, and a second number, v, wherein h is a number from 1 to $X_G$ and v is a number from 1 to $Y_G$, wherein:

$h = h' + 1$; and $v = v' + 1$;

wherein:
h' is the number of said cells, counted along said x-axis starting from the left-most cell, which separate said cell (h,v) from the outside of said two-dimensional grid; and
v' is the number of said cells, counted along said y-axis starting from the cell that is most remote from said robot, which separate said cell (h,v) from the outside of said two-dimensional grid;
(ii) means for dividing the two-dimensional grid of square cells into six groups of cells, wherein each group is $X_G/J_G$ cells in width and $Y_G/I_G$ cells in length, wherein:
(a) $I_G$ is 3;
(b) $J_G$ is 2; and
(c) each group of cells (i,j) ($om_{ij}$) is assigned a coordinate comprising a first number, i, and a second number, j, wherein i is a number from 1 to $I_G$ and j is a number from 1 to $J_G$, wherein $i = i' + 1$, and $j = j' + 1$, wherein:
i' is the number of said groups of cells, counted along said y-axis starting from the groups of cell that is most remote from said robot, which separate said group of cells from the outside of said two-dimensional grid; and
j' is the number of said groups of cells, counted along said x-axis starting from the left-most group of cells, which separate said group of cells (i,j) ($om_{ij}$) from the outside of said two-dimensional grid;
(iii) means for obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max} - Z_{min}$ metres along a z-axis, wherein said z-axis is a vertical axis perpendicular to said x-axis and said y-axis, and said surface is the surface of an object, wherein:
$Z_{min}$ is a value selected from -0.5 to 0.5 metres;
$Z_{max}$ is a value selected from 1 to 5 metres;
wherein:
(a) each data point obtained using sensor A is assigned a coordinate comprising a first number, $x^L$, and a second number, $y^L$ wherein:
$x^L$ is the distance along the x-axis from said data point to O; and
$y^L$ is the distance along the y-axis from said data point to O, wherein the coordinate of position O is (0,0); and
(b) each data point obtained using sensor B is assigned a coordinate comprising a first number, $x^V$, and a second number, $y^V$ wherein:
$x^V$ is the distance along the x-axis from said data point to O; and
$y^V$ is the distance along the y-axis from said data point to O, wherein the coordinate of position O is (0,0);
(iv) means for converting each data point into a discretized data point, wherein:
(a) data point ($x^L, y^L$) is converted to a discretized data point ($L_V, L_H$), according to the following formulae:

$L_V = \|y^L/C\|$; and $L_H = \|(x^L - X_{min})/C\|$, (b) data point ($x^V, y^V$) is converted to a discretized data point ($V_V, V_H$) according to the following formulae:

$V_V = \|y^V/C\|$; and $V_H = \|(x^V - X_{min})/C\|$;

(v) means for calculating a fusion function value, $\Gamma(h,v)$, for each cell (h,v) of said two-dimensional grid according to the following formula (1):

$$\Gamma(h,v) = K_V \cdot \gamma^V(V_V, V_H) + K_L \cdot \gamma^L(L_V, L_H) \quad (1)$$

wherein:
$K_L$ is a non-negative integer selected from between 0 and 5;
$\gamma^L(L_V, L_H)$ is a whole number calculated from the number $D_N(L_H, L_V)$ of discretized data points ($L_V, L_H$) for which $L_V = v$ and $L_H = h$;
$K_V$ is a non-negative integer selected from between 0 and 5;

$\gamma^V(V_V,V_H)$ is a whole number calculated from the number $D_N(V_H,V_V)$ of discretized data points $(V_V, V_H)$ for which $V_V=v$ and $V_H=h$;

(vi) means for calculating for each group of cells (i,j) ($om_{ij}$):
  (a) the cumulative total of fusion function values, $CUM_{ij}(h)$, of all cells in said group of cells which have a coordinate with the same h value; and
  (b) the sum of all cumulative totals of fusion function values, $SUM_{ij}$, in said group of cells; wherein when:
    $SUM_{ij} \geq \|0.4 \cdot \overline{OM}\|$ said group of cells is classified as high-activated; and
    $SUM_{ij} \geq \|0.2 \cdot \overline{OM}\|$ and $< \|0.4 \cdot \overline{OM}\|$ said sub-volume is classified as low-activated,
  wherein OM is the maximum $SUM_{ij}$ value determined for any group of cells (i,j) ($om_{ij}$) in said two-dimensional grid;

(vii) means for moving the robot, wherein the robot moves:
  (a) through a plane defined by said y-axis and said x-axis towards a target point $P_t$ placed ahead of the robot, on the centerline parallel to the detected left row and separated from it by a distance Q/2:
    when out of the set $S_R$ consisting of the groups of cells (1,1), (2,1), (3,1) and (1,2):
      $om_{11}$ is high-activated, or
      $om_{11}$ is high-activated and $om_{21}$ is low-activated, or
      $om_{11}$ is low-activated and $om_{21}$ is high-activated, or
      $om_{21}$ is low-activated, or
      $om_{21}$ is low-activated and $om_{31}$ is low-activated, or
      $om_{31}$ is low-activated, or
      $om_{12}$ is low-activated and $om_{21}$ is high-activated,
    and no other group of cells in said set $S_R$ or the groups of cells (2,2) or (3,2) is activated; or (b) through a plane defined by said y-axis and said x-axis towards a target point $P_t$ placed ahead of the robot, on the centerline parallel to the detected right row and separated from it by a distance Q/2:
    when out of the set $S_L$ consisting of the groups of cells (1,2), (2,2), (3,2) and (1,1):
      $om_{12}$ is high-activated, or
      $om_{12}$ is high-activated and $om_{22}$ is low-activated, or
      $om_{12}$ is low-activated and $om_{22}$ is high-activated, or
      $om_{22}$ is low-activated, or
      $om_{22}$ is low-activated and $om_{32}$ is low-activated, or
      $om_{32}$ is low-activated, or
      $om_{11}$ is low-activated and $om_{22}$ is high-activated,
    and no other group of cells in said set $S_L$ or the groups of cells (2,1) or (3,1) is activated; or (c) through a plane defined by said y-axis and said x-axis towards a target point $P_t$ placed ahead of the robot, on the centerline equidistant to both detected rows:
    when out of the set $S_R$ consisting of the groups of cells (1,1), (2,1), (3,1) and (1,2):
      $om_{11}$ is high-activated, or
      $om_{11}$ is high-activated and $om_{21}$ is low-activated, or
      $om_{11}$ is low-activated and $om_{21}$ is high-activated, or
      $om_{21}$ is low-activated, or
      $om_{21}$ is low-activated and $om_{31}$ is low-activated, or
      $om_{31}$ is low-activated, or
      $om_{12}$ is low-activated and $om_{21}$ is high-activated,
    and no other group of cells in said set $S_R$ or the groups of cells (2,2) or (3,2) is activated; and when out of the set $S_L$ consisting of the groups of cells (1,2), (2,2), (3,2) and (1,1):
      $om_{12}$ is high-activated, or
      $om_{12}$ is high-activated and $om_{22}$ is low-activated, or
      $om_{12}$ is low-activated and $om_{22}$ is high-activated, or
      $om_{22}$ is low-activated, or
      $om_{22}$ is low-activated and $om_{32}$ is low-activated, or
      $om_{32}$ is low-activated, or
      $om_{11}$ is low-activated, $om_{22}$ is high-activated,
    and no other group of cells in said set $S_L$ or the groups of cells (2,1) or (3,1) is activated.

Moreover, the present invention relates to a robot, wherein said robot uses the method according to the present invention for navigating between two rows of plants and/or comprises the system according to the present invention.

Furthermore, the present invention relates to a method for autonomous navigation of a robot between two rows of plants spaced Q metres apart, wherein said robot comprises two sensing devices, sensor A and sensor B, mounted at a position O thereon and moves forward along a y-axis being autonomously steered by exerting angular corrections to place the robot as close as possible to the centerline, wherein each sensing device is a device which detects electromagnetic waves or detects sound waves, and wherein sensor A is a multi-beam lidar and sensor B is a stereoscopic or time-of-flight 3D camera, and wherein said y-axis is a horizontal axis and said x-axis is a horizontal axis perpendicular to said y-axis, and wherein said method comprises the following steps:

(i) defining a two-dimensional grid of square cells in said plane, wherein said grid is $X_G$ cells in width and $Y_G$ cells in length, and said cells have sides of length c, wherein:
  (a) said width extends horizontally $|X_{min}|$ metres away from O to the left along said x-axis and horizontally $X_{max}$ metres away from O to the right along said x-axis; and
  (b) said length extends horizontally $Y_{max}$ metres away from O along said y-axis; wherein:

$$X_{min} = -X_G \cdot c/2;$$

$$X_{max} = X_G \cdot c/2;$$

$$Y_{max} = Y_G \cdot c$$

$X_G$ is a whole number selected from between 30 and 60;
$Y_G$ is a whole number selected from between 60 and 100; and
c is a number selected from between 0.05 and 0.2 m; and (c) each cell (h,v) is assigned a coordinate comprising a first number, h, and a second number, v, wherein h is a number from 1 to $X_G$ and v is a number from 1 to $Y_G$, wherein:

$$h = h'+1; \text{ and}$$

$$v = v'+1;$$

wherein:
h' is the number of said cells, counted along said x-axis starting from the left-most cell, which separate said cell (h,v) from the outside of said two-dimensional grid; and v' is the number of said cells, counted along said y-axis starting from the cell that is most remote from said robot, which separate said cell (h,v) from the outside of said two-dimensional grid;

(ii) dividing the two-dimensional grid of square cells into $I_G \cdot J_G$ groups of cells, wherein each group is $X_G/J_G$ cells in width and $Y_G/I_G$ cells in length, wherein:
(a) $I_G$ is 3;
(b) $J_G$ is 2; and
(c) each group of cells (i,j) ($om_{ij}$) is assigned a coordinate comprising a first number, i, and a second number, j, wherein i is a number from 1 to $I_G$ and j is a number from 1 to $J_G$, wherein $$i = i' + 1, \text{and}$$

$$j = j' + 1,$$

wherein:
i' is the number of said groups of cells, counted along said y-axis starting from the group of cells that is most remote from said robot, which separate said group of cells from the outside of said two-dimensional grid; and j' is the number of said groups of cells, counted along said x-axis starting from the left-most group of cells, which separate said group of cells (i,j) ($om_{ij}$) from the outside of said two-dimensional grid;

(iii) obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max} - Z_{min}$ metres along a z-axis, wherein said z-axis is a vertical axis perpendicular to said x-axis and said y-axis, and said surface is the surface of an object, wherein:

$Z_{min}$ is a value selected from −0.5 to 0.5 metres;
$Z_{max}$ is a value selected from 1 to 5 metres;
wherein:
(a) each data point obtained using sensor A is assigned a coordinate comprising a first number, $x^L$, and a second number, $y^L$, wherein:
$x^L$ is the distance along the x-axis from said data point to O; and
$y^L$ is the distance along the y-axis from said data point to O, wherein the coordinate of position O is (0,0); and
(b) each data point obtained using sensor B is assigned a coordinate comprising a first number, $x^V$, and a second number, $y^V$ wherein:
$x^V$ is the distance along the x-axis from said data point to O; and
$y^V$ is the distance along the y-axis from said data point to O,
wherein the coordinate of position O is (0,0);
(iv) converting each data point into a discretized data point, wherein:

(a) data point $(x^L, y^L)$ is converted to a discretized data point $(L_V, L_H)$, according to the following formulae:
$$L_V = \|y^L / C\|; \text{ and}$$
$$L_H = \|(x^L - X_{min})/C\|,$$

(b) data point $(x^V, y^V)$ is converted to a discretized data point $(V_V, V_H)$ according to the following formulae:
$$V_V = \|y^V / C\|; \text{ and}$$
$$V_H = \|(x^V - X_{min})/C\|;$$

(v) calculating a fusion function value, $\Gamma(h,v)$, for each cell (h,v) of said two-dimensional grid according to the following formula (1):

$$\Gamma(h,v) = K_V \cdot \gamma^V(V_V, V_H) + K_L \cdot \gamma^L(L_V, L_H) \quad (1)$$

wherein:
$K_L$ is a non-negative integer selected from between 0 and 5;
$\gamma^L(L_V, L_H)$ is the whole number $D_N(L_H, L_V)$ of discretized data points $(L_V, L_H)$ for which $L_V = v$ and $L_H = h$;
$K_V$ is a non-negative integer selected from between 0 and 5;
$\gamma^V(V_V, V_H)$ is:
1 when $D_N(V_H, V_V) > TH_V \cdot D_N(V_H, V_V)max$; or
0 when $D_N(V_H, V_V) \leq TH_V \cdot D_N(V_H, V_V)max$
wherein $D_N(V_H, V_V)$ is:
the whole number of discretized data points $(V_V, V_H)$ when $V_{V \cdot C} \leq 3$; or
a whole number calculated from the number of discretized data points $(V_V, V_H)$ for which $V_V = v$, $V_H = h$ and $V_{V \cdot C} > 3$, multiplied by $(V_{V \cdot C}/3)^2$;
and wherein:
$TH_V$ is a threshold value, wherein $0 \leq TH_V \leq 1$; and
$D_N(V_H, V_V)max$ is the maximum value of $D_N(V_H, V_V)$ determined for any cell (h,v) in said two-dimensional grid;

(vi) calculating for each group of cells (i,j) ($om_{ij}$):
(a) the cumulative total of fusion function values, $CUM_{ij}(h)$, of all cells in said group of cells which have a coordinate with the same h value; and
(b) the sum of all cumulative totals of fusion function values, $SUM_{ij}$, in said group of cells; and
(c) when $SUM_{ij} \geq 1$, an expected row position value, $L_{ij}$, according to the following formula (2):

$$L_{ij} = \|X_G/J_G - M_{ij}/SUM_{ij}\| \quad (2)$$

wherein $M_{ij}$, is the sum of t values of all cells in said group of cells which have a coordinate with the same h value, wherein said t values are calculated according to the following formula (3):

$$t = (\|X_G/J_G\| - h) \cdot CUM_{ij}(h) \quad (3)$$

wherein when:
$SUM_{ij} \geq \|0.4 \cdot \overline{OM}\|$ said group of cells is classified as high-activated; and
$SUM_{ij} \geq \|0.2 \cdot \overline{OM}\|$ and $< \|0.4 \cdot \overline{OM}\|$ said sub-volume is classified as low-activated,
wherein $\overline{OM}$ is the maximum $SUM_{ij}$ value determined for any group of cells (i,j) ($om_{ij}$) in said two-dimensional grid;
wherein
(vii) the robot moves:
(a) through a plane defined by said y-axis and said x-axis:
when out of the set $S_R$ consisting of the groups of cells (1,1), (2,1), (3,1) and (1,2):
$om_{11}$ is high-activated, or $om_{11}$ is high-activated and $om_{21}$ is low-activated, or $om_{11}$ is low-activated and $om_{21}$ is high-activated, or $om_{21}$ is low-activated, or $om_{21}$ is low-activated and $om_{31}$ is low-activated, or $om_{31}$ is low-activated, or $om_{12}$ is low-activated and $om_{21}$ is high-activated, and no other group of cells in said set $S_R$ or the groups of cells (2,2) or (3,2) is activated; or (b) through a plane defined by said y-axis and said x-axis:

when out of the set $S_L$ consisting of the groups of cells (1,2), (2,2), (3,2) and (1,1):

$om_{12}$ is high-activated, or $om_{12}$ is high-activated and $om_{22}$ is low-activated, or $om_{12}$ is low-activated and $om_{22}$ is high-activated, or $om_{22}$ is low-activated, or $om_{22}$ is low-activated and $om_{32}$ is low-activated, or $om_{32}$ is low-activated, or $om_{11}$ is low-activated and $om_{22}$ is high-activated, and no other group of cells in said set $S_L$ or the groups of cells (2,1) or (3,1) is activated; or (c) through a plane defined by said y-axis and said x-axis:

when out of the set $S_R$ consisting of the groups of cells (1,1), (2,1), (3,1) and (1,2):

$om_{11}$ is high-activated, or $om_{11}$ is high-activated and $om_{21}$ is low-activated, or $om_{11}$ is low-activated and $om_{21}$ is high-activated, or $om_{21}$ is low-activated, or $om_{21}$ is low-activated and $om_{31}$ is low-activated, or $om_{31}$ is low-activated, or $om_{12}$ is low-activated and $om_{21}$ is high-activated, and no other group of cells in said set $S_R$ or the groups of cells (2,2) or (3,2) is activated; and when out of the set $S_L$ consisting of the groups of cells (1,2), (2,2), (3,2) and (1,1):

$om_{12}$ is high-activated, or $om_{12}$ is high-activated and $om_{22}$ is low-activated, or $om_{12}$ is low-activated and $om_{22}$ is high-activated, or $om_{22}$ is low-activated, or $om_{22}$ is low-activated and $om_{32}$ is low-activated, or $om_{32}$ is low-activated, or $om_{11}$ is low-activated, $om_{22}$ is high-activated, and no other group of cells in said set $S_L$ or the groups of cells (2,1) or (3,1) is activated, wherein:

(a) when the robot moves through a plane defined by said y-axis and said x-axis by turning towards the target point $P_t$ which is Q/2 metres to the right of row boundary $RB_L$ at a distance of $Y_{max} \cdot r$ metres from O, wherein:

$RB_L$ is the weighted average $L_{ij}$ of the groups of cells (i,j) which have a coordinate with the j value of 1; and r is between 0.5 and 0.9;

(b) when the robot moves through a plane defined by said y-axis and said x-axis by turning towards the target point $P_t$ which is Q/2 metres to the left of row boundary $RB_R$ at a distance of $Y_{max} \cdot r$ metres from O, wherein:

$RB_R$ is the weighted average $L_{ij}$ of the groups of cells (i,j) which have a coordinate with the j value of 2;

(c) when the robot moves through a plane defined by said y-axis and said x-axis by turning towards the target point $P_t$ which is placed equidistant between $RB_L$ and $RB_R$.

Likewise, the present invention also relates to a system for autonomous navigation of a robot between two rows of plants spaced Q metres apart, wherein said robot comprises two sensing devices, sensor A and sensor B, mounted at a position O thereon and moves forward along a y-axis being autonomously steered by exerting angular corrections to place the robot as close as possible to the centerline, wherein each sensing device is a device which detects electromagnetic waves or detects sound waves, and wherein sensor A is a multi-beam lidar and sensor B is a stereoscopic or time-of-flight 3D camera, and wherein said y-axis is a horizontal axis and said x-axis is a horizontal axis perpendicular to said y-axis, and wherein said system comprises the following:

(i) means for defining a two-dimensional grid of square cells in said plane, wherein said grid is $X_G$ cells in width and $Y_G$ cells in length, and said cells have sides of length c, wherein:

(a) said width extends horizontally $|X_{min}|$ metres away from O to the left along said x-axis and horizontally $X_{max}$ metres away from O to the right along said x-axis; and (b) said length extends horizontally $Y_{max}$ metres away from O along said y-axis; wherein:

$X_{min} = -X_G \cdot c/2$;

$X_{max} = X_G \cdot c/2$;

$Y_{max} = Y_G \cdot c$;

$X_G$ is a whole number selected from between 30 and 60;

$Y_G$ is a whole number selected from between 60 and 100; and c is a number selected from between 0.05 and 0.2 m; and (c) each cell (h,v) is assigned a coordinate comprising a first number, h, and a second number, v, wherein h is a number from 1 to $X_G$ and v is a number from 1 to $Y_G$, wherein:

$h = h'+1$; and $v = v'+1$;

wherein:

h' is the number of said cells, counted along said x-axis starting from the left-most cell, which separate said cell (h,v) from the outside of said two-dimensional grid; and v' is the number of said cells, counted along said y-axis starting from the cell that is most remote from said robot, which separate said cell (h,v) from the outside of said two-dimensional grid;

(ii) means for dividing the two-dimensional grid of square cells into $I_G \cdot J_G$ groups of cells, wherein each group is $X_G/J_G$ cells in width and $Y_G/I_G$ cells in length, wherein:

(a) $I_G$ is 3;

(b) $J_G$ is 2; and (c) each group of cells (i,j) ($om_{ij}$) is assigned a coordinate comprising a first number, i, and a second number, j, wherein i is a number from 1 to $I_G$ and j is a number from 1 to $J_G$, wherein $$i=i'+1, \text{and}$$

$$j=j'+1,$$

wherein:
- i' is the number of said groups of cells, counted along said y-axis starting from the group of cells that is most remote from said robot, which separate said group of cells from the outside of said two-dimensional grid; and
- j' is the number of said groups of cells, counted along said x-axis starting from the left-most group of cells, which separate said group of cells (i,j) ($om_{ij}$) from the outside of said two-dimensional grid;

(iii) means for obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max}-Z_{min}$ metres along a z-axis, wherein said z-axis is a vertical axis perpendicular to said x-axis and said y-axis, and said surface is the surface of an object, wherein:
- $Z_{min}$ is a value selected from −0.5 to 0.5 metres;
- $Z_{max}$ is a value selected from 1 to 5 metres;

wherein:
(a) each data point obtained using sensor A is assigned a coordinate comprising a first number, $x^L$, and a second number, $y^L$ wherein:
- $x^L$ is the distance along the x-axis from said data point to O; and
- $y^L$ is the distance along the y-axis from said data point to O, wherein the coordinate of position O is (0,0); and (b) each data point obtained using sensor B is assigned a coordinate comprising a first number, $x^V$, and a second number, $y^V$ wherein:
- $x^V$ is the distance along the x-axis from said data point to O; and
- $y^V$ is the distance along the y-axis from said data point to O, wherein the coordinate of position O is (0,0);

(iv) means for converting each data point into a discretized data point, wherein:
(a) data point ($x^L,y^L$) is converted to a discretized data point ($L_V,L_H$), according to the following formulae:

$$L_V = \|y^L/C\|; \text{ and}$$

$$L_H = \|(x^L - X_{min})/C\|;$$

(b) data point ($x^V,y^V$) is converted to a discretized data point ($V_V,V_H$) according to the following formulae:

$$V_V = \|y^V/C\|; \text{ and}$$

$$V_H = \|(x^V - X_{min})/C\|;$$

(v) means for calculating a fusion function value, $\Gamma(h,v)$, for each cell (h,v) of said two-dimensional grid according to the following formula (1):

$$\Gamma(h,v) = K_V \gamma^V(V_V,V_H) + K_L \gamma^L(L_V,L_H) \quad (1)$$

wherein:
- $K_L$ is a non-negative integer selected from between 0 and 5;
- $\gamma^L(L_V,L_H)$ is the whole number $D_N(L_H,L_V)$ of discretized data points ($L_V,L_H$) for which $L_V$=v and $L_H$=h;
- $K_V$ is a non-negative integer selected from between 0 and 5;
- $\gamma^V(V_V,V_H)$ is:
  1 when $D_N(V_H,V_V) > TH_V \cdot D_N(V_H,V_V)$max; or
  0 when $D_N(V_H,V_V) \leq TH_V \cdot D_N(V_H,V_V)$max
  wherein $D_N(V_H,V_V)$ is:
  - the whole number of discretized data points ($V_V,V_H$) when $V_{V-C} \leq 3$; or
  - a whole number calculated from the number of discretized data points ($V_V,V_H$) for which $V_V$=v, $V_H$=h and $V_{V-C}>3$, multiplied by $(V_{V-C}/3)^2$;

and wherein:
- $TH_V$ is a threshold value, wherein $0 \leq TH_V \leq 1$; and
- $D_N(V_H,V_V)$max is the maximum value of $D_N(V_H,V_V)$ determined for any cell (h,v) in said two-dimensional grid;

(vi) means for calculating for each group of cells (i,j) ($om_{ij}$):
(a) the cumulative total of fusion function values, $CUM_{ij}(h)$, of all cells in said group of cells which have a coordinate with the same h value; and
(b) the sum of all cumulative totals of fusion function values, $SUM_{ij}$, in said group of cells; and
(c) when $SUM_{ij} \geq 1$, an expected row position value, $L_{ij}$, according to the following formula (2):

$$L_{ij} = \|X_G/J_G - M_{ij}/SUM_{ij}\| \quad (2)$$

wherein $M_{ij}$ is the sum of t values of all cells in said group of cells which have a coordinate with the same h value, wherein said t values are calculated according to the following formula (3):

$$t = (\|X_G/J_G\| - h) \cdot CUM_{ij}(h) \quad (3)$$

wherein when:
- $SUM_{ij} \geq \|0.4 \cdot \overline{OM}\|$ said group of cells is classified as high-activated; and
- $SUM_{ij} \geq \|0.2 \cdot \overline{OM}\|$ and $< \|0.4 \cdot \overline{OM}\|$ said sub-volume is classified as low-activated, wherein OM is the maximum $SUM_{ij}$ value determined for any group of cells (i,j) ($om_{ij}$) in said two-dimensional grid;

wherein
(vii) means for classifying the perceptual situation that will set the right calculation parameters for moving the robot, wherein the robot moves:
(a) through a plane defined by said y-axis and said x-axis:
when out of the set $S_R$ consisting of the groups of cells (1,1), (2,1), (3,1) and (1,2):
- $om_{11}$ is high-activated, or
- $om_{11}$ is high-activated and $om_{21}$ is low-activated, or
- $om_{11}$ is low-activated and $om_{21}$ is high-activated, or
- $om_{21}$ is low-activated, or
- $om_{21}$ is low-activated and $om_{31}$ is low-activated, or
- $om_{31}$ is low-activated, or
- $om_{12}$ is low-activated and $om_{21}$ is high-activated,
and no other group of cells in said set $S_R$ or the groups of cells (2,2) or (3,2) is activated; or (b) through a plane defined by said y-axis and said x-axis:
when out of the set $S_L$ consisting of the groups of cells (1,2), (2,2), (3,2) and (1,1):
$om_{12}$ is high-activated, or
$om_{12}$ is high-activated and $om_{22}$ is low-activated, or
$om_{12}$ is low-activated and $om_{22}$ is high-activated, or
$om_{22}$ is low-activated, or
$om_{22}$ is low-activated and $om_{32}$ is low-activated, or
$om_{32}$ is low-activated, or
$om_{11}$ is low-activated and $om_{22}$ is high-activated,
and no other group of cells in said set $S_L$ or the groups of cells (2,1) or (3,1) is activated; or
(c) through a plane defined by said y-axis and said x-axis:
when out of the set $S_R$ consisting of the groups of cells (1,1), (2,1), (3,1) and (1,2):
$om_{11}$ is high-activated, or
$om_{11}$ is high-activated and $om_{21}$ is low-activated, or
$om_{11}$ is low-activated and $om_{21}$ is high-activated, or
$om_{21}$ is low-activated, or
$om_{21}$ is low-activated and $om_{31}$ is low-activated, or
$om_{31}$ is low-activated, or
$om_{12}$ is low-activated and $om_{21}$ is high-activated,
and no other group of cells in said set $S_R$ or the groups of cells (2,2) or (3,2) is activated; and
when out of the set $S_L$ consisting of the groups of cells (1,2), (2,2), (3,2) and (1,1):
$om_{12}$ is high-activated, or
$om_{12}$ is high-activated and $om_{22}$ is low-activated, or
$om_{12}$ is low-activated and $om_{22}$ is high-activated, or
$om_{22}$ is low-activated, or
$om_{22}$ is low-activated and $om_{32}$ is low-activated, or
$om_{32}$ is low-activated, or
$om_{11}$ is low-activated, $om_{22}$ is high-activated,
and no other group of cells in said set $S_L$ or the groups of cells (2,1) or (3,1) is activated,
wherein:
(a) when the robot moves through a plane defined by said y-axis and said x-axis by turning towards the target point $P_t$ which is Q/2 metres to the right of row boundary $RB_L$ at a distance of $Y_{max} \cdot r$ metres from O, wherein:
$RB_L$ is the weighted average $L_{ij}$ of the groups of cells (i,j) which have a coordinate with the j value of 1; and
r is between 0.5 and 0.9;
(b) when the robot moves through a plane defined by said y-axis and said x-axis by turning towards the target point $P_t$ which is Q/2 metres to the left of row boundary $RB_R$ at a distance of $Y_{max} \cdot r$ metres from O, wherein:
$RB_R$ is the weighted average $L_{ij}$ of the groups of cells (i,j) which have a coordinate with the j value of 2;
(c) when the robot moves through a plane defined by said y-axis and said x-axis by turning towards the target point $P_t$ which is placed equidistant between $RB_L$ and $RB_R$.

DETAILED DESCRIPTION OF THE INVENTION

Figure 1:
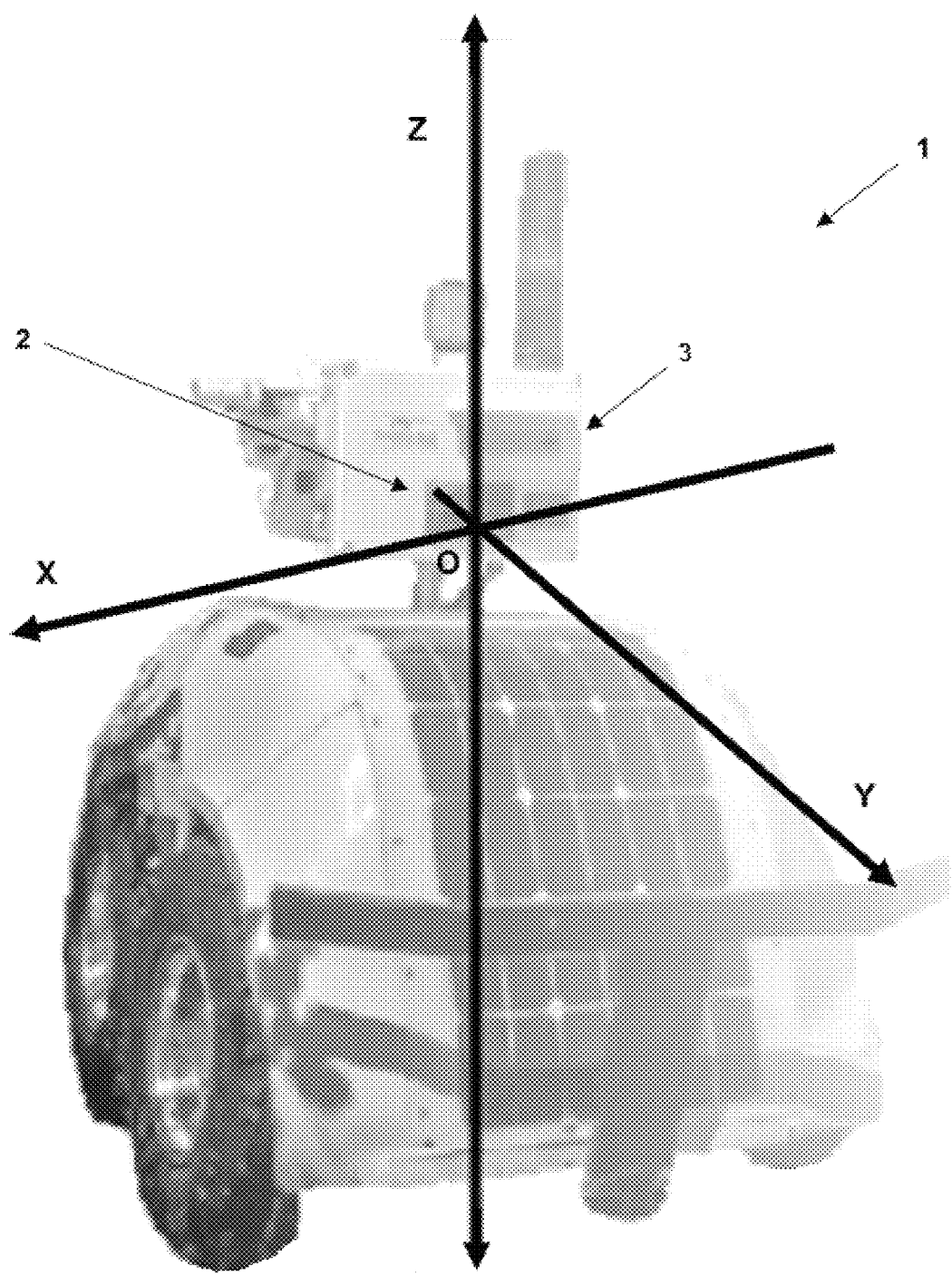
FIG. 1. Perspective view of an exemplified embodiment of the robot (1) for autonomous navigation between two rows of plants comprising sensor A (2) and sensor B (3), showing the x-axis, y-axis and z-axis, as well as position O, wherein the portion of each axis which comprises an arrow is represented by a positive coordinate.

The present invention relates to a method for autonomous navigation of a robot between two rows of plants. In addition, the present invention relates to a system for autonomous navigation of a robot between two rows of plants. Autonomous navigation of a robot between two rows of plants refers to navigation of said robot between said rows of plants without external control, in particular without direct human control. In other words, said autonomous navigation is performed by said robot based on movements it makes which guide it between said rows of plants in response to signals it detects using its sensors.

Said rows of plants are rows of plants spaced Q metres apart, wherein Q is the distance between the centre of adjacent rows. Said rows may be quasi-parallel or parallel. Said rows of plants are preferably plantations of agricultural plants, horticultural plants or forestry plants. More preferably, said rows of plants are grown free-standing or supported training systems. Even more preferably said rows comprise vine training systems, frames, trellises, fences or hedges. Still more preferably, said rows of plants are vineyard rows, trellised rows, espalier rows or pleached rows. Yet more preferably, said rows of plants are rows of fruit plants, preferably wherein said fruit plants are grape vines, soft-fruit canes (e.g. raspberry, blueberry, blackberry), citrus plants (e.g. orange, lemon), apple or pear plants, stonefruit plants (e.g. cherry, plum, olive, almond) or tomatoes. Most preferably, said rows of plants are rows of grapevines.

Said robot is preferably a vehicle comprising wheels or tracks. Said vehicle more preferably is a vehicle comprising wheels or tracks and a motor, wherein said motor is preferably an electric motor or internal combustion motor. Even more preferably, said robot is an electric vehicle, a petrol vehicle or a diesel vehicle. When not turning, said robot moves forward along a y-axis, and when turning left or right, said robot moves through a plane defined by said y-axis and an x-axis. Preferably, said robot moves forward along said y-axis when not turning or, alternatively, moves backward along said y-axis when not turning, and when turning left or right, said vehicle moves through a plane defined by said y-axis and said x-axis, whereby a component of said turning involves said vehicle moving forward along said y-axis or, alternatively, moving backward along said y-axis.

Said y-axis is a horizontal axis. Thus, said y-axis extends horizontally from the front end of said robot (i.e. the foremost part of said robot when it is moving in a forward direction), preferably through the centreline of said robot (cf. FIG. 1). Said x-axis is a horizontal axis perpendicular to said y-axis (cf. FIG. 1). Thus, said x-axis extends horizontally to the left side and right side of said robot. Position O defines the point (origin) at which said x- and y-axes, as well as a z-axis intercept. A z-axis is a vertical axis perpendicular to said x-axis and said y-axis. Position O is identified by (x,y) coordinates (0,0) wherein each coordinate represents the distance in metres from O along said x-axis and said y-axis, respectively.

Said robot comprises at least two sensing devices, sensor A and a sensor B, mounted at position O thereon. Each sensing device is a device which detects electromagnetic waves or detects sound waves, and wherein when both devices detect:

(A) electromagnetic waves, sensor A detects said waves at a frequency and/or field-of-view different from that of the waves detected by sensor B; and (B) sound waves, sensor A detects said waves at a frequency and/or field-of-view different from that of the waves detected by sensor B.

Thus, sensor A either detects different types of waves (electromagnetic waves or sound waves) from sensor B or, when both sensors detect the same type of waves, sensor A detects said waves at a frequency (and wavelength, since the medium through which waves propagate is air) and/or field-of-view different from that of the waves detected by sensor B. In other words, each sensing device operates based on different physical principles.

Preferably, each sensing device is a different range imaging device, more preferably a 3D range imaging device. Even more preferably, said sensing device is selected from the group consisting of: a multi-beam lidar, a stereoscopic camera, a time-of-flight (TOF) 3D camera, a 3D rotational lidar and an ultrasonic sensor (preferably as a network of ultrasonic sensors), whereby sensor A≠sensor B. More preferably, sensor A and sensor B are selected from one of the six combinations of sensing devices disclosed in Table 1 (note that sensor A may be denominated sensor B and vice versa). In a preferred embodiment of the method and system of the present invention, sensor A is a multi-beam lidar and sensor B is a stereoscopic or time-of-flight 3D camera, or vice versa. Even more preferably, sensor A is a multi-beam lidar and sensor B is a stereoscopic camera, or vice versa.

TABLE 1

Sensing device combinations for sensor A and sensor B

| Sensing device combination | Sensor A | Sensor B |
| --- | --- | --- |
| 1 | Multi-beam lidar | Stereoscopic camera |
| 2 | Multi-beam lidar | TOF 3D camera |
| 3 | 3D Rotational lidar | Stereoscopic camera |
| 4 | 3D Rotational lidar | TOF 3D camera |
| 5 | TOF 3D camera | Stereoscopic camera |
| 6 | TOF 3D camera | Network of ultrasonic sensors |

That each sensing device is different, is essential for redundancy, whereby sensing devices which operate on different physical principles (including detecting different types of waves or different frequencies and/or fields-of-view) are employed in case one of them fails. The physical principle underlying lidar and a TOF-3D camera is detection of a reflected laser or infrared beam, that underlying a stereoscopic camera (stereo vision) is digital imaging, and that underlying sonar detection of sound waves. The conditions that compromise stereo vision (poor lighting for instance, or lack of texture for stereo matching) are irrelevant for laser beams, and vice versa. Therefore, two different sensing devices ensures redundancy in the event that any one sensing device fails. In the event that three or more sensing devices are used in conjunction, it is very unlikely that all three fail simultaneously.

That each sensing device is different is also essential for complementarity, wherein one sensing device excels when the other is weaker, such that by combining data points obtained from two different sensing devices, a more realistic image is obtained. This complementarity is provided with respect to types of waves, frequencies and/or fields-of-view that are detected. For example in the preferred embodiment of the method and system of the present invention, sensor A is a multi-beam lidar and sensor B is a stereoscopic or time-of-flight 3D camera, the multi-beam lidar covers the first 3 metres of the field of view along the y-axis, thus complementing the camera which covers from 3 m to 8 m along the y-axis, in so far as they conjointly cover the volume extending 0 to 8 m along the y-axis in front of the robot.

Ideally, the method and system of the present invention operates over three range levels:

(a) long range zone, pointing ahead between 4 m and 8 m from the sensing devices: this zone is instrumental to calculate the target point $P_t$ towards which the robot is directed. It provides mild corrections and smooth navigation;

(b) short range zone, pointing ahead below 4 m from the sensing devices: this zone produces corrections that are more reactive but it is key to keep the robot at a safe distance from canopies; and (c) close vicinity zone, covering a 2 m ring or broken ring around the robot: this zone is highly reactive, and basically exerts safeguarding corrections to re-center the robot or stop it in the presence of interfering obstacles.

Said method comprises the following steps (i) to (vii). Step (i) comprises defining a two-dimensional grid of square cells in the aforementioned plane, wherein said grid is $X_G$ cells in width and $Y_G$ cells in length, and said cells have sides of length c, wherein:

(a) said width extends horizontally $|X_{min}|$ metres away from O to the left along said x-axis and horizontally $X_{max}$ metres away from O to the right along said x-axis; and (b) said length extends horizontally $Y_{max}$ metres away from O along said y-axis; wherein:

$$X_{min} = -X_G \cdot c/2;$$

$$X_{max} = X_G \cdot c/2;$$

$$Y_{max} = Y_G \cdot c;$$

$X_G$ is a whole number selected from between 2 and 1000; $Y_G$ is a whole number selected from between 3 and 1500; and c is a number selected from between 0.01 and 0.5 m; and (c) each cell (h,v) is assigned a coordinate comprising a first number, h, and a second number, v, wherein h is a number from 1 to $X_G$ and v is a number from 1 to $Y_G$, wherein:

$$h = h' + 1; \text{ and}$$

$$v = v' + 1;$$

wherein:

h' is the number of said cells, counted along said x-axis starting from the left-most cell, which separate said cell (h,v) from the outside of said two-dimensional grid; and v' is the number of said cells, counted along said y-axis starting from the cell that is most remote from said robot, which separate said cell (h,v) from the outside of said two-dimensional grid.

Figure 3:
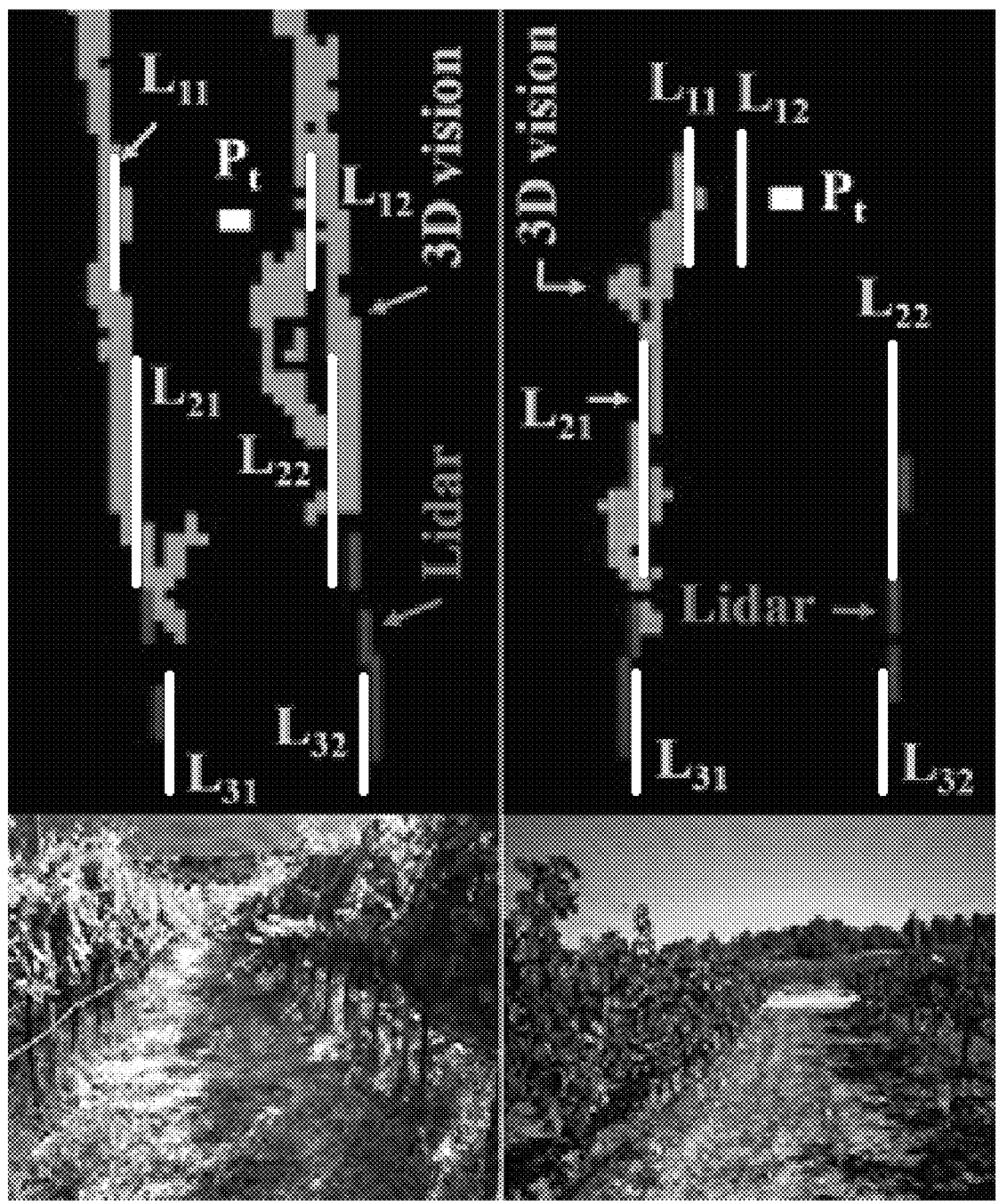
FIG. 3. Representation of the two-dimensional grid (upper panels) for real vineyard scenarios (lower panels) in Portugal (left-hand side) and Spain (right-hand side), showing the cells of said grid which are populated by data points collected by 11-beam lidar (Lidar, dark-grey cells) and a 3D stereocamera (3D vision, light-grey cells), as well as the estimated line position $L_{ij}$ of each group of cells (i,j) ($om_{ij}$) and the point Pt, towards which the robot navigates autonomously.

In other words, the two-dimensional grid is an augmented perception two-dimensional (2D) obstacle map (APOM) similar to the pictorial representation shown in FIG. 3, wherein when viewed from above (i.e. looking along the z-axis), said grid is $X_G$ cells in width (along the x-axis) and $Y_G$ cells in length (along the y-axis). Thus, the dimensions of the active APOM are as defined in the following formula (4).

$$\text{dim(active } APOM) \begin{cases} X_G = \|(X_{max} - X_{min})/c\| \\ Y_G = \|Y_{max}/c\| \end{cases} ; X_G, Y_G \in \mathbb{N} \quad (4)$$

Since the width of said two-dimensional grid extends horizontally $|X_{min}|$ metres away from O to the left along said x-axis (i.e. to the left of said robot) and horizontally $X_{max}$ metres away from O to the right along said x-axis (i.e. to the right of said robot), said two-dimensional grid is a total of $(X_{max} - X_{min})$ metres wide. Similarly, since said length extends horizontally $Y_{max}$ metres away from O along said y-axis and position O is located at 0 metres, said two-dimensional grid is a total of $(Y_{max} - 0)$ metres long. Thus, the method and system of the present invention only takes into account the positive side of the Y axis. In a preferred embodiment of the method and system of the present invention, $X_{max} - X_{min} \geq 2 \cdot Q$, more preferably, the total width $(X_{max} - X_{min})$ of said two-dimensional grid is at least $2.5 \cdot Q$.

Note that $Y_{max}$ and $X_{max}$ are positive integers since they are located above and to the right of position O, respectively, when said grid is viewed from above (i.e. looking along the z-axis), while $X_{min}$ is a negative integer since it is located to the left of the position O (since $Y_{min}$ is 0, it is neither negative nor positive).

Figure 2:
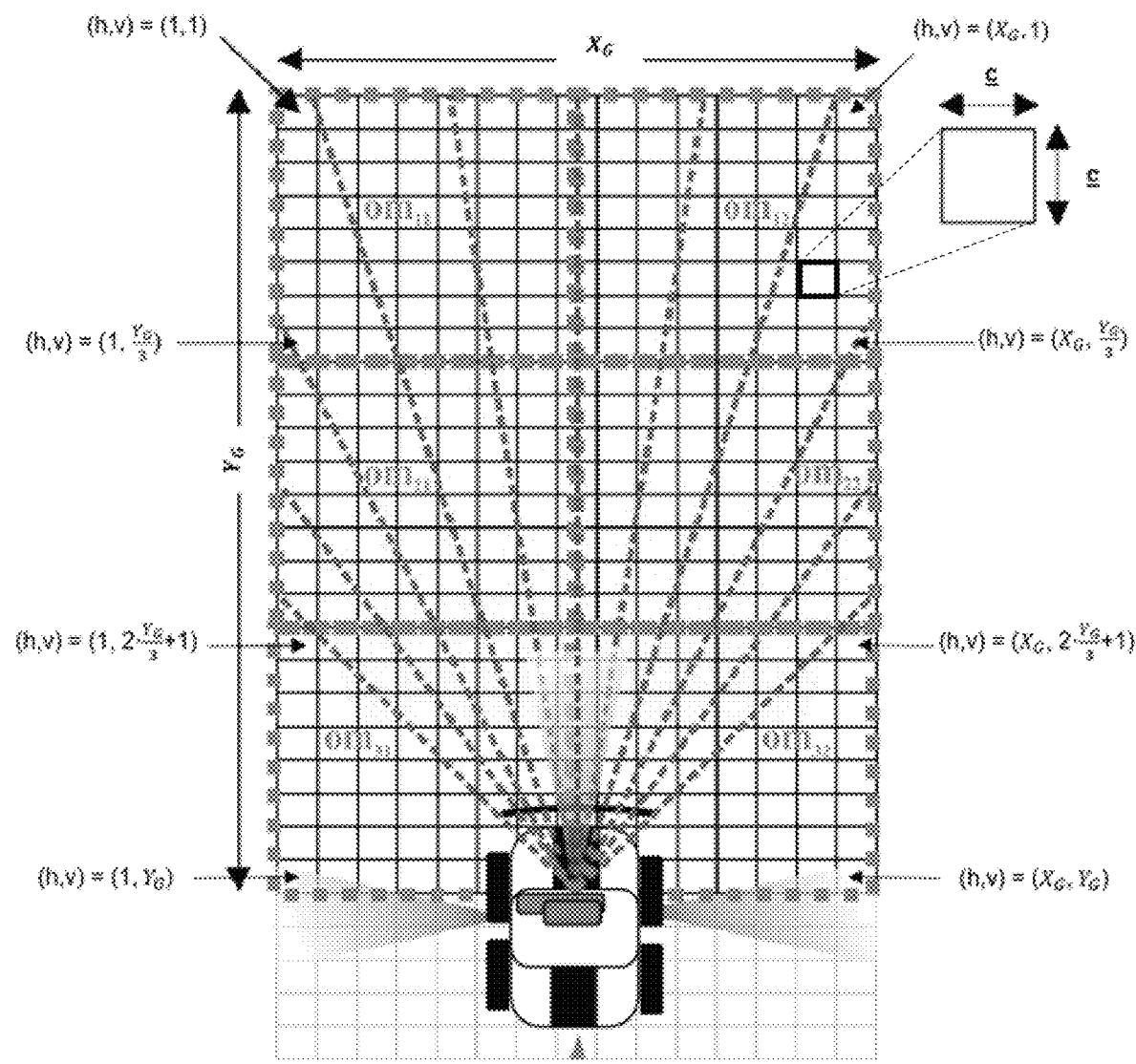
FIG. 2. Layout of a pictorial representation of the two-dimensional grid relative to the robot, as defined in the method and system of the present invention, showing $X_G$, $Y_G$, (h,v) and group of cells (i,j) ($om_{ij}$) are as defined herein, as well as a cell having sides of length c.

In the present invention, $X_G$ is a whole number selected from between 2 and 1000 and $Y_G$ is a whole number selected from between 3 and 1500, while c is a number selected from between 0.01 and 0.5 m. In a preferred embodiment of the method and system of the present invention c is a number selected from between 0.05 and 0.2 m, $X_G$ is between 20 and 70 and $Y_G$ is between 40 and 100. Even more preferably, c is a number selected from between 0.08 and 0.12 m, $X_G$ is between 30 and 60 and $Y_G$ is between 60 and 90. In the exemplified embodiment described herein, c is 0.1 m, $X_G$ is 50 and $Y_G$ is 80, which implies an area of $(X_{max} - X_{min}) = 5$ m × $(Y_{max} - 0) = 8$ m = 40 m² which is covered ahead of the robot in the forward direction, as depicted in the schematic of FIG. 2.

Each cell in said grid is assigned a coordinate in step (i)(c), wherein said coordinate comprises a first number, h, and a second number, v, wherein h is a number from 1 to $X_G$ and v is a number from 1 to $Y_G$. The first number, h, and second number, v, are ordinal integers. The first number, h, is lowest in value (1) in the cells that are furthest to the left of position O, and highest in value ($X_G$) in the cells that are furthest to the right of position O (when said grid is viewed from above). The second number, v, is lowest in value (1) in the row of cells that is furthest from (i.e. above) position O, and highest in value ($Y_G$) in the row of cells that is closest to position O (when said grid is viewed from above). The assignment of the first number, h, and second number, v, to any given cell (h,v) is carried out by determining:

h', the number of cells counted along said x-axis starting from the left-most cell (i.e. the cell that is furthest to the left of position O), which separate said cell (h,v) from the outside of said two-dimensional grid; and v', the number of cells counted along said y-axis starting from the cell that is most remote from said robot (i.e. in the row furthest from position O), which separate said cell (h,v) from the outside of said two-dimensional grid, whereby h=h'+1 and v=v'+1. Thus, the cell (h,v) that is furthest to the left of position O in the row of cells that is furthest from (i.e. above) position O is assigned a coordinate (1,1), while the cell (h,v) that is furthest to the right of position O in the row of cells that is closest to position O is assigned a coordinate ($X_G$, $Y_G$).

However, an alternative assignment of coordinates to each cell may be the inverse where the first number, h, is lowest in value (1) in the cells that are furthest to the right of position O, and highest in value ($X_G$) in the cells that are furthest to the left of position O, and/or that where the second number, v, is lowest in value (1) in the row of cells that are closest to position O, and highest in value ($X_G$) in the row of cells that are furthest from position O. Under this alternative assignment, the assignment of the first number, h, and second number, v, to any given cell (h,v) is carried out by determining:

h', the number of cells counted along said x-axis starting from the right-most cell, which separate said cell (h,v) from the outside of said two-dimensional grid; and/or v', the number of cells counted along said y-axis starting from the cell that is closest to said robot (i.e. in the row closest to position O), which separate said cell (h,v) from the outside of said two-dimensional grid, whereby h=h'+1 and v=v'+1.

Step (ii) comprises dividing the two-dimensional grid of square cells into $I_G \cdot J_G$ groups of cells, wherein each group is $X_G/J_G$ cells in width and $Y_G/I_G$ cells in length, wherein:

(a) $I_G$ is 3;
(b) $J_G$ is 2; and
(c) each group of cells (i,j) ($om_{ij}$) is assigned a coordinate comprising a first number, i, and a second number, j, wherein i is a number from 1 to $I_G$ and j is a number from 1 to $J_G$, wherein
i=i'+1, and
j=j'+1,
wherein:
i' is the number of said groups of cells, counted along said y-axis starting from the group of cells that is most remote from said robot, which separate said group of cells from the outside of said two-dimensional grid; and
j' is the number of said groups of cells, counted along said x-axis starting from the left-most group of cells, which separate said group of cells (i,j) ($om_{ij}$) from the outside of said two-dimensional grid.

In the present invention, $I_G$ is 3 and $J_G$ is 2. In other words, the two-dimensional grid, when viewed from above (i.e. looking along the z-axis), is $J_G$ groups of cells in width (along the x-axis) and $I_G$ groups of cells in length (along the y-axis) (cf. FIG. 3) and therefore comprises $I_G \cdot J_G$=6 groups of cells. However, $I_G$ could conceivably be any integer from 2 to 5, meaning that the two-dimensional grid of square cells may comprise from between 4 to 10 groups of cells.

Each group of cells in said grid is assigned a coordinate in step (ii)(c), wherein said coordinate comprises a first number, i, and a second number, j, wherein i is a number from 1 to $I_G$ and j is a number from 1 to $J_G$. The first number, i, and second number, j, are ordinal integers. The second number, j, is lowest in value (1) in the groups of cells that are furthest to the left of position O, and highest in value ($J_G$) in the groups of cells that are furthest to the right of position O (when said grid is viewed from above). The first number, i, is lowest in value (1) in the row of the groups of cells that is furthest from (i.e. above) position O, and highest in value ($I_G$) in the row of the groups of cells that is closest to position O (when said grid is viewed from above). The assignment of the first number, i, and second number, j, to any given group of cells (i,j) ($om_{ij}$) is carried out by determining:

i', the number of groups of cells counted along said y-axis starting from the groups of cell that is most remote from said robot (i.e. in the row of the group of cells which is furthest from position O), which separate said group of cells (i,j) ($om_{ij}$) from the outside of said two-dimensional grid; and j', the number of groups of cells counted along said x-axis starting from the left-most group of cells (i.e. the group of cells that is furthest to the left of position O), which separate said group of cells (i,j) ($om_{ij}$) from the outside of said two-dimensional grid, whereby i=i'+1 and j=j'+1. Thus, the group of cells (i,j) ($om_{ij}$) that is furthest to the left of position O in the row of the group of cells that is furthest from (i.e. above) position O is assigned a coordinate (1,1), while the group of cells (i,j) ($om_{ij}$) that is furthest to the right of position O in the row of the group of cells that is closest to position O is assigned a coordinate ($I_G, J_G$).

However, an alternative assignment of coordinates to each group of cells may be the inverse where the second number, j, is lowest in value (1) in the groups of cells that are furthest to the right of position O, and highest in value ($J_G$) in the cells that are furthest to the left of position O, and/or that where the first number, i, is lowest in value (1) in the row of cells that are closest to position O, and highest in value ($I_G$) in the row of cells that are furthest from position O. Under this alternative assignment, the assignment of the first number, i, and second number, j, to any given cell (i,j) is carried out by determining:

i', the number of groups of cells counted along said y-axis starting from the group of cells that is closest to said robot (i.e. in the row of the group of cells which is closest to position O), which separate said group of cells (i,j) ($om_{ij}$) from the outside of said two-dimensional grid; and/or j', the number of groups of cells counted along said x-axis starting from the right-most group of cells (i.e. the group of cells that is furthest to the right of position O), which separate said group of cells (i,j) ($om_{ij}$) from the outside of said two-dimensional grid, whereby i=i'+1 and j=j'+1.

Thus, in one embodiment, step (ii) comprises subdividing the grid into six equal operational zones, as outlined in FIG. 3 and mathematically defined in formula (5) through the occupancy matrix (OM).

$$OM \stackrel{def}{=} \begin{cases} om_{11} = \sum_{h=1}^{\frac{X_G}{2}} \sum_{v=1}^{\frac{Y_G}{3}} \Gamma(h, v) \\ om_{12} = \sum_{h=\frac{X_G}{2}}^{X_G} \sum_{v=1}^{\frac{Y_G}{3}} \Gamma(h, v) \\ om_{21} = \sum_{h=1}^{\frac{X_G}{2}} \sum_{v=\frac{Y_G}{3}}^{2 \cdot \frac{Y_G}{3}} \Gamma(h, v) \\ om_{22} = \sum_{h=\frac{X_G}{2}}^{X_G} \sum_{v=\frac{Y_G}{3}}^{2 \cdot \frac{Y_G}{3}} \Gamma(h, v) \\ om_{31} = \sum_{h=1}^{\frac{X_G}{2}} \sum_{v=2 \cdot \frac{Y_G}{3}}^{Y_G} \Gamma(h, v) \\ om_{32} = \sum_{h=\frac{X_G}{2}}^{X_G} \sum_{v=2 \cdot \frac{Y_G}{3}}^{Y_G} \Gamma(h, v) \end{cases} om_{ij} \in \mathbb{N} \quad (5)$$

Notice that indices h and v in formula (5) must be positive integers, and therefore the limits of the summations have been ideally set at a fraction of grid limits $X_G$ and $Y_G$, such as $X_G/2$ and $Y_G/3$. However, a limit ideally set at, for example, $Y_G/3$, in practice means that one summation will end at $\|Y_G/3\|$ and the consecutive series will initiate at $\|Y_G/3\|+1$. The components of the occupancy matrix $om_{ij}$ are basically the counting of the occupied cells within each operational zone, as defined in step (v), below.

Step (iii) comprises obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max}-Z_{min}$ metres along a z-axis, wherein said z-axis is a vertical axis perpendicular to said x-axis and said y-axis, and said surface is the surface of an object, wherein:

$Z_{min}$ is a value selected from −0.5 to 0.5 metres;
$Z_{max}$ is a value selected from 1 to 5 metres;
wherein:
(a) each data point obtained using sensor A is assigned a coordinate comprising a first number, $x^L$, and a second number, $y^L$ wherein:
$x^L$ is the distance along the x-axis from said data point to O; and
$y^L$ is the distance along the y-axis from said data point to O, wherein the coordinate of position O is (0,0); and
(b) each data point obtained using sensor B is assigned a coordinate comprising a first number, $x^V$, and a second number, $y^V$ wherein:
$x^V$ is the distance along the x-axis from said data point to O; and
$y^V$ is the distance along the y-axis from said data point to O, wherein the coordinate of position O is (0,0).

Sensors A and B obtain data points, wherein each data point is the point in space at which electromagnetic or sound waves are reflected from a surface located within a rectangular cuboid volume. Said surface is the surface of an object that is located within said volume (in the invention, a detected object is considered to be made of several cells when the object is located within several cells). Said rectangular cuboid volume is bounded by the dimensions of said two-dimensional grid in the x-axis and y-axis and has a height of $Z_{max}-Z_{min}$ metres along the z-axis, wherein:

$Z_{min}$ is a value selected from −0.5 to 0.5 metres;
$Z_{max}$ is a value selected from 1 to 5 metres.

$Z_{max}$ is a positive integer since it is located above the aforementioned plane defined by said y-axis and an x-axis (i.e. when said grid is viewed along the y-axis), while $Z_{min}$ is either a positive integer when it is located above the aforementioned plane or a negative integer when it is located below the aforementioned plane.

Sensor A and sensor B are preferably configured to obtain a maximum of k and m data points, respectively, wherein said maximum refers to the theoretical maximum number of measurements that any given sensor can make over a given time. In reality, the number of data points obtained by any given sensor is likely to be lower than said maximum because, for example, if a given sensor theoretically can detect electromagnetic or sound waves that are reflected along a trajectory towards it, the absence of a surface (and, hence, an object) in said volume which reflects said waves along said trajectory will result in no data points being collected by said sensor. When sensor A is lidar and sensor B is a camera, k is more preferably an integer between 5 and 100 and m is more preferably an integer between 100,000 and 10,000,000, even more preferably k is between 5 and 20 and m is between 250,000 and 500,000. In the exemplified embodiment where sensor A is multi-beam lidar and sensor B is a stereoscopic camera, k is 11 and m is 640·480=307,200.

Each data point obtained using sensor A is assigned a coordinate comprising a first number, $x^L$, and a second number, $y^L$ wherein:
$x^L$ is the distance along the x-axis from said data point to O (i.e. the distance from O extending away from said robot to the left or right along the x-axis to said data point); and
$y^L$ is the distance along the y-axis from said data point to O (i.e. the distance from O extending away from the front of said robot along the y-axis to said data point), wherein the coordinate of position O is (0,0). Likewise, each data point obtained using sensor B is assigned a coordinate comprising a first number, $x^V$, and a second number, $y^V$ wherein:
$x^V$ is the distance along the x-axis from said data point to O (i.e. the distance from O extending away from said robot to the left or right along the x-axis to said data point); and
$y^V$ is the distance along the y-axis from said data point to O (i.e. the distance from O extending away from the front of said robot along the y-axis to said data point), wherein the coordinate of position O is (0,0). Thus, by way of example, a data point which is the point in space located 5 metres away from the front of the robot along the y-axis and 1 metre to the left of said robot along the x-axis from said data point to O, at which a sensor A lidar laser beam is reflected from a surface is assigned a coordinate $(x^L, y^L)$ of (−1,5).

Thus, the two-dimensional grid is populated with the measurements retrieved from sensor A and sensor B. The definition and origin of coordinates for both sensors is the same. The origin of coordinates was located in the aforementioned plane defined by the x-axis and y-axis (cf. FIG. 1), but could equally be placed in a plane parallel thereto at ground level. Let $C_L = \{(x^L, y^L)_1, \ldots, (x^L, y^L)_k\}$ be the set of k data points retrieved from sensor A, and let $C_V = \{(x^V, y^V)_1, \ldots, (x^V, y^V)_m\}$ be the set of m data points retrieved from sensor B (in reality, said data points $P_i(x,y)$] also comprise a z component [i.e. $P_i(x,y,z)$] such that $C_L = \{(x^L, y^L, z^L)_1, \ldots, (x^L, y^L, z^L)_k\}$ and $C_V = \{(x^V, y^V, z^V)_1, \ldots, (x^V, y^V, z^V)_m\}$, but the z-component of said data points is not employed in the present method and system). These sets of coordinates are bounded by the resolution of the sensors (for example, the number of beams in the lidar or the image resolution set in the camera) for every sample obtained at a given cycle time at which a central computer running the perception engine obtains said data points. For the particular case of the robot shown in FIG. 1, the number of lidar beams is 11 (k≤11) and the image resolution of the stereo camera is 640 pixels in the horizontal dimension by 480 pixels in the vertical dimension (thus, m≤640×480). The perceptual capacity of the sensors depends on their respective specifications, but the calculation of coordinates is always prone to errors. To avoid severe outliers, the elements of $C_L$ and $C_V$ were limited to logic values through the concept of the Validity Box ($V_{BOX}$) which establishes the logical limits to the coordinates of the data points $P_i(x,y)$ obtained from both sensors and for a given agricultural environment according to formula (6):

$$P_i(x, y) \in V_{BOX} \Leftrightarrow \begin{cases} X_{min} \leq x \leq X_{max} \\ 0 \leq y \leq Y_{max} \\ Z_{min} \leq z \leq Z_{max} \end{cases} \quad (6)$$

wherein $P_i(x,y)$, $X_{min}$, $X_{max}$, $Y_{max}$, $Z_{min}$ and $Z_{max}$ are as defined above.

Step (iv) comprises converting each data point into a discretized data point, wherein:

(a) data point $(x^L, y^L)$ is converted to a discretized data point $(L_V, L_H)$, according to the following formulae:

$L_V = \|y^L/c\|$; and $L_H = \|(x^L - X_{min})/c\|$;

(b) data point $(x^V, y^V)$ is converted to a discretized data point $(V_V, V_H)$ according to the following formulae:

$V_V = \|y^V/c\|$; and $V_H = \|(x^V - X_{min})/c\|$.

Thus, step (iv) converts each data point $(x^L, y^L)$ or $(x^V, y^V)$ into the respective discretized data point $(L_V, L_H)$ or $(V_V, V_H)$, whereby the discretized data point is a coordinate having values for $L_V, L_H$ or $(V_V, V_H)$ that correspond to the values of the coordinate (h,v) of a particular cell. Thus, the horizontal position h coincides with $L_V$ and $V_V$, and the vertical position v coincides with $L_H$ and $V_H$. When the values of the coordinate of a discretized data point correspond to the values of the coordinate (h,v) of a particular cell, said cell (h,v) is therefore considered to hold the content of said discretized data point. As $\dim(C_L) + \dim(C_V)$ is usually greater than $(X_G \cdot Y_G)$, it is common to have cells containing various points and multiple discretized data points obtained from sensor A and/or sensor B may be held in any given cell (a cell is considered empty when no data point, upon discretization, has a coordinate having values that correspond to the values of the coordinate of said cell). For example, when a sensor A lidar laser beam data point is assigned a coordinate $(x^L, y^L)$ of $(-1,5)$, and $X_{min}$ is $-2$ metres and c is 0.1 metres, the corresponding discretized data point $(L_V, L_H)$ is (30,10). Notice that 3D points theoretically have a z-component, and therefore, all points for which $Z_{min} \leq z \leq Z_{max}$ were enclosed in the same cell according to step (iv), hence formulae (7) and (8):

$$\forall (x^L, y^L, z^L)_i \in C_L \rightarrow \begin{cases} L_V = \|y^L/c\| \\ L_H = \|(x^L - X_{min})/c\| \end{cases}; L_V, L_H \in \mathbb{N} \quad (7)$$

$$\forall (x^V, y^V, z^V)_i \in C_V \rightarrow \begin{cases} V_V = \|y^V/c\| \\ V_H = \|(x^V - X_{min})/c\| \end{cases}; V_V, V_H \in \mathbb{N} \quad (8)$$

Step (v) comprises calculating a fusion function value, $\Gamma(h,v)$, for each cell (h,v) of said two-dimensional grid according to the following formula (1):

$\Gamma(h,v) = K_V \cdot \gamma^V(V_V, V_H) + K_L \cdot \gamma^L(L_V, L_H)$ (1)

wherein:

$K_L$ is a non-negative integer selected from between 0 and 5;

$\gamma^L(L_V, L_H)$ is a whole number calculated from the number $D_N(L_H, L_V)$ of discretized data points $(L_V, L_H)$ for which $L_V = v$ and $L_H = h$;

$K_V$ is a non-negative integer selected from between 0 and 5;

$\gamma^V(V_V, V_H)$ is a whole number calculated from the number $D_N(V_H, V_V)$ of discretized data points $(V_V, V_H)$ for which $V_V = v$ and $V_H = h$.

Thus, the fusion function value, $\Gamma(h,v)$, for each cell (h,v) of said two-dimensional grid is a value that is a weighted union of the data points obtained from sensor A and sensor B which, following discretization as per step (iv), are held in said cell. Said fusion function value is a natural number.

$K_V$ and $K_L$ are weighting constants that have a value which is determined according to the accuracy of data points obtained from sensor B and sensor A, respectively. Preferably, $K_V = K_L =$ a non-negative integer selected from between 0 and 5, more preferably from between 1 and 3. In an even more preferred embodiment of the method and system of the present invention when sensor A is a multi-beam lidar and sensor B is a stereoscopic or time-of-flight 3D camera, $K_V$ is 1 and $K_L$ is 3.

The function $\gamma^L(L_V, L_H)$ is a whole number calculated from the number $D_N(L_H, L_V)$ of discretized data points $(L_V, L_H)$ for which $L_V = v$ and $L_H = h$. The whole number calculated from the number $D_N(L_H, L_V)$ is preferably that obtained by adding up the number of discretized data points $(L_V, L_H)$ for which $L_V = v$ and $L_H = h$, when the content of a given cell does not require normalization.

Alternatively, the whole number calculated from the number $D_N(L_H, L_V)$ is preferably:

1 when $D_N(L_H, L_V) > TH_L \cdot D_N(L_H, L_V)\text{max}$; or 0 when $D_N(L_H, L_V) \leq TH_L \cdot D_N(L_H, L_V)\text{max}$ wherein $D_N(L_H, L_V)$ is:

the whole number of discretized data points $(L_V, L_H)$ when $L_{V \cdot C} \leq 3$; or a whole number calculated from the number of discretized data points $(L_V, L_H)$ for which $L_V = v$, $L_H = h$ and $L_{V \cdot C} > 3$, multiplied by $(L_{V \cdot C}/3)^2$;

and wherein:

$TH_L$ is a threshold value, wherein $0 \leq TH_L \leq 1$; and $D_N(L_H, L_V)\text{max}$ is the maximum value of $D_N(L_H, L_V)$ determined for any cell (h,v) in said two-dimensional grid, when the content of a given cell does require normalization. Normalization renders the function $\gamma^L(L_V, L_H)$ uniform regardless of the position of the cell in said grid, given that objects closer to sensor A (i.e. discretized data points for which $L_{V \cdot C} \leq 3$) are represented by a larger number of discretized data points than are more distant objects (as a result of the field of view angle of lenses). Normalization is more preferably required when said sensor A is a camera such as a stereoscopic or time-of-flight 3D camera and not required when said sensor A is lidar.

In one embodiment when the content of a given cell does require normalization, the number of points that fall inside a given cell of coordinates $(L_H, L_V)$ is denominated its 3D density, and it is represented as $D(L_H, L_V) \geq 0$. The normalized density $D_N(L_H, L_V)$ that compensates for the loss of resolution in far ranges is given in formula (9) and it corrects the density for ranges farther than 3 m while leaving unchanged those cells closer than 3 m from the sensor A:

$$D_N(L_H, L_V) = \begin{cases} D(L_H, L_V) \cdot \left(\dfrac{L_V \cdot c}{3}\right)^2 & L_V \cdot c > 3 \\ D(L_H, L_V) & \text{Otherwise} \end{cases} \quad (9)$$

Not all the cells with $D_N(L_H, L_V) > 0$ are representative of occupancy and therefore pointing at actual plant rows, as point clouds are typically corrupted with a small number of noisy outliers. The definition of the $\gamma$ function for sensor A, namely $\gamma^L$ (formula (10)), accounts for scattering noise through the application of a threshold $TH_L$ that assures that only cells with high density pass to the final composition of the grid. If $TH_L$ is the threshold to discriminate obstacles from empty space, the definition of $\gamma^L$ is:

$$\gamma^L(L_H, L_V) = \begin{cases} 1 & D_N(L_H, L_V) > THL \cdot \max(D_N); 0 \le THL \le 1 \\ 0 & \text{Otherwise} \end{cases} \quad (10)$$

Likewise, the function $\gamma^V(V_V, V_H)$ is a whole number calculated from the number $D_N(V_H, V_V)$ of discretized data points $(V_V, V_H)$ for which $V_V = v$ and $V_H = h$. The whole number calculated from the number $D_N(V_H, V_V)$ is preferably that obtained by adding up the number of discretized data points $(V_V, V_H)$ for which $V_V = v$ and $V_H = h$, when the content of a given cell does not require normalization. Alternatively, the whole number calculated from the number $D_N(V_H, V_V)$ is preferably:
1 when $D_N(V_H, V_V) > TH_V \, D_N(V_H, V_V)$max; or
0 when $D_N(V_H, V_V) \le TH_V \, D_N(V_H, V_V)$max wherein $D_N(V_H, V_V)$ is:
  the whole number of discretized data points $(V_V, V_H)$ when $V_{V \cdot C} \le 3$; or
  a whole number calculated from the number of discretized data points $(V_V, V_H)$ for which $V_V = v$, $V_H = h$ and $V_{V \cdot C} > 3$, multiplied by $(V_{V \cdot C}/3)^2$;
and wherein:
  $TH_V$ is a threshold value, wherein $0 \le TH_V \le 1$; and
  $D_N(V_H, V_V)$max is the maximum value of $D_N(V_H, V_V)$ determined for any cell (h,v) in said two-dimensional grid,
when the content of a given cell does require normalization. Normalization renders the function $\gamma^V(V_V, V_H)$ uniform regardless of the position of the cell in said grid, given that objects closer to sensor A (i.e. discretized data points for which $V_{V \cdot C} \le 3$) are represented by a larger number of discretized data points than are more distant objects. As mentioned above, normalization is more preferably required when said sensor A is a camera such as a stereoscopic or time-of-flight 3D camera and not required when said sensor A is lidar.

In another embodiment when the content of a given cell does require normalization, the number of points that fall inside a given cell of coordinates $(V_H, V_V)$ is denominated its 3D density, and it is represented as $D(V_H, V_V) \ge 0$. The normalized density $D_N(V_H, V_V)$ that compensates for the loss of resolution in far ranges is given in formula (11) and it corrects the density for ranges farther than 3 m while leaving unchanged those cells closer than 3 m from sensor B:

$$D_N(V_H, V_V) = \begin{cases} D(V_H, V_V) \cdot \left(\frac{V_V \cdot c}{3}\right)^2 & V_V \cdot c > 3 \\ D(V_H, V_V) & \text{Otherwise} \end{cases} \quad (11)$$

Not all the cells with $D_N(V_H, V_V) > 0$ are representative of occupancy and therefore pointing at actual plant rows, as point clouds are typically corrupted with a small number of noisy outliers. The definition of the $\gamma$ function for sensor B, namely $\gamma^V$ (formula (12)), accounts for scattering noise through the application of a threshold $TH_V$ that assures that only cells with high density pass to the final composition of the grid. If $TH_V$ is the threshold to discriminate obstacles from empty space, the definition of $\gamma^V$ is:

$$\gamma^V(V_H, V_V) = \begin{cases} 1 & D_N(V_H, V_V) > THV \cdot \max(D_N); 0 \le THV \le 1 \\ 0 & \text{Otherwise} \end{cases} \quad (12)$$

In a preferred embodiment of the method and system of the present invention when sensor A is a multi-beam lidar and sensor B is a stereoscopic or time-of-flight 3D camera:
(a) $\gamma^L(L_V, L_H)$ is the whole number $D_N(L_H, L_V)$ of discretized data points $(L_V, L_H)$ for which $L_V = v$ and $L_H = h$; and
(b) $\gamma^V(V_V, V_H)$ is:
  1 when $D_N(V_H, V_V) > TH_V \, D_N(V_H, V_V)$max; or
  0 when $D_N(V_H, V_V) \le TH_V \, D_N(V_H, V_V)$max
  wherein $D_N(V_H, V_V)$ is:
    the whole number of discretized data points $(V_V, V_H)$ when $V_{V \cdot C} \le 3$; or
    a whole number calculated from the number of discretized data points $(V_V, V_H)$ for which $V_V = v$, $V_H = h$ and $V_{V \cdot C} > 3$, multiplied by $(V_{V \cdot C}/3)^2$;
  and wherein:
    $TH_V$ is a threshold value, wherein $0 \le TH_V \le 1$; and
    $D_N(V_H, V_V)$max is the maximum value of $D_N(V_H, V_V)$ determined for any cell (h,v) in said two-dimensional grid.

Thus, once the functions $\gamma^L(L_V, L_H)$ and $\gamma^V(V_V, V_H)$ have been defined for both sources of perception information, their content can be merged in a unique map that will populate the active two-dimensional grid of the APOM under the fusion function $\Gamma(h,v)$ described in formula (1). However, for the merging function and augmented map to be coherent, the distance units of c, the validity box boundaries established in formula (6), and coordinates of the sets $C_L$ and $C_V$ have to be necessarily the same, for example meters: in such a case, $(L_V, L_H)$ points at the same cell as $(V_V, V_H)$, and therefore coordinates may be simplified to the notation (h,v) of formula (1).

Since $n = X_G \cdot Y_G$ is the resolution of the active grid, let $\mathcal{L} = \{\gamma^L(1,1), \gamma^L(1,2), \ldots, \gamma^L(X_G, Y_G)\}_n$ indicate the set of cells activated by sensor A (i.e. those in which $\gamma^L(L_V, L_H) > 0$), and let $\mathcal{V}\{\gamma^V(1,1), \gamma^V(1,2), \ldots, \gamma^V(X_G, Y_G)\}_n$ indicate the set of cells activated by sensor B (i.e. those in which $\gamma^V(V_V, V_H) > 0$). The active grid holding the information needed for determining how to move the robot and, optionally, for the calculation of the target point $P_r$, is the union of both sets, i.e. $APOM \equiv \mathcal{L} \cup \mathcal{V}$.

The diverse nature of the sensors advises for a weighted union in the merging of both sets to yield $\Gamma$. For example, when sensor A is lidar and sensor B is a stereo camera, the lidar produces more accurate readings than the stereo camera, but the fact that just a limited number of beams is readily available each cycle, results in an unbalanced filling of the grid, where lidar readings are scarce but very reliable and stereo-based points are numerous but prone to noise. In order to make lidar perception more consistent in the augmented grid, each cell activated by the lidar automatically activated the two cells immediately above and below, as can be seen in the dark grey cells of the grids depicted in FIG. 3. The higher accuracy and reliability of lidar, however, was mathematically conveyed to the final grid by the introduction of weighting constants $K_L$ and $K_V$, as shown in the formal definition of F given in formula (1). In the exemplified version of the navigation system which yielded the grids of FIG. 3, $K_L = 3$ and $K_V = 1$.

Following on from the mathematical definition of the six regions of the two-dimensional grid as per formula (4), the subsequent geometrical parameters are calculated for each specific region $om_{ij}$. Thus, step (vi) comprises calculating for each group of cells (i,j) ($om_{ij}$):

(a) the cumulative total of fusion function values, $\text{CUM}_{ij}(h)$, of all cells in said group of cells which have a coordinate with the same h value; and
(b) the sum of all cumulative totals of fusion function values, $\text{SUM}_{ij}$, in said group of cells; wherein when:
$\text{SUM}_{ij} \geq \|0.4 \cdot \overline{\text{OM}}\|$ said group of cells is classified as high-activated; and
$\text{SUM}_{ij} \geq \|0.2 \cdot \overline{\text{OM}}\|$ and $< \|0.4 \cdot \overline{\text{OM}}\|$ said sub-volume is classified as low-activated, wherein $\overline{\text{OM}}$ is the maximum $\text{SUM}_{ij}$ value determined for any group of cells (i,j) ($\text{om}_{ij}$) in said two-dimensional grid.

Thus, for each group of cells (i,j) ($\text{om}_{ij}$), each $\text{CUM}_{ij}(h)$ value is obtained by adding up the fusion function values of all cells in said group of cells (i,j) ($\text{om}_{ij}$) which have a coordinate with the same h value. Cells in said group of cells (i,j) ($\text{om}_{ij}$) which have a coordinate with the same h value are those which are in the same column of the grid (when viewed from above, along the z-axis), whereby said column of cells is parallel to the y-axis. $\text{SUM}_{ij}$ is obtained by adding up all $\text{CUM}_{ij}(h)$ values obtained from cells in said group of cells (i,j) ($\text{om}_{ij}$). Thus, $\text{SUM}_{ij}$=the sum of fusion function values, $\text{om}_{ij}$, of all cells in said group of cells (i,j) ($\text{om}_{ij}$), wherein $\text{om}_{ij}$ is a natural number. The maximum $\text{om}_{ij}$ (or $\text{SUM}_{ij}$) value determined for any group of cells (i,j) ($\text{om}_{ij}$) in said two-dimensional grid is designated OM as per formula (13).

$$\overline{\text{OM}} = \max_{\substack{1 \leq i \leq 3 \\ 1 \leq j \leq 2}} om_{ij} \quad (13)$$

Thus, the cumulative profile $\text{CUM}_{ij}(h)$ is as defined in formula (14):

$$CUM_{11}(h) = \sum_{v=1}^{\left\|\frac{Y_G}{3}\right\|} \Gamma(h, v); \quad h = 1, \ldots, \|X_G/2\| \quad (14)$$

$$CUM_{12}(h) = \sum_{v=1}^{\left\|\frac{Y_G}{3}\right\|} \Gamma(h, v); \quad h = \|X_G/2\| + 1, \ldots, X_G$$

$$CUM_{21}(h) = \sum_{v=\left\|\frac{Y_G}{3}\right\|+1}^{2\left\|\frac{Y_G}{3}\right\|} \Gamma(h, v); \quad h = 1, \ldots, \|X_G/2\|$$

$$CUM_{22}(h) = \sum_{v=\left\|\frac{Y_G}{3}\right\|+1}^{2\left\|\frac{Y_G}{3}\right\|} \Gamma(h, v); \quad h = \|X_G/2\| + 1, \ldots, X_G$$

$$CUM_{31}(h) = \sum_{v=2\left\|\frac{Y_G}{3}\right\|+1}^{Y_G} \Gamma(h, v); \quad h = 1, \ldots, \|X_G/2\|$$

$$CUM_{32}(h) = \sum_{v=2\left\|\frac{Y_G}{3}\right\|+1}^{Y_G} \Gamma(h, v); \quad h = \|X_G/2\| + 1, \ldots, X_G$$

The cumulative profile of formula (14) is later used to calculate the moment $M_{ij}$ as per formula (3). The summation of the cumulative profile $\text{SUM}_{11}$ was calculated according to formula (15). Notice that the summation of the cumulative profile for a given operational zone is equivalent to the amount of cells in that zone, which implies that $\text{om}_{ij} = \text{SUM}_{ij}$.

$$\text{SUM}_{11} = \Sigma_{h=1}^{\|X_G/2\|} \text{CUM}_{11}(h) \quad (15)$$

The specific results derived from the calculation of the occupancy matrix [cf. formula (5)] provide the evidence of the perception reality ahead of the robot, and therefore are determinant in choosing one expected situation from the list given in Table 2. In particular, the two activation modes disclosed above were defined: high activation and low activation, whereby when $\text{SUM}_{ij} \geq \|0.4 \cdot \overline{\text{OM}}\|$ said group of cells is classified as high-activated [cf. formula (16)], and when $\text{SUM}_{ij} \geq \|0.2 \cdot \overline{\text{OM}}\|$ and $< \|0.4 \cdot \overline{\text{OM}}\|$ said sub-volume is classified as low-activated [cf. formula (17)]. In physical terms, high activation represents a strong evidence of feature existence (canopy and supporting structure), whereas low activation implies a weaker evidence and thus major uncertainty in the identification of guidance patterns.

High activation $\delta_{ij}^H \Leftrightarrow om_{ij} \geq \|0.4 \cdot \overline{\text{OM}}\|$ (16)

Low activation $\delta_{ij}^L \Leftrightarrow om_{ij} \geq \|0.2 \cdot \overline{\text{OM}}\|$ (17)

The activation of each group of cells (i,j) ($\text{om}_{ij}$) correlates with the number of data points (and hence, the perception of objects) obtained in the sub-volume of the rectangular cuboid volume bounded by the dimensions of said group of cells in the x-axis and y-axis and having a height of $Z_{max} - Z_{min}$ metres along the z-axis. Thus, for a sub-volume in which a large number of data points is obtained the corresponding group of cells is classified as high-activated (as per the definition above), whereas for a sub-volume in which a moderate number of data points is obtained, the corresponding group of cells is classified as low-activated (as per the definition above), whereas for a sub-volume in which no or few data points are obtained (i.e. $\text{SUM}_{ij} < \|0.2 \cdot \overline{\text{OM}}\|$) the corresponding group of cells is not classified as activated.

Step (vii) Comprises the Robot Moving:
(a) through a plane defined by said y-axis and said x-axis towards a target point $P_t$ placed ahead of the robot, on the centerline parallel to the detected left row and separated from it by a distance Q/2:
when out of the set $S_R$ consisting of the groups of cells (1,1), (2,1), (3,1) and (1,2):
$\text{om}_{11}$ is high-activated, or
$\text{om}_{11}$ is high-activated and $\text{om}_{21}$ is low-activated, or
$\text{om}_{11}$ is low-activated and $\text{om}_{21}$ is high-activated, or
$\text{om}_{21}$ is low-activated, or
$\text{om}_{21}$ is low-activated and $\text{om}_{31}$ is low-activated, or
$\text{om}_{31}$ is low-activated, or
$\text{om}_{12}$ is low-activated and $\text{om}_{21}$ is high-activated,
and no other group of cells in said set $S_R$ or the groups of cells (2,2) or (3,2) is activated; or
(b) through a plane defined by said y-axis and said x-axis towards a target point $P_t$ placed ahead of the robot, on the centerline parallel to the detected right row and separated from it by a distance Q/2:
when out of the set $S_L$ consisting of the groups of cells (1,2), (2,2), (3,2) and (1,1):
$\text{om}_{12}$ is high-activated, or
$\text{om}_{12}$ is high-activated and $\text{om}_{22}$ is low-activated, or
$\text{om}_{12}$ is low-activated and $\text{om}_{22}$ is high-activated, or
$\text{om}_{22}$ is low-activated, or
$\text{om}_{22}$ is low-activated and $\text{om}_{32}$ is low-activated, or
$\text{om}_{32}$ is low-activated, or
$\text{om}_{11}$ is low-activated and $\text{om}_{22}$ is high-activated,
and no other group of cells in said set $S_L$ or the groups of cells (2,1) or (3,1) is activated; or
(c) through a plane defined by said y-axis and said x-axis towards a target point $P_t$ placed ahead of the robot, on the centerline equidistant to both detected rows:
when out of the set $S_R$ consisting of the groups of cells (1,1), (2,1), (3,1) and (1,2):
$\text{om}_{11}$ is high-activated, or
$\text{om}_{11}$ is high-activated and $\text{om}_{21}$ is low-activated, or
$\text{om}_{11}$ is low-activated and $\text{om}_{21}$ is high-activated, or
$\text{om}_{21}$ is low-activated, or
$\text{om}_{21}$ is low-activated and $\text{om}_{31}$ is low-activated, or
$\text{om}_{31}$ is low-activated, or $om_{12}$ is low-activated and $om_{21}$ is high-activated, and no other group of cells in said set $S_R$ or the groups of cells (2,2) or (3,2) is activated; and when out of the set $S_L$ consisting of the groups of cells (1,2), (2,2), (3,2) and (1,1):

$om_{12}$ is high-activated, or $om_{12}$ is high-activated and $om_{22}$ is low-activated, or $om_{12}$ is low-activated and $om_{22}$ is high-activated, or $om_{22}$ is low-activated, or $om_{22}$ is low-activated and $om_{32}$ is low-activated, or $om_{32}$ is low-activated, or $om_{11}$ is low-activated, $om_{22}$ is high-activated, and no other group of cells in said set $S_L$ or the groups of cells (2,1) or (3,1) is activated.

Step (vii) describes three situations (a) to (c), wherein the robot turns to travel towards the target point $P_t$ which is calculated from detected left row (situation a), detected right row (situation b) or both detected rows (situation c) in response to particular groups of cells within two sets of groups of cells, $S_R$ and $S_L$ being activated. Each situation (a) to (c) respectively corresponds with the perception situations 1 to 3 of Table 2, which also discloses the outcome.

TABLE 2

Perception situations and outcomes

| Situation | Description | Outcome |
| --- | --- | --- |
| 0 | No features: perception error | Halt robot and send warning |
| 1 = (c) | Both left and right rows are detected | Robot turns to calculated target point $P_t$ |
| 2 = (a) | Left row is detected | Robot turns to calculated target point $P_t$ |
| 3 = (b) | Right row is detected | Robot turns to calculated target point $P_t$ |
| 10 | Too close to left row | Severe correction to right |
| 11 | Too close to right row | Severe correction to left |

Each situation involves particular groups of cells from each set of groups of cells being activated, whereby seven possible conditions of activation may result in detection of the left row (situation a, cf. Table 3), detection of the right row (situation b, cf. Table 4), or detection of the left and right rows (situation c). When robot moves forwardly, it is continuously exerting small left and right correction towards the target point $P_t$, located ahead of the robot and on the centerline which is Q/2 metres to the right of left detected row, Q/2 metres to the left of right detected row or equidistant between both detected rows according to whether situation (2), situation (3) or situation (1) is identified, respectively.

TABLE 3

Individual conditions (C1 to C7) of groups of cells (1, 1), (2, 1), (3, 1) and (1, 2) (corresponding to elements of $om_{11}$, $om_{21}$, $om_{31}$ and $om_{12}$ of the occupancy matrix) activating situation 2

| Group of cells | Individual conditions of group of cells | | | | | | |
| --- | --- | --- | --- | --- | --- | --- | --- |
| ($om_{ij}$) | C 1 | C2 | C 3 | C 4 | C 5 | C 6 | C 7 |
| $om_{11}$ | $\delta^L_{11}$ | | $\delta^H_{11}$ | | | $\delta^H_{11}$ | |
| $om_{21}$ | $\delta^H_{21}$ | $\delta^H_{21}$ | $\delta^L_{21}$ | $\delta^L_{21}$ | | | $\delta^L_{21}$ |
| $om_{31}$ | | | | $\delta^L_{31}$ | $\delta^L_{31}$ | | |
| $om_{12}$ | | $\delta^L_{12}$ | | | | | |

$\delta^H$ = high-activated
$\delta^L$ = low-activated

TABLE 4

Individual conditions (C1 to C7) of groups of cells (1, 1), (1, 2), (2, 2) and (3, 2) (corresponding to elements of $om_{11}$, $om_{12}$, $om_{22}$ and $om_{32}$ of the occupancy matrix) activating situation 3

| Group of cells | Individual conditions of group of cells | | | | | | |
| --- | --- | --- | --- | --- | --- | --- | --- |
| ($om_{ij}$) | C 1 | C 2 | C 3 | C 4 | C 5 | C 6 | C 7 |
| $om_{11}$ | | $\delta^L_{11}$ | | | | | |
| $om_{12}$ | $\delta^L_{12}$ | | $\delta^H_{12}$ | | | $\delta^H_{12}$ | |
| $om_{22}$ | $\delta^H_{22}$ | $\delta^H_{22}$ | $\delta^L_{22}$ | $\delta^L_{22}$ | | | $\delta^L_{22}$ |
| $om_{32}$ | | | | $\delta^L_{32}$ | $\delta^L_{32}$ | | |

$\delta^H$ = high-activated
$\delta^L$ = low-activated

Note that situation 0 of Table 2 equates with the absence of perception (in other words, no objects, including rows are detected) which is an indicator of a failure in the perception system (all sensors failing) or the possibility of the robot getting out of the field by mistake, or even large unexpected gaps at both side rows (e.g. when there are many vines dead) which are longer than $Y_{max}$–0 metres. In any case, situation 0 is only triggered when the whole grid is considered and only 6 or less cells are occupied by data points (i.e. $\Gamma(h,v)$ is 1 or more for 6 or less cells). Thus, from a practical standpoint, the occupancy matrix OM is considered empty in situation 0, allowing for occasional momentary noise, with less than a value of one ($om_{ij}$=1) per operational zone in average, i. e., less than a sum of six for the entire grid, as mathematically defined in formula (18).

$$\Sigma_{i=1}^{3}\Sigma_{j=1}^{2}om_{ij} \leq 6 \qquad (18)$$

Under such circumstances, the space ahead of the robot is considered empty and no automated navigation is possible. Therefore, preferably at least 1 cell (on average) should be occupied per group of cells (i,j) ($om_{ij}$), amounting to a total of at least 6 cells, one from each of the 6 regions $om_{ij}$. Independent groups of cells (i,j) are never used to detect situation 0, but independent groups of cells (i,j) are used to identify all the other situations mentioned in Table 2. In any case, situation 0 is unstable and requires stopping the robot motion.

Situation 1, which is the most desired in terms of stability, occurs when both situations 2 and 3 are simultaneously activated, as determined by Tables 3 and 4. For between-rows guidance purposes, only situations 1, 2, and 3 are valid, as these are the ones used to calculate the target point (where the robot is directed to), which optionally determines the steering angle sent to the front wheels. Situations 10 and 11, by contrast, indicate a potential collision risk whose anticipation requires a sharp reaction with no need of knowing the ideal position for the target point, obviously without value in such circumstances. The activation of situations 10 and 11 combines information from the occupancy matrix—just like the operations firing situations 2 and 3—with lidar and sonar specific constraints.

In a preferred embodiment of the method and system of the present invention, step (vii) also comprises calculating for each group of cells (i,j) ($om_{ij}$) for which $SUM_{ij} \geq 1$, an expected row position value, $L_{ij}$, according to the following formula (2):

$$L_{ij} = \|X_G/J_G - M_{ij}/SUM_{ij}\| \qquad (2)$$

wherein $M_{ij}$, is the sum of t values of all cells in said group of cells which have a coordinate with the same h value, wherein said t values are calculated according to the following formula (3):

$$t = (\|X_G/J_G\| - h) \cdot CUM_{ij}(h) \quad (3)$$

wherein:
(a) when the robot moves through a plane defined by said y-axis and said x-axis by turning towards the target point $P_t$ which is Q/2 metres to the right of row boundary $RB_L$ at a distance of $Y_{max} \cdot r$ metres from O, wherein:
  $RB_L$ is the weighted average $L_{ij}$ of the groups of cells (i,j) which have a coordinate with the j value of 1; and
  r is between 0.5 and 0.9;
(b) when the robot moves through a plane defined by said y-axis and said x-axis by turning towards the target point $P_t$ which is Q/2 metres to the left of row boundary $RB_R$ at a distance of $Y_{max} \cdot r$ metres from O, wherein:
  $RB_R$ is the weighted average $L_{ij}$ of the groups of cells (i,j) which have a coordinate with the j value of 2;
(c) when the robot moves through a plane defined by said y-axis and said x-axis by turning towards the target point $P_t$ which is placed equidistant between $RB_L$ and $RB_R$. Thus, $P_t$ is identified by a coordinate comprising a first number, $x_t$, and a second number, $y_t$, wherein $y_t = Y_{max} \cdot r$ and $x_t$ is Q/2 metres to the right of row boundary $RB_L$, Q/2 metres to the left of row boundary $RB_R$ or equidistant between $RB_L$ and $RB_R$ according to whether situation (2), situation (3) or situation (1) is identified, respectively.

When $SUM_{ij} \geq 1$ for a given group of cells (i,j) ($om_{ij}$), the expected row position value, $L_{ij}$, can be calculated therefor. Thus, each operational zone with the proper filling of its cells will lead to an estimated line position $L_{ij}$, as graphically represented in FIG. 4, whereby the particular section of the line $L_{ij}$ that intervenes in the calculation of $P_t(x_t, y_t)$ depends on the activation of specific $om_{ij}$. Said expected row position is an estimate of the row position calculated according to formula (2). In formula (2), $X_G$, $J_G$ and $SUM_{ij}$ are as defined previously, and $M_{ij}$ is the moment calculated as per formula (3). Each expected row position value, $L_{ij}$, is subsequently used to calculate a left row boundary $RB_L$ and a right row boundary $RB_R$, wherein the left row boundary $RB_L$ is the weighted average $L_{ij}$ of the groups of cells (i,j) which have a coordinate with the j value of 1 and the right row boundary $RB_R$ is the weighted average $L_{ij}$ of the groups of cells (i,j) which have a coordinate with the j value of 2.

By way of example, the expression for the first zone $M_{11}$ is given in formula (19), the rest of the moments $M_{ij}$ for the rest of $om_{ij}$ being easily deducible using the same geometry as used in formula (14) and in the aforementioned preferred embodiment for step (iv) wherein $M_{ij}$ is calculated.

$$M_{11} = \sum_{h=1}^{\|X_G/2\|} (( \|X_G/2\| - h ) \cdot CUM_{11}(h)) \quad (19)$$

The objective of calculating moments is in detecting the highest likelihood, within operational groups, $om_{ij}$, of locating vegetation rows based on perceptual evidence. Taking into account that the algorithm expects parallel rows ahead of the vehicle, each zone resulted in one expected placement for the section of the row given by function L and defined in formula (2) and, in more detail for both the left and right side of the field of view, in formula (20). The alignment of $L_{ij}$ in well-populated zones was an indication of reliable perception and thus led to stable estimations of the target point. Misalignments and scarce filling of the grid anticipated complex navigation scenarios. Some examples of the calculation process until the estimation of the position of the rows given by function L is shown in FIG. 3. The morphology of the occupancy matrix OM thus resulted in the definition of the six perception situations enunciated in Table 2.

$$L_{ij} \stackrel{def}{=} \begin{cases} L_{i1} = \left\| \frac{X_G}{2} - \frac{M_{i1}}{SUM_{i1}} \right\| \\ L_{i2} = \left\| \frac{X_G}{2} + \frac{M_{i2}}{SUM_{i2}} \right\| \end{cases} ; i = 1, 2, 3; j = 1, 2; SUM_{ij} \neq 0 \quad (20)$$

When any of the seven conditions of the situation of step (viii)(a) (i.e. situation 2) is identified by the robot, the robot moves through a plane defined by said y-axis and said x-axis by turning-towards a point $P_t$ which is Q/2 metres to the right of the left row boundary $RB_L$ at a distance of $Y_{max} \cdot r$ metres from O, wherein r is between 0.5 and 0.9. Conversely, when any of the seven conditions of the situation of step (viii)(b) (i.e. situation 3) is identified by the robot, the robot moves through a plane defined by said y-axis and said x-axis by turning towards a point $P_t$ which is Q/2 metres to the left of the right row boundary $RB_R$ at said distance of $Y_{max} \cdot r$ metres from O. On the other hand, when any of the seven conditions of the situation of step (viii)(a) and any of the seven conditions of the situation of step (viii)(b) (i.e. situation 1) are identified by the robot, the robot moves straight ahead with mild turning, towards a point $P_t$ which is placed equidistant between $RB_L$ and $RB_R$. Thus, situations 2 and 3 (cf. Table 2) only perceive one of the guiding rows, and therefore are forced to position the target point displaced half the row spacing from the detected row boundary $RB_L$ or $RB_R$. Situation 1, on the contrary, locates both guiding lines within the APOM, and $P_t$ will reside in the geometrical locus that is equidistant from both estimated row boundaries (12).

Furthermore, in an especially preferred embodiment the present invention relates to a method for autonomous navigation of a robot between two rows of plants spaced Q metres apart, wherein said robot comprises two sensing devices, sensor A and sensor B, mounted at a position O thereon and moves forward along a y-axis being autonomously steered by exerting angular corrections to place the robot as close as possible to the centerline, wherein each sensing device is a device which detects electromagnetic waves or detects sound waves, and wherein sensor A is a multi-beam lidar and sensor B is a stereoscopic or time-of-flight 3D camera, and wherein said y-axis is a horizontal axis and said x-axis is a horizontal axis perpendicular to said y-axis, and wherein said method comprises the following steps:
(i) defining a two-dimensional grid of square cells in said plane, wherein said grid is $X_G$ cells in width and $Y_G$ cells in length, and said cells have sides of length c, wherein:
  (a) said width extends horizontally $|X_{min}|$ metres away from O to the left along said x-axis and horizontally $X_{max}$ metres away from O to the right along said x-axis; and (b) said length extends horizontally $Y_{max}$ metres away from O along said y-axis; wherein:

$X_{min} = -X_{G \cdot C}/2$;

$X_{max} = X_{G \cdot C}/2$;

$Y_{max} = Y_{G \cdot C}$;

$X_G$ is a whole number selected from between 30 and 60;
$Y_G$ is a whole number selected from between 60 and 100; and
c is a number selected from between 0.05 and 0.2 m; and (c) each cell (h,v) is assigned a coordinate comprising a first number, h, and a second number, v, wherein h is a number from 1 to $X_G$ and v is a number from 1 to $Y_G$, wherein:

$h = h' + 1$; and $v = v' + 1$;

wherein:
h' is the number of said cells, counted along said x-axis starting from the left-most cell, which separate said cell (h,v) from the outside of said two-dimensional grid; and
v' is the number of said cells, counted along said y-axis starting from the cell that is most remote from said robot, which separate said cell (h,v) from the outside of said two-dimensional grid;

(ii) dividing the two-dimensional grid of square cells into $I_G \cdot J_G$ groups of cells, wherein each group is $X_G/J_G$ cells in width and $Y_G/I_G$ cells in length, wherein:
(a) $I_G$ is 3;
(b) $J_G$ is 2; and
(c) each group of cells (i,j) ($om_{ij}$) is assigned a coordinate comprising a first number, i, and a second number, j, wherein i is a number from 1 to $I_G$ and j is a number from 1 to $J_G$, wherein $i = i' + 1$, and $j = j' + 1$, wherein:
i' is the number of said groups of cells, counted along said y-axis starting from the group of cells that is most remote from said robot, which separate said group of cells from the outside of said two-dimensional grid; and
j' is the number of said groups of cells, counted along said x-axis starting from the left-most group of cells, which separate said group of cells (i,j) ($om_{ij}$) from the outside of said two-dimensional grid;

(iii) obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max} - Z_{min}$ metres along a z-axis, wherein said z-axis is a vertical axis perpendicular to said x-axis and said y-axis, and said surface is the surface of an object, wherein:
$Z_{min}$ is a value selected from −0.5 to 0.5 metres;
$Z_{max}$ is a value selected from 1 to 5 metres;
wherein:
(a) each data point obtained using sensor A is assigned a coordinate comprising a first number, $x^L$, and a second number, $y^L$ wherein:

$x^L$ is the distance along the x-axis from said data point to O; and
$y^L$ is the distance along the y-axis from said data point to O,
wherein the coordinate of position O is (0,0); and (b) each data point obtained using sensor B is assigned a coordinate comprising a first number, $x^V$, and a second number, $y^V$ wherein:
$x^V$ is the distance along the x-axis from said data point to O; and
$y^V$ is the distance along the y-axis from said data point to O, wherein the coordinate of position O is (0,0);

(iv) converting each data point into a discretized data point, wherein:
(a) data point ($x^L, y^L$) is converted to a discretized data point ($L_V, L_H$), according to the following formulae:

$L_V = \|y^L/C\|$; and $L_H = \|(x^L - X_{min})/C\|$;

(b) data point ($x^V, y^V$) is converted to a discretized data point ($V_V, V_H$) according to the following formulae:

$V_V = \|y^V/C\|$; and $V_H = \|(x^V - X_{min})/C\|$;

(v) calculating a fusion function value, $\Gamma(h,v)$, for each cell (h,v) of said two-dimensional grid according to the following formula (1):

$$\Gamma(h,v) = K_V \cdot \gamma^V(V_V, V_H) + K_L \cdot \gamma^L(L_V, L_H) \quad (1)$$

wherein:
$K_L$ is a non-negative integer selected from between 0 and 5;
$\gamma^L(L_V, L_H)$ is the whole number $D_N(L_H, L_V)$ of discretized data points ($L_V, L_H$) for which $L_V = v$ and $L_H = h$;
$K_V$ is a non-negative integer selected from between 0 and 5;
$\gamma^V(V_V, V_H)$ is:
1 when $D_N(V_H, V_V) > TH_V \cdot D_N(V_H, V_V)max$; or
0 when $D_N(V_H, V_V) \leq TH_V \cdot D_N(V_H, V_V)max$
wherein $D_N(V_H, V_V)$ is:
the whole number of discretized data points ($V_V, V_H$) when $V_{V \cdot C} \leq 3$; or
a whole number calculated from the number of discretized data points ($V_V, V_H$) for which $V_V = v$, $V_H = h$ and $V_{V \cdot C} > 3$, multiplied by ($V_{V \cdot C}/3)^2$;
and wherein:
$TH_V$ is a threshold value, wherein $0 \leq TH_V \leq 1$; and
$D_N(V_H, V_V)max$ is the maximum value of $D_N(V_H, V_V)$ determined for any cell (h,v) in said two-dimensional grid;

(vi) calculating for each group of cells (i,j) ($om_{ij}$):
(a) the cumulative total of fusion function values, $CUM_{ij}(h)$, of all cells in said group of cells which have a coordinate with the same h value; and
(b) the sum of all cumulative totals of fusion function values, $SUM_{ij}$, in said group of cells; and
(c) when $SUM_{ij} \geq 1$, an expected row position value, $L_{ij}$, according to the following formula (2):

$$L_{ij} = \|X_G/J_G - M_{ij}/SUM_{ij}\| \quad (2)$$

wherein $M_{ij}$, is the sum of t values of all cells in said group of cells which have a coordinate with the same h value, wherein said t values are calculated according to the following formula (3):

$$t = (\|X_G/J_G\| - h) \cdot CUM_{ij}(h) \qquad (3)$$

wherein when:
SUM$_{ij} \geq \|0.4 \cdot \overline{OM}\|$ said group of cells is classified as high-activated; and
SUM$_{ij} \geq \|0.2 \cdot \overline{OM}\|$ and $< \|0.4 \cdot \overline{OM}\|$ said sub-volume is classified as low-activated,
wherein OM is the maximum SUM$_{ij}$ value determined for any group of cells (i,j) (om$_{ij}$) in said two-dimensional grid;
wherein
(vii) the robot moves:
(a) through a plane defined by said y-axis and said x-axis:
when out of the set $S_R$ consisting of the groups of cells (1,1), (2,1), (3,1) and (1,2):
om$_{11}$ is high-activated, or
om$_{11}$ is high-activated and om$_{21}$ is low-activated, or
om$_{11}$ is low-activated and om$_{21}$ is high-activated, or
om$_{21}$ is low-activated, or
om$_{21}$ is low-activated and om$_{31}$ is low-activated, or
om$_{31}$ is low-activated, or
om$_{12}$ is low-activated and om$_{21}$ is high-activated, and no other group of cells in said set $S_R$ or the groups of cells (2,2) or (3,2) is activated; or
(b) through a plane defined by said y-axis and said x-axis:
when out of the set $S_L$ consisting of the groups of cells (1,2), (2,2), (3,2) and (1,1):
om$_{12}$ is high-activated, or
om$_{12}$ is high-activated and om$_{22}$ is low-activated, or
om$_{12}$ is low-activated and om$_{22}$ is high-activated, or
om$_{22}$ is low-activated, or
om$_{22}$ is low-activated and om$_{32}$ is low-activated, or
om$_{32}$ is low-activated, or
om$_{11}$ is low-activated and om$_{22}$ is high-activated, and no other group of cells in said set $S_L$ or the groups of cells (2,1) or (3,1) is activated; or
(c) through a plane defined by said y-axis and said x-axis:
when out of the set $S_R$ consisting of the groups of cells (1,1), (2,1), (3,1) and (1,2):
om$_{11}$ is high-activated, or
om$_{11}$ is high-activated and om$_{21}$ is low-activated, or
om$_{11}$ is low-activated and om$_{21}$ is high-activated, or
om$_{21}$ is low-activated, or
om$_{21}$ is low-activated and om$_{31}$ is low-activated, or
om$_{31}$ is low-activated, or
om$_{12}$ is low-activated and om$_{21}$ is high-activated, and no other group of cells in said set $S_R$ or the groups of cells (2,2) or (3,2) is activated; and
when out of the set $S_L$ consisting of the groups of cells (1,2), (2,2), (3,2) and (1,1):
om$_{12}$ is high-activated, or
om$_{12}$ is high-activated and om$_{22}$ is low-activated, or
om$_{12}$ is low-activated and om$_{22}$ is high-activated, or
om$_{22}$ is low-activated, or
om$_{22}$ is low-activated and om$_{32}$ is low-activated, or
om$_{32}$ is low-activated, or
om$_{11}$ is low-activated, om$_{22}$ is high-activated, and no other group of cells in said set $S_L$ or the groups of cells (2,1) or (3,1) is activated,
wherein:
(a) when the robot moves through a plane defined by said y-axis and said x-axis by turning towards the target point $P_t$ which is Q/2 metres to the right of row boundary RB$_L$ at a look-ahead distance of $Y_{max} \cdot r$ metres from O, wherein:
RB$_L$ is the weighted average $L_{ij}$ of the groups of cells (i,j) which have a coordinate with the j value of 1; and
r is between 0.5 and 0.9;
(b) when the robot moves through a plane defined by said y-axis and said x-axis by turning towards the target point $P_t$ which is Q/2 metres to the left of row boundary RB$_R$ at a look-ahead distance of $Y_{max} \cdot r$ metres from O, wherein:
RB$_R$ is the weighted average $L_{ij}$ of the groups of cells (i,j) which have a coordinate with the j value of 2;
(c) when the robot moves through a plane defined by said y-axis and said x-axis by turning towards the target point $P_t$ which is placed equidistant between RB$_L$ and RB$_R$.

Likewise, in an especially preferred embodiment, the present invention also relates to a system for autonomous navigation of a robot between two rows of plants spaced Q metres apart, wherein said robot comprises two sensing devices, sensor A and sensor B, mounted at a position O thereon and moves forward along a y-axis being autonomously steered by exerting angular corrections to place the robot as close as possible to the centerline, wherein each sensing device is a device which detects electromagnetic waves or detects sound waves, and wherein sensor A is a multi-beam lidar and sensor B is a stereoscopic or time-of-flight 3D camera, and wherein said y-axis is a horizontal axis and said x-axis is a horizontal axis perpendicular to said y-axis, and wherein said system comprises the following:
(i) means for defining a two-dimensional grid of square cells in said plane, wherein said grid is $X_G$ cells in width and $Y_G$ cells in length, and said cells have sides of length c, wherein:
(a) said width extends horizontally $|X_{min}|$ metres away from O to the left along said x-axis and horizontally $X_{max}$ metres away from O to the right along said x-axis; and
(b) said length extends horizontally $Y_{max}$ metres away from O along said y-axis;
wherein:

$X_{min} = -X_G \cdot c/2;$ $X_{max} = X_G \cdot c/2;$ $Y_{max} = Y_G \cdot c;$ $X_G$ is a whole number selected from between 30 and 60;
$Y_G$ is a whole number selected from between 60 and 100; and
c is a number selected from between 0.05 and 0.2 m; and
(c) each cell (h,v) is assigned a coordinate comprising a first number, h, and a second number, v, wherein h is a number from 1 to $X_G$ and v is a number from 1 to $Y_G$, wherein:

$h = h'+1$; and $v = v'+1$;

wherein:
  h' is the number of said cells, counted along said x-axis starting from the left-most cell, which separate said cell (h,v) from the outside of said two-dimensional grid; and
  v' is the number of said cells, counted along said y-axis starting from the cell that is most remote from said robot, which separate said cell (h,v) from the outside of said two-dimensional grid;
(ii) means for dividing the two-dimensional grid of square cells into $I_G \cdot J_G$ groups of cells, wherein each group is $X_G/J_G$ cells in width and $Y_G/I_G$ cells in length, wherein:
  (a) $I_G$ is 3;
  (b) $J_G$ is 2; and
  (c) each group of cells (i,j) ($om_{ij}$) is assigned a coordinate comprising a first number, i, and a second number, j, wherein i is a number from 1 to $I_G$ and j is a number from 1 to $J_G$, wherein $i = i'+1$, and $j = j'+1$, wherein:
  i' is the number of said groups of cells, counted along said y-axis starting from the group of cells that is most remote from said robot, which separate said group of cells from the outside of said two-dimensional grid; and
  j' is the number of said groups of cells, counted along said x-axis starting from the left-most group of cells, which separate said group of cells (i,j) ($om_{ij}$) from the outside of said two-dimensional grid;
(iii) means for obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max} - Z_{min}$ metres along a z-axis, wherein said z-axis is a vertical axis perpendicular to said x-axis and said y-axis, and said surface is the surface of an object, wherein:
  $Z_{min}$ is a value selected from -0.5 to 0.5 metres;
  $Z_{max}$ is a value selected from 1 to 5 metres;
wherein:
  (a) each data point obtained using sensor A is assigned a coordinate comprising a first number, $x^L$, and a second number, $y^L$ wherein:
    $x^L$ is the distance along the x-axis from said data point to O; and
    $y^L$ is the distance along the y-axis from said data point to O, wherein the coordinate of position O is (0,0); and
  (b) each data point obtained using sensor B is assigned a coordinate comprising a first number, $x^V$, and a second number, $y^V$ wherein:
    $x^V$ is the distance along the x-axis from said data point to O; and
    $y^V$ is the distance along the y-axis from said data point to O,
  wherein the coordinate of position O is (0,0);
(iv) means for converting each data point into a discretized data point, wherein:
  (a) data point ($x^L, y^L$) is converted to a discretized data point ($L_V, L_H$), according to the following formulae:

$L_V = \|y^L/C\|$; and $L_H = \|(x^L - X_{min})/C\|$;

(b) data point ($x^V, y^V$) is converted to a discretized data point ($V_V, V_H$) according to the following formulae:

$V_V = \|y^V/C\|$; and $V_H = \|(x^V - X_{min})/C\|$;

(v) means for calculating a fusion function value, $\Gamma(h,v)$, for each cell (h,v) of said two-dimensional grid according to the following formula (1):

$$\Gamma(h,v) = K_V \cdot \gamma^V(V_V, V_H) + K_L \cdot \gamma^L(L_V, L_H) \qquad (1)$$

wherein:
  $K_L$ is a non-negative integer selected from between 0 and 5;
  $\gamma^L(L_V, L_H)$ is the whole number $D_N(L_H, L_V)$ of discretized data points ($L_V, L_H$) for which $L_V = v$ and $L_H = h$
  $K_V$ is a non-negative integer selected from between 0 and 5;
  $\gamma^V(V_V, V_H)$ is:
    1 when $D_N(V_H, V_V) > TH_V \cdot D_N(V_H, V_V)max$; or
    0 when $D_N(V_H, V_V) \leq TH_V \cdot D_N(V_H, V_V)max$
    wherein $D_N(V_H, V_V)$ is:
      the whole number of discretized data points ($V_V, V_H$) when $V_{V \cdot C} \leq 3$; or
      a whole number calculated from the number of discretized data points ($V_V, V_H$) for which $V_V = v$, $V_H = h$ and $V_{V \cdot C} > 3$, multiplied by $(V_{V \cdot C}/3)^2$;
    and wherein:
      $TH_V$ is a threshold value, wherein $0 \leq TH_V \leq 1$; and
      $D_N(V_H, V_V)max$ is the maximum value of $D_N(V_H, V_V)$ determined for any cell (h,v) in said two-dimensional grid;
(vi) means for calculating for each group of cells (i,j) ($om_{ij}$):
  (a) the cumulative total of fusion function values, $CUM_{ij}(h)$, of all cells in said group of cells which have a coordinate with the same h value; and
  (b) the sum of all cumulative totals of fusion function values, $SUM_{ij}$, in said group of cells; and
  (c) when $SUM_{ij} \geq 1$, an expected row position value, $L_{ij}$, according to the following formula (2):

$$L_{ij} = X_G/J_G - M_{ij}/SUM_{ij}\| \qquad (2)$$

wherein $M_{ij}$ is the sum of t values of all cells in said group of cells which have a coordinate with the same h value, wherein said t values are calculated according to the following formula (3):

$$t = (\|X_G/J_G\| - h) \cdot CUM_{ij}(h) \qquad (3)$$

wherein when:
  $SUM_{ij} \geq \|0.4 \cdot \overline{OM}\|$ said group of cells is classified as high-activated; and
  $SUM_{ij} \geq \|0.2 \cdot \overline{OM}\|$ and $< \|0.4 \cdot \overline{OM}\|$ said sub-volume is classified as low-activated, wherein $\overline{OM}$ is the maximum $SUM_{ij}$ value determined for any group of cells (i,j) ($om_{ij}$) in said two-dimensional grid;

wherein (vii) means for moving the robot, wherein the robot moves:

(a) through a plane defined by said y-axis and said x-axis;

when out of the set $S_R$ consisting of the groups of cells (1,1), (2,1), (3,1) and (1,2):

$om_{11}$ is high-activated, or $om_{11}$ is high-activated and $om_{21}$ is low-activated, or $om_{11}$ is low-activated and $om_{21}$ is high-activated, or $om_{21}$ is low-activated, or $om_{21}$ is low-activated and $om_{31}$ is low-activated, or $om_{31}$ is low-activated, or $om_{12}$ is low-activated and $om_{21}$ is high-activated, and no other group of cells in said set $S_R$ or the groups of cells (2,2) or (3,2) is activated; or (b) through a plane defined by said y-axis and said x-axis:

when out of the set $S_L$ consisting of the groups of cells (1,2), (2,2), (3,2) and (1,1):

$om_{12}$ is high-activated, or $om_{12}$ is high-activated and $om_{22}$ is low-activated, or $om_{12}$ is low-activated and $om_{22}$ is high-activated, or $om_{22}$ is low-activated, or $om_{22}$ is low-activated and $om_{32}$ is low-activated, or $om_{32}$ is low-activated, or $om_{11}$ is low-activated and $om_{22}$ is high-activated, and no other group of cells in said set $S_L$ or the groups of cells (2,1) or (3,1) is activated; or (c) through a plane defined by said y-axis and said x-axis:

when out of the set $S_R$ consisting of the groups of cells (1,1), (2,1), (3,1) and (1,2):

$om_{11}$ is high-activated, or $om_{11}$ is high-activated and $om_{21}$ is low-activated, or $om_{11}$ is low-activated and $om_{21}$ is high-activated, or $om_{21}$ is low-activated, or $om_{21}$ is low-activated and $om_{31}$ is low-activated, or $om_{31}$ is low-activated, or $om_{12}$ is low-activated and $om_{21}$ is high-activated, and no other group of cells in said set $S_R$ or the groups of cells (2,2) or (3,2) is activated; and when out of the set $S_L$ consisting of the groups of cells (1,2), (2,2), (3,2) and (1,1):

$om_{12}$ is high-activated, or $om_{12}$ is high-activated and $om_{22}$ is low-activated, or $om_{12}$ is low-activated and $om_{22}$ is high-activated, or $om_{22}$ is low-activated, or $om_{22}$ is low-activated and $om_{32}$ is low-activated, or $om_{32}$ is low-activated, or $om_{11}$ is low-activated, $om_{22}$ is high-activated, and no other group of cells in said set $S_L$ or the groups of cells (2,1) or (3,1) is activated, wherein:

(a) when the robot moves through a plane defined by said y-axis and said x-axis by turning towards the target point $P_t$ which is Q/2 metres to the right of row boundary $RB_L$ at a look-ahead distance of $Y_{max} \cdot r$ metres from O, wherein:

$RB_L$ is the weighted average $L_{ij}$ of the groups of cells (i,j) which have a coordinate with the j value of 1; and r is between 0.5 and 0.9;

(b) when the robot moves through a plane defined by said y-axis and said x-axis by turning towards the target point $P_t$ which is Q/2 metres to the left of row boundary $RB_R$ at a look-ahead distance of $Y_{max} \cdot r$ metres from O, wherein:

$RB_R$ is the weighted average $L_{ij}$ of the groups of cells (i,j) which have a coordinate with the j value of 2;

(c) when the robot moves through a plane defined by said y-axis and said x-axis by turning towards the target point $P_t$ which is placed equidistant between $RB_L$ and $RB_R$.

Subsequently, the onboard navigation control system calculates the front-wheel Ackerman angle θ that needs to be steered in order for the robot to reach $P_t$.

In a preferred embodiment of the method and system of the present invention, the robot additionally comprises a network of sonar sensors mounted at a position O thereon for safeguarding against collisions. Said network comprises sonar sensors which obtain at least one left range and at least one right range (i.e. the sensors detect to the left and right of position O along said x-axis, respectively) and obtain at least one front range and at least one rear range (i.e. the sensors detect to the front and rear of position O along said y-axis, respectively). Each range is a point in space at which sound is reflected from a surface within a spherical sector of radius $|X_{max}|$ metres having a cone angle of less than 45°. Thus, each left range is the point in space at which sound is reflected from a surface located to the left of said robot within such a spherical sector which is centred along the x-axis, and wherein $L_S'$ is the distance along the x-axis from said left range to O. Likewise, each right range is the point in space at which sound is reflected from a surface located to the right of said robot within such a spherical sector which is centred along the x-axis, and wherein $R_S'$ is the distance along the x-axis from said right range to O. Similarly, each front range is the point in space at which sound is reflected from a surface located to the front of said robot within such a spherical sector which is centred along the y-axis, and wherein $F_S'$ is the distance along the y-axis from said front range to O, and each rear range is the point in space at which sound is reflected from a surface located to the back of said robot within such a spherical sector which is centred along the y-axis, and wherein $B_S'$ is the distance along the y-axis from said rear range to O. In the aforementioned embodiment where $L_S'$ and $R_S'$ are determined, said method and system additionally comprise determining $L_S$ and $R_S$, wherein $L_S$ is the minimum $L_S'$, and $R_S$ is the minimum $R_S'$, and the tendency of the expression $\rho = |1 - R_S/L_S|$ is evaluated to analyse the smoothness of the ride. When there is a rapid tendency of ρ to cero, the robot is well centered in the lane between rows and corrections are tiny. However, as p increases, the navigation stability gets worse, resulting in a more wavy trajectories as the robot triggers larger steering corrections (situation 10 and 11 of Table 2). Analogously, in the aforementioned embodiment where $F_S'$ and $B_S'$ are determined, said method and system additionally comprise determining $F_S$ and $B_S$, wherein $F_S$ is the minimum $F_S'$, and $B_S$ is the minimum $B_S'$, and:

the robot stops moving forward when $F_S$ is $<F_{TH}$; or the robot stops moving backward when $B_S$ is $<B_{TH}$, wherein:

$F_{TH} = F_{TH}' + e$, wherein $F_{TH}'$ is a value selected from between 0.1 and 1 metres and e is the distance from position O to the front of the robot along the y-axis; and $B_{TH}=B_{TH}'+e'$, wherein $B_{TH}'$ is a value selected from between 0.1 and 1 metres and $e'$ is the distance from position O to the back of the robot along the y-axis.

In a preferred embodiment of the system according to the present invention:
(a) the means for:
  defining the two-dimensional grid of square cells;
  dividing the two-dimensional grid of square cells into six groups of cells;
  converting each data point into a discretized data point; and
  calculating $\Gamma(h,v)$, $\gamma^L(L_V,L_H)$, $\gamma^V(V_V,V_H)$, $CUM_{ij}(h)$ and $SUM_{ij}$, comprise a computer program product;
(b) the means for obtaining a maximum of k data points comprises sensor A and the means for obtaining m data points comprises sensor B;
(c) the means for moving the robot comprise a number of motors between 1 and 4.

The motor is preferably a machine which converts one form of energy into mechanical movement. Said motor is more preferably an electric motor or internal combustion motor comprised in said robot. Even more preferably, said motor is an electric motor, a petrol motor or a diesel motor comprised in said robot.

The computer program product may include a computer readable storage medium (or media) having computer readable program instructions thereon for causing a processor to carry out operations of the present invention and manage actuators.

The computer readable storage medium can be a tangible device that can retain and store instructions for use by an instruction execution device. The computer readable storage medium may include, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform operations of the present invention.

Aspects of the present invention are described herein with reference to flowchart illustrations and/or block diagrams of methods and systems (apparatus), according to steps and/or embodiments of the invention. It will be understood that each square or diamond-shaped block of the flowchart illustrations and/or block diagrams, and combinations of blocks in the flowchart illustrations and/or block diagrams, can be implemented by robotic techniques or computer readable program instructions, or combinations thereof.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. Thus, in a preferred embodiment, said computer program product is a computer processor.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
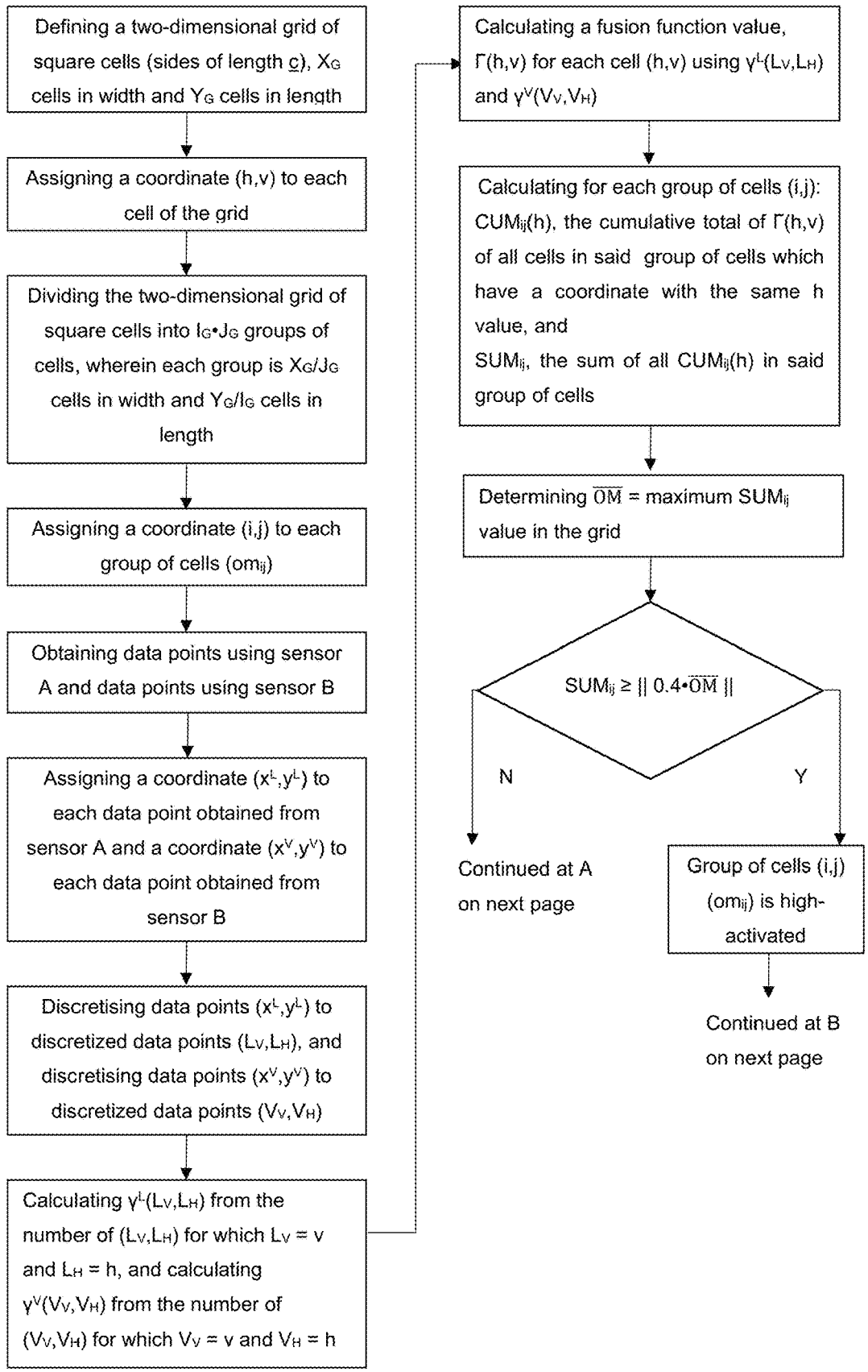
FIG. 4. Flow chart representing the method and system of the present invention for autonomous navigation of a robot between two rows of plants.
Figure 4:
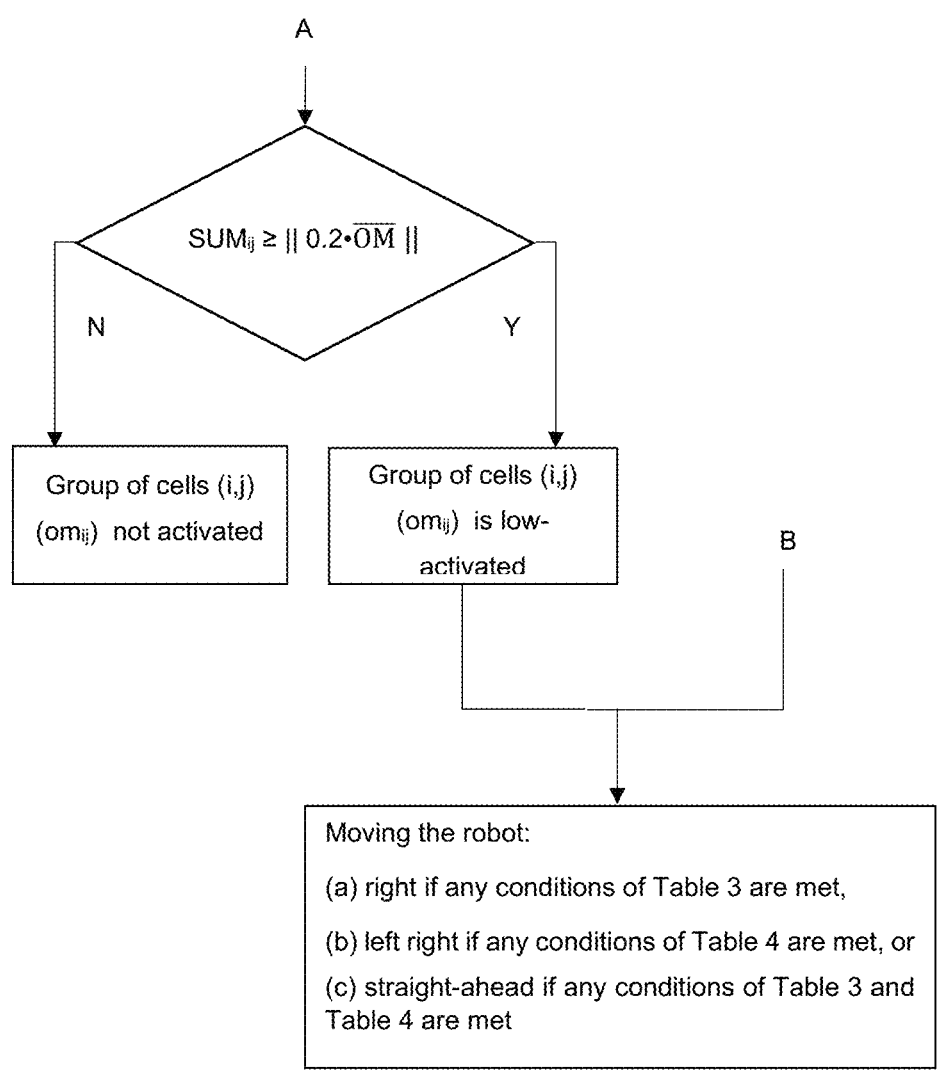
Figure 5:
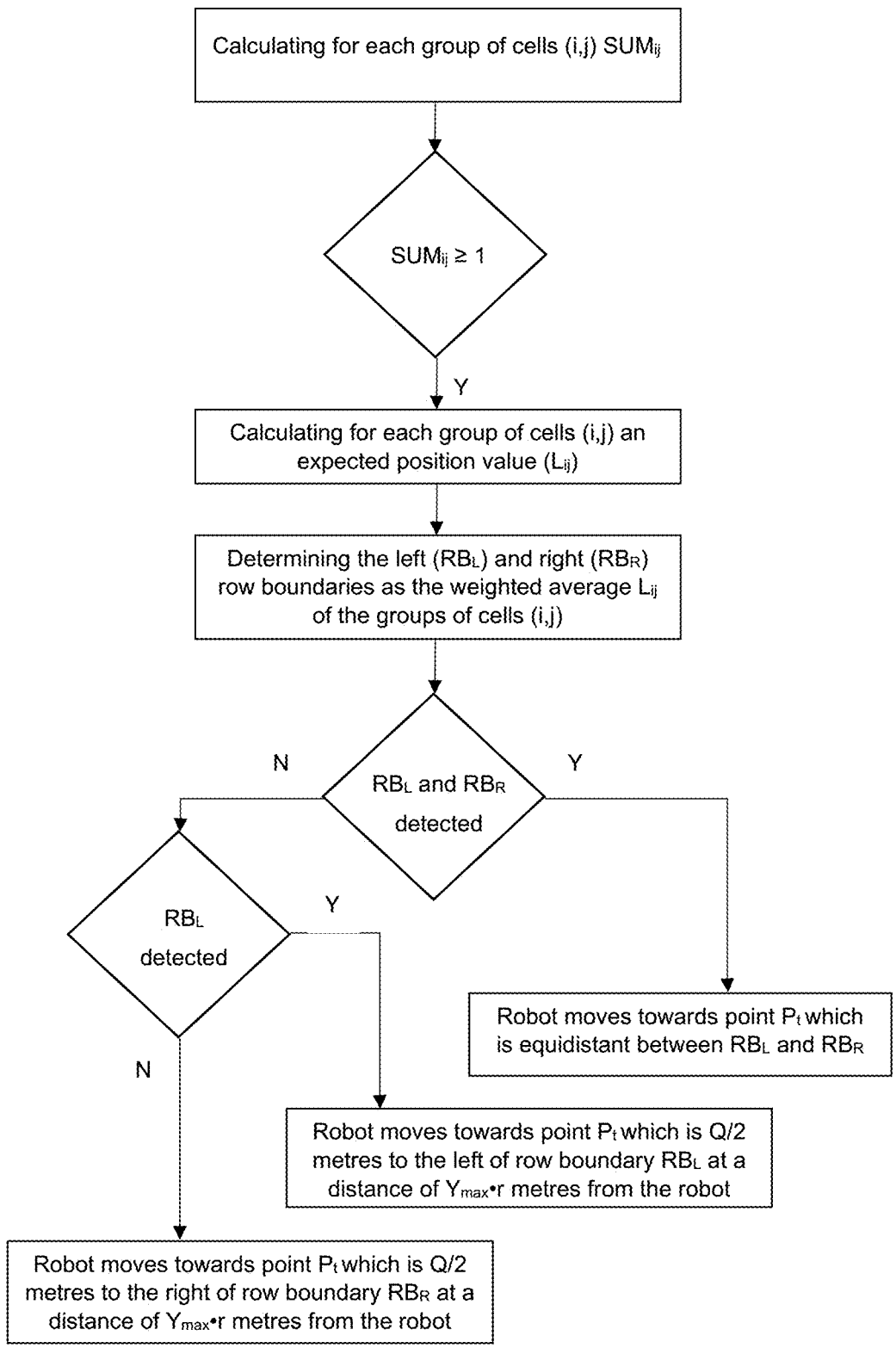
FIG. 5. Flow chart representing an embodiment of the method and system of the present invention for autonomous navigation of a robot between two rows of plants, wherein the position of $P_t$ is determined.
Figure 6:
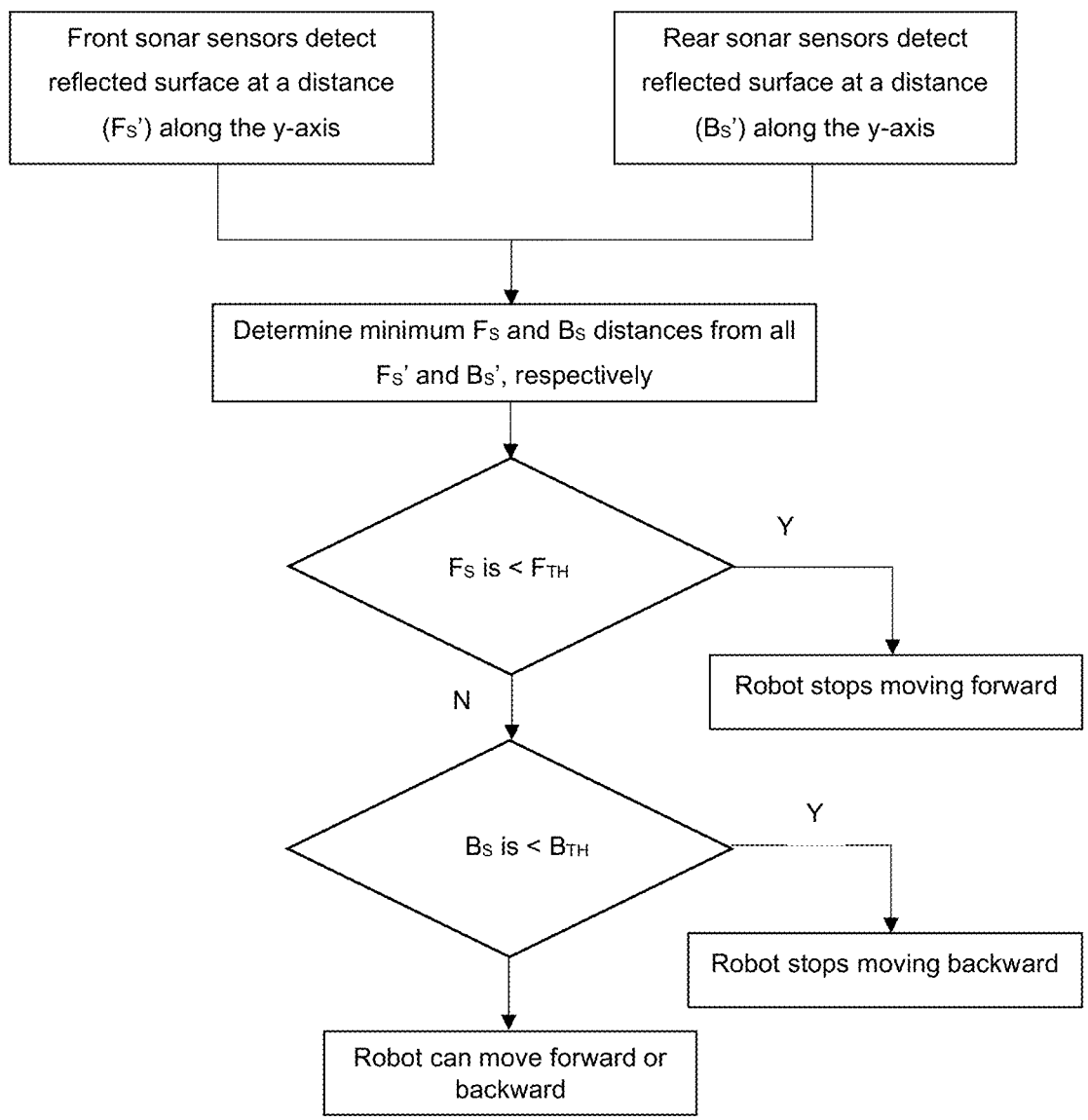
FIG. 6. Flow chart representing an embodiment of the method and system for safeguarding against collisions, wherein said collisions are front and rear collisions.

The flowchart and block diagrams in FIGS. 4 to 6 illustrate the architecture, functionality, and operation of possible implementations of systems, methods, and kits according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in said Figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention also relates to a robot, wherein said robot uses the method according to the present invention, as described herein, for navigating between two rows of plants and/or comprises the system according to the present invention, as also described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

EXAMPLES

The following examples use a robot (cf. FIG. 1) equipped with an 11-beam (multi-beam) lidar (k≤11) for sensor A and a 3D stereo camera having an image resolution of 640 pixels in the horizontal dimension by 480 pixels in the vertical dimension (m≤640×480) for sensor B. For said robot, a two-dimensional grid having dimensions of 50 cells along the x-axis, by 80 cells along the y-axis, was developed, wherein c=0.1 m, which implies an area of 5 m×8 m=40 m² covered ahead of the robot in the forward direction (cf. FIG. 2). The definition and origin of coordinates for both sensor must be the same. Notice that the lidar produces flat coordinates as it senses in a plane, whereas the 3D camera provides the three Cartesian dimensions. In this sense, the maximum dimension along the z-axis was 2.5 m.

1. Representative Examples

The upper panels of FIG. 3 shows diverse real scenarios in which the APOM has been populated with a 3D stereoscopic camera (3D vision, pale-grey cells) and a multi-beam lidar (Lidar, dark grey cells). Each grid also depicts (in white) the six lines $L_{ij}$, which represent the best estimates for the row boundaries, together with the resulting position for $P_t$ (also in white) in the grid. In the two scenes portrayed in the lower panels of FIG. 3, from which the upper panels were obtained, vine variety, soil conditions, and row spacing were different (left vineyard in Portugal; right vineyard in Spain). Notice on the right scene that when the 3D stereoscopic camera perception (canopy represented with pale-grey cells) was lost for the right row, the lidar marked the position of that row for the estimation of $L_{22}$ and $L_{32}$, proving the value of augmented perception for a reliable solution. In this case, the proper position of $P_t$ was determined without the participation of $L_{12}$ in the calculation of $P_t$ because $om_{12}$ was empty.

2. Evaluative Examples

A. Evaluation Methods

The first evaluation method consists of dropping lime powder as the robot moves forward to draw the actual trajectory followed in autonomous mode. Once the trajectory was drawn over the ground, deviations from a geometrical centerline that is equidistant to the polylines defined by the vine trunks at both sides were manually measured with a tape measure.

The second evaluation method focuses on the monitoring and analysis of the perception situations defined in Table 2. As the objective is the evaluation of inside-row guidance, those situations leading to the calculation of the target point $P_t$ will be favorable, i.e. situations 1 to 3, whereas the rest will indicate the activation of warning signs and correcting commands.

The third evaluation method takes advantage of the lateral distance measured by the side sonars. The more centered the vehicle is, the closer these two distances will be among them. If $L_S$ is the distance to the canopy measured by the left sonar (cm), and $R_S$ (cm) is the corresponding distance measured by the right-side sonar, we can define the left-right offset ratio ρ by expression (17), where the most stable situation from the navigation stand point will occur when ρ→0. Notice that $L_S$ and $R_S$ are bounded in formula (21) by the physical limitations of the specific ultrasonic sensors used.

$$\rho = \left|1 - \frac{R_S}{L_S}\right| \quad R_S \in [8,200]; L_S \in [8,200] \tag{21}$$

The fourth evaluation method focuses on the precision in the execution of steering commands, and therefore also accounts for the performance of the control system and steering design, which as mentioned before, are coupled with the behavior of the perception system. It is based on the comparison of the profile of commanded steering angles and the actual orientation of the front wheels measured by a linear potentiometer (PC67, Gefran spa, Provaglio d'Iseo, Italy).

Finally, the fifth evaluation method envisioned makes use of the onboard electronic compass to assess heading stability, under the hypothesis that smooth rides will be associated to slight yaw fluctuations around a virtual centerline that is equidistant from left and side rows.

B. Selection of Representative Runs and Coupling Effects

The navigation strategy based on augmented perception presented herein was developed along two research projects lasting seven years, and the results obtained come from field experiments conducted between 2015 and 2019 in commercial vineyards of France, Spain and Portugal. Many vineyards under very different conditions were tested. The specific characteristics of the testing runs along the vineyard plots used in the upcoming analysis is included in Table 5. Three different robotic platforms have been used with diverse configurations for the perception engine. In this section, such perceptive configurations for vineyard rows that approximately present similar challenges in terms of canopy structure, soil conditions, robot forward velocity, and environmental hardships are compared. Contrarily, how a particular perception configuration reacts to scenarios posing challenges of different nature is also analyzed. The comparison methods applied have been described in Sections C to G, and in addition to the fact that diverse perceptive solutions were compared using different vineyard rows in different moments, results should be interpreted taking into account the coupling effect of the steering control system on the final behavior of the robot, which is the observable outcome upon which measurements and comparisons may be carried out.

TABLE 5

Specifications of the tests used in the analysis

| Data Series | Total data points | Points inside rows | Total runtime (min) | Average speed (km/h) | Total run length (m) | Rows traversed |
|---|---|---|---|---|---|---|
| AA | 2203 | 1577 | 25.1 | 1.7 | 694 | 5 |
| B | 12623 | 10914 | 78.7 | 1.4 | 1885 | 15 |
| C | 4604 | 3649 | 23.3 | 1.8 | 712 | 6 |
| E | 13465 | 11176 | 46.7 | 1.4 | 1114 | 9 |

Figure 7:
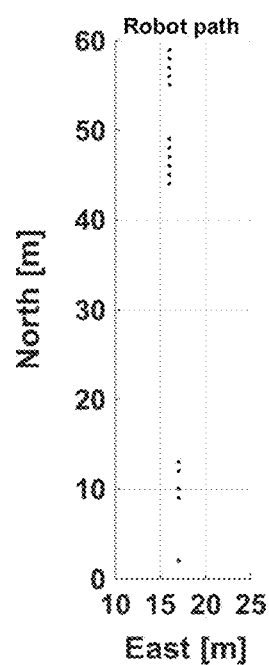
FIG. 7. Analysis of deviations of a robot from a virtual centerline when autonomously navigating according to the method and system of the present invention based on A. GPS trajectory of full row, and B. deviations measured with lime dust.
Figure 7:
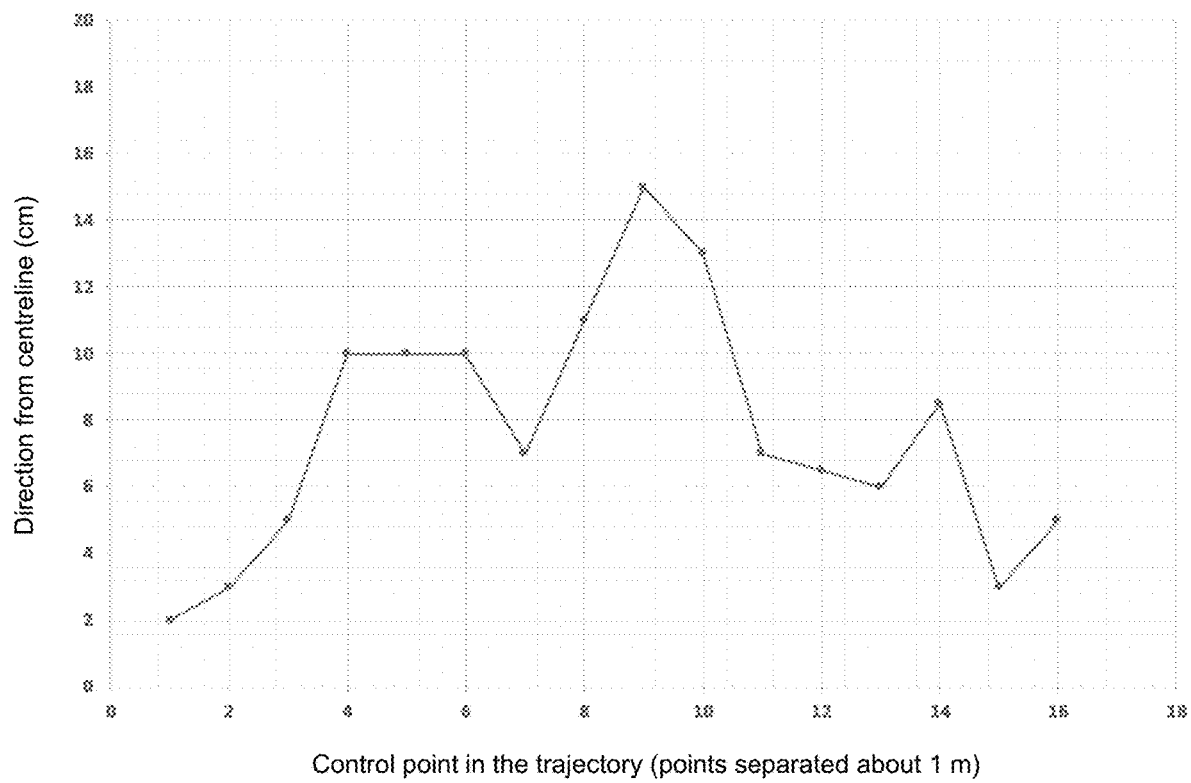

C. Analysis of Deviations from Virtual Centerline of Trajectories Marked with Lime A lime container with a vibrating implement was affixed to the rear of a robot, placed in its geometrical center. When the robot was engaged in autonomous mode, the lime container dropped the white dust on the ground as the vehicle moved forward, tracing the trajectory of the robot until the container ran out of lime. FIG. 7A plots the full run where only the first 16 m were measured with the lime trace. FIG. 7B provides the detailed deviations for the 16 points measured, with an approximate distance between adjacent points of 1 m. The average deviation from the centerline was 7.6 cm. The perception engine at the time of the tests (21 Jun. 2016) only used the forward-looking stereoscopic camera for inside-row guidance.

D. Quantifying Inside-Row Navigation Complexity Through the Comparison of Perception Situations The perception situations enunciated in Table 2 provide a quantitative means of tracking the events of sub-optimal actuation, when the robots get too close to the vines for a safe navigation. Situations 1 to 3, in particular, are considered reliable outputs of the perception system, whereas 10 and 11 indicate a risk of collision, and although the vehicle usually got out of these situations and recovered the centerline, the maneuver did not convey the stability desired in autonomous guidance, while increasing the chances of an accident. Showing stability for a demonstration run of a few minutes is not a big problem, but what results interesting for developing an autonomous vehicle is tracking stability and behavior in the long run, where batteries are not fully charged, computers may become overheated, sensors are exposed to strong sun radiation, and new areas of the field never traversed before may pose unforeseen challenges due to careless canopies, unseen damage, unknown weeds, or rough terrain. The objective of this analysis, and those in the remainder of Example 2, is twofold to:

1. demonstrate the advantageous performance of augmented perception for autonomous navigation inside orchard rows; and
2. develop a methodology to quantify the behavior of local perception systems, especially those that combine sensors working under diverse physical principles such as vision, lidar, and sonar. This methodology should be applicable in any relevant environment (unknown beforehand) rather than pre-defined testing tracks.

Figure 8:
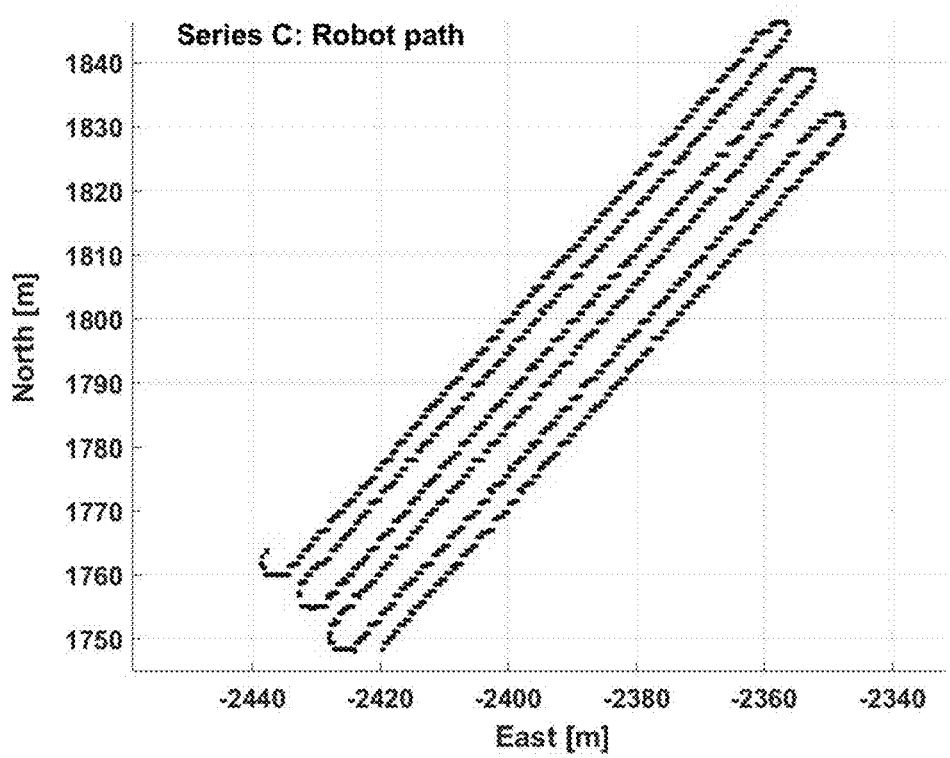
FIG. 8. Trajectory followed by the robot in autonomous mode according to A. series C of Table 5, and B. series AA of Table 5.
Figure 8:
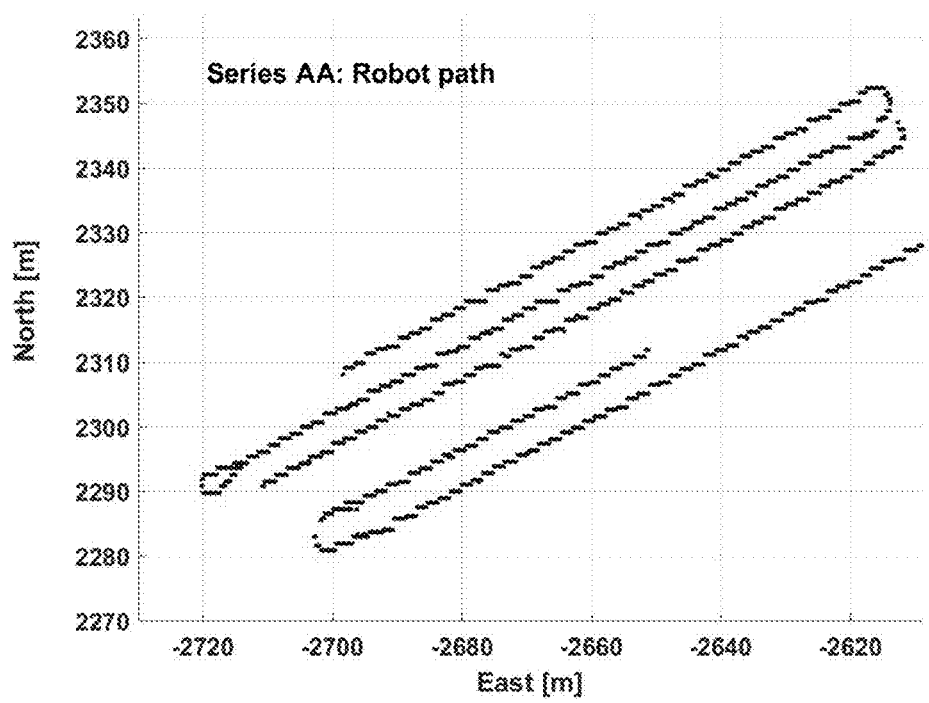

Aligned with the second objective stated above, the first challenge encountered in the field was to quantify the complexity that any given orchard scenario poses to a determined perception engine. The comparison of perception situations (Table 2) was conducted with the same robotic prototype in two vineyards of the same region and cooperative (Data series AA and C). Data were acquired with the robotic prototype whose perception engine included a binocular 3D stereoscopic camera (Bumblebee 2, FLIR Systems, Inc., Wilsonville, Oreg., USA) for inside-row guidance (Sensor A) and six low-cost ultrasonic sensors (Ping, Parallax, Rocklin, Calif., USA), three of them (Sensor B) facing forward, two looking sideways, and the last one in the rear for reverse maneuvers over the headlands. The classification of perception situations was basically driven by the 3D stereo camera and the lateral sonars facing the canopies. Both data series were recorded in Buzet-sur-Baïse, France. Series C (5 Sep. 2016) represents an ideal vineyard, where canopies were carefully trimmed, weeds were incipient or removed, and there was no slope or vegetation gaps. Series AA (23 Jun. 2016), in contrast, was acquired in a complicated vineyard with certain slope and soft terrain where the robot found tractive problems. FIG. 8A plots the six rows of Series C that the robot traversed in autonomous mode without any incident, and FIG. 8B represents the Series AA trajectory followed by the same robot where in the middle of the five rows the operator had to intervene once.

Figure 9:
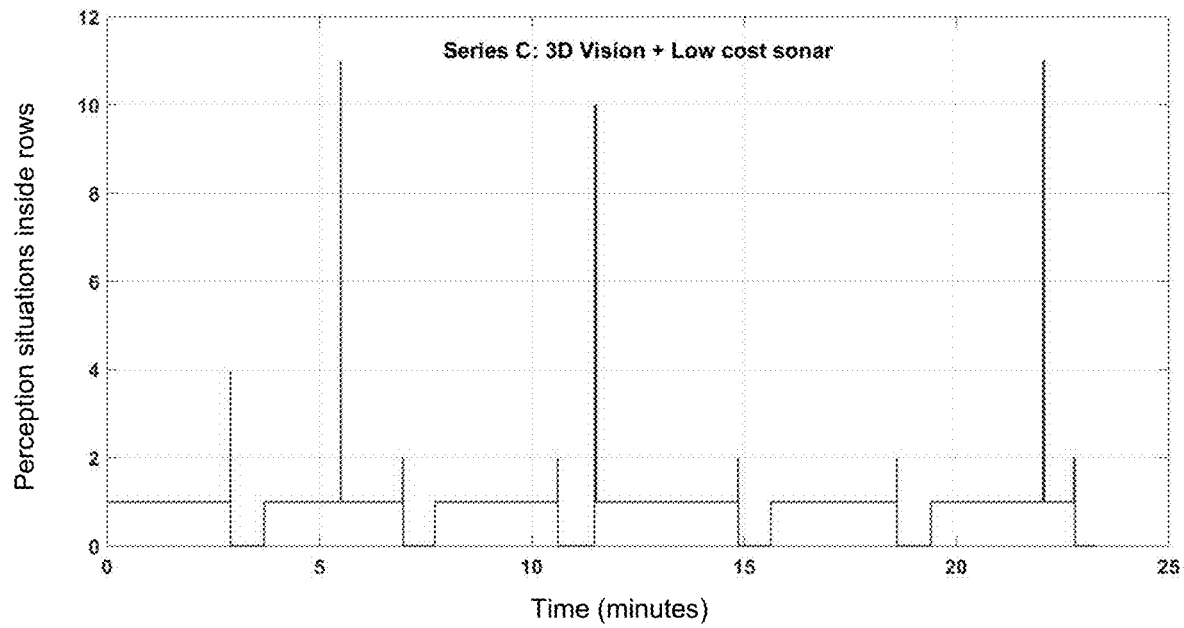
FIG. 9. Perception situations for Series C of Table 5.
Figure 10:
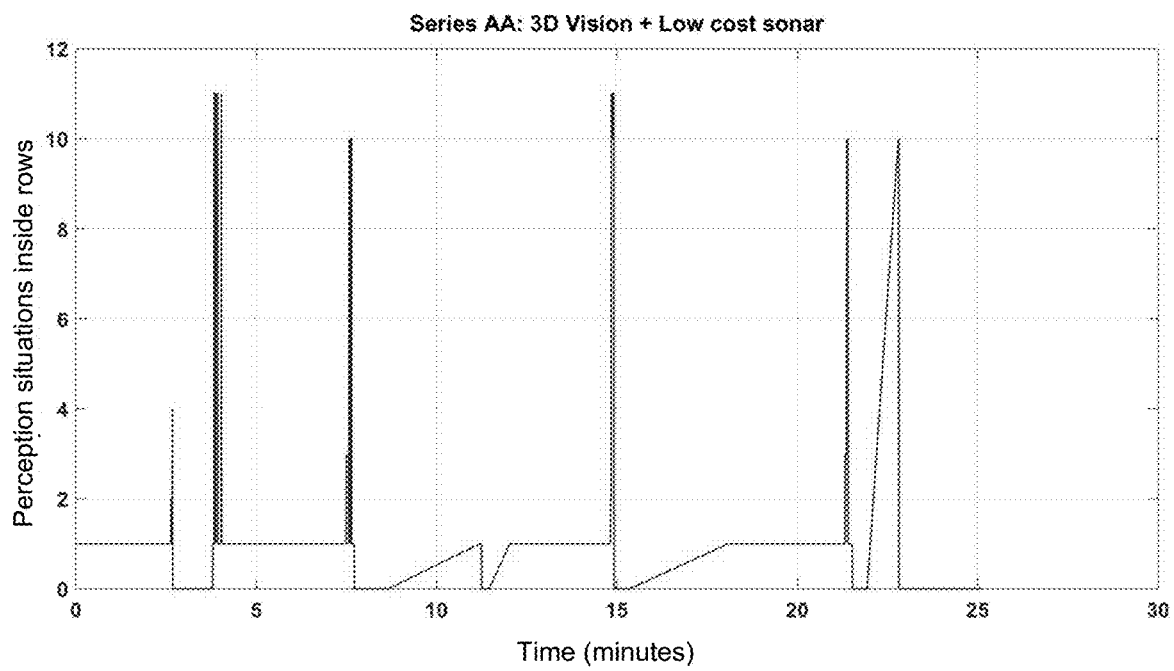
FIG. 10. Perception situations for Series AA of Table 5.

According to Table 2, except for the case of situation 0 when there is no perception, the ideal perception situation is 1, situations 2 and 3 are weaker than 1, but still allow for the calculation of the target point, and alerting situations are penalized with scores 10 and 11. As a result, the summation of perception situations with time will grow faster as more unstable commands take place along the rows. To be able to compare plots and series of different size, this summation must be normalized by the number of data points, and the situations related to the headland turns have to be removed from the series for the analysis, as the present method relies only on analyzing inside-row navigation. This way of charging over risky conditions from the perception standpoint is similar to the idea of "weighing evidences", where weights increase fast with unexpected orientations of the robot (heading) and their consequent dynamic instability. FIG. 9 depicts the perception situations detected in Series C after removing the data at the headland turns, and FIG. 10 shows the same plot for Series AA. Notice that situation 0 was assigned to the headland turns in FIGS. 9 and 10, as such perception situation (situation 0=no features detected) was never detected during runtime in any data series. Likewise, the earlier version of the algorithm also included situation 4 to point the beginning of the first headland turn, as it appears in both figures. Taking the size of the data series from Table 5, the summation of situations for Series C was 3742/3649 points=1.02 whereas for Series AA was 1943/1577 points=1.23. The number of situations 10-11 for Series AA was 35 after removing the headlands, and for Series C was 8. If we calculate the percentage of risky situations out of the number of points recorded for inside-row guidance, the results are given in formula (22):

$$\left. \begin{array}{l} S_{AA} = \dfrac{35 \text{ situations } 10\text{-}11}{1577 \text{ points}} \cdot 100 = 2.2\% \\ S_C = \dfrac{8 \text{ situations } 10\text{-}11}{3649 \text{ points}} \cdot 100 = 0.22\% \end{array} \right\} \quad (22)$$

E. Navigation Stability from the Study of Left-Right Offset Ratio ρ

Figure 11:
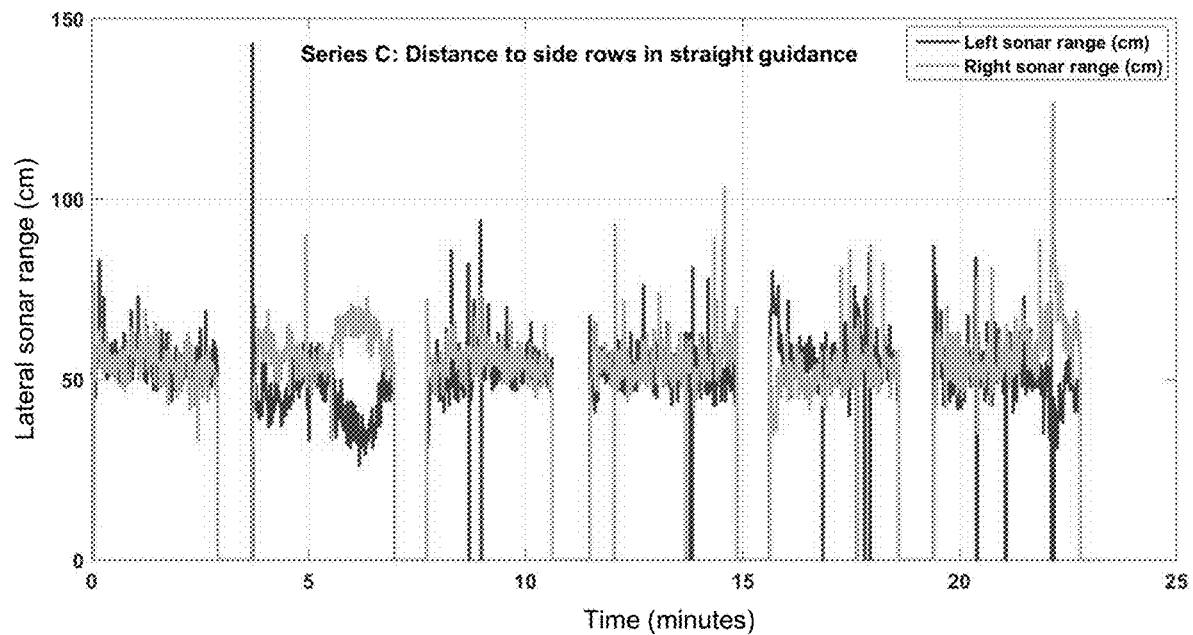
FIG. 11. Distance to side rows in straight guidance for Series C of Table 5.
Figure 12:
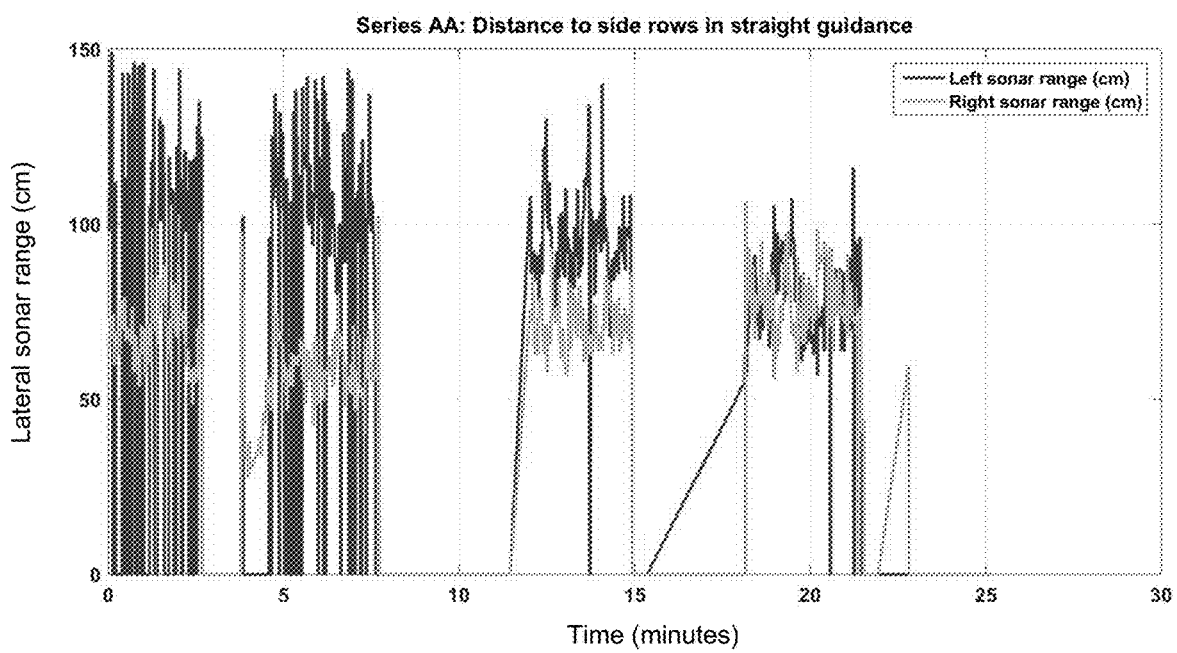
FIG. 12. Distance to side rows in straight guidance for Series AA of Table 5.
Figure 13:
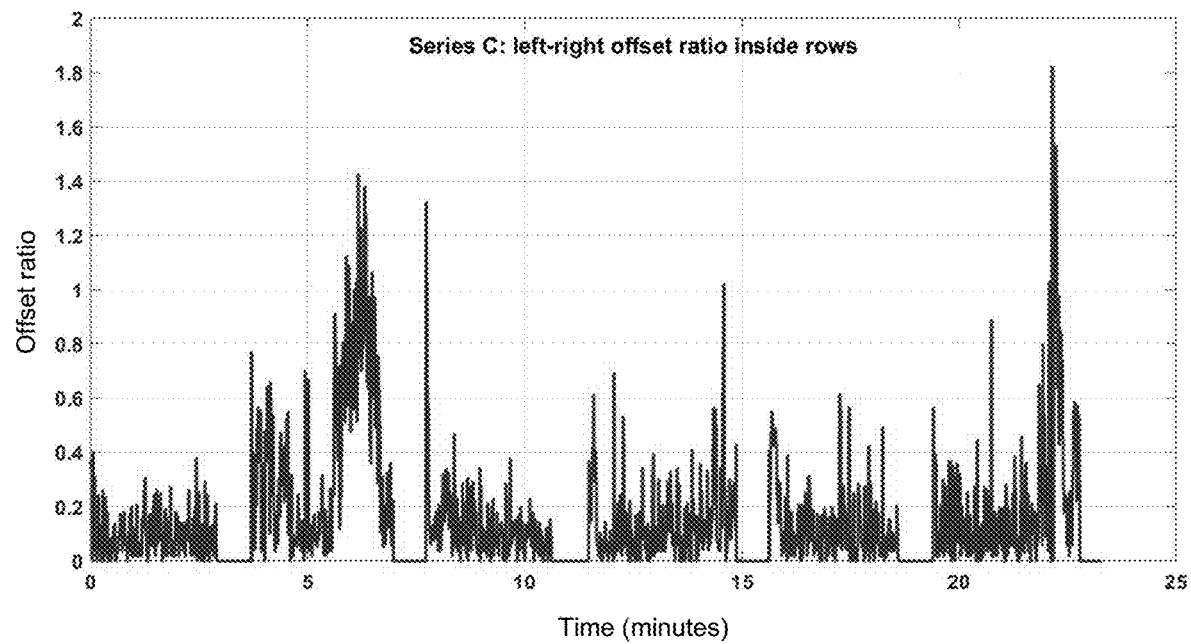
FIG. 13. Left-right offset ratio ρ for Series C of Table 5.
Figure 14:
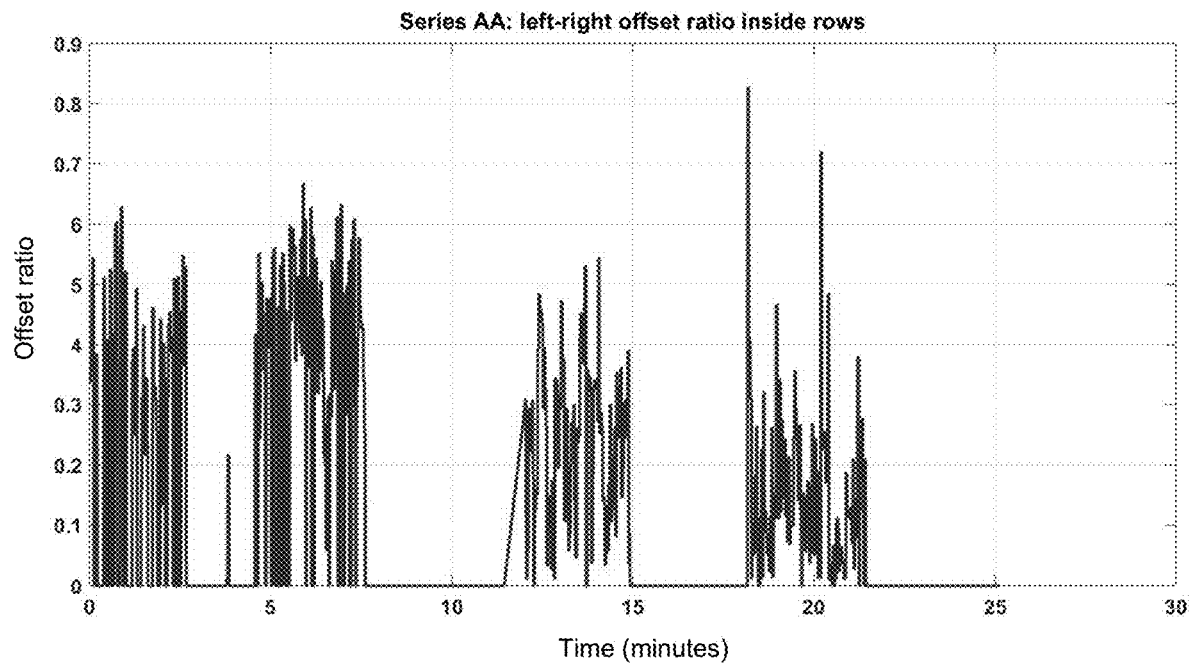
FIG. 14. Left-right offset ratio ρ for Series AA of Table 5.

The situations of Example 2D and Table 2 provide an estimate of the overall performance of the perception algorithm in the detection of guiding rows, but do not account for the actual position of the robots related to the surrounding canopies. However, the instantaneous measurement of the distance from the robot sides to the bounding canopies provides an accurate account of the capacity of the perception algorithm to keep the robot close to the virtual centerline that is equidistant to adjacent guiding rows. This account, therefore, should reflect the intrinsic difficulty of any tested run, as well as allow the numerical quantification of such difficulty. FIGS. 11 and 12 plot these measurements for Series C and AA, respectively. For the former, the average left separation from the canopy was 52 cm whereas the average right separation was 56 cm. For the Series AA, the average left separation was 76 cm and the average right separation was 67 cm. The smaller differences between left and right distances, the more centered the robot navigates. The left-right offset ratio ρ of (17) avoids negative numbers when the vehicle shifts from the left to the right side of the centerline and yields 0 when the robot is centered in the row. The stability of runs, therefore, can be estimated by tracking the summation of ρ normalized by the series size. FIG. 13 plots the ratio ρ for the C Series, and FIG. 14 shows the same profile for Series AA. The summation of the offset ρ for Series C was 699/3649 points=0.19, whereas for Series AA was 350.8/1577 points=0.22. Stability increases as the summation of ρ approaches to 0. After removing the points associated with the headlands, there were still invalid values for formula (23) that were coded as 0 in FIGS. 13 and 14. These null values altered the calculation of the real average offset. After their removal, the final average offset ratio R for each series was obtained in formula (23).

$$R_{AA} = \frac{\sum \rho}{\sum \rho \neq 0} = \frac{350.8}{1207 \text{ points}} = 0.29 \\ R_C = \frac{\sum \rho}{\sum \rho \neq 0} = \frac{699}{3405 \text{ points}} = 0.2$$ (23)

The results of formula (23) yield the average offset p, but higher divergences are found when the median is calculated, as the median for Series C is Med($\rho_c$)=0.12 whereas for Series AA is Med($\rho_{AA}$)=0.29.

F. Analysis of Steering Performance to Detect Mechanical Limitations

The perception situations and offset ratio previously analyzed allow the assessment of navigation performance, but mask the effect of the steering system, whose accurate actuation is essential for automatic steering systems. Very slight misalignments in the steering mechanism result in asymmetrical performance of the front wheels for Ackerman steering. Even when the robot mechanics are carefully built, the recurrent exposure to uneven terrains and rough ground ends up loosening linkages and reducing the precision of commanded angles. For manned vehicles, this problem is not usually a hazard because the operator somehow corrects for the misalignments and sends the vehicle to the maintenance shop when necessary. For unmanned vehicles, by contrast, steering misalignments and loose fittings can have severe consequences whose origin are sometimes hard to identify. A continuous—or periodic—self-checking procedure for assessing steering consistency can result instrumental for long-term use of intelligent equipment endowed with automated navigation.

Figure 15:
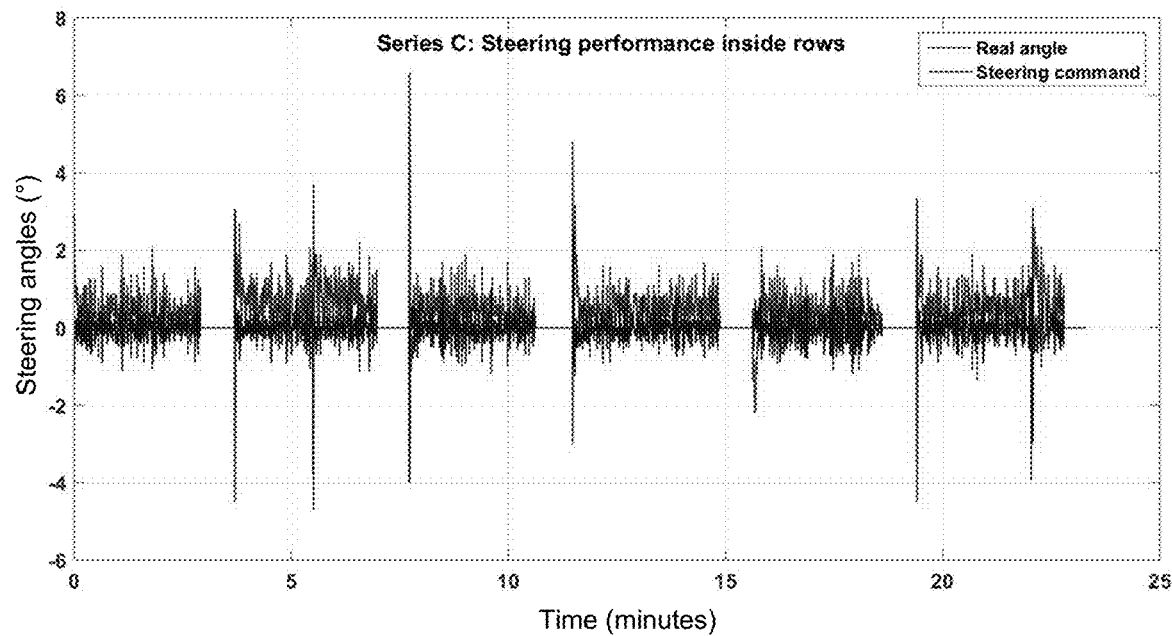
FIG. 15. Analysis of steering stability for Series C of Table 5.

The perception system—sensor suite and algorithm—can calculate steering angles based on the instantaneous position and orientation of the robot with respect to the surrounding environment. The profile of the calculated steering angles gives an idea of the stability of the steering actuation, such that sudden large commands are an indication of navigation alerts leading to situations 10 and 11. The response of the steering system, however, is traceable by tracking the actual angles of the front wheels measured by a linear potentiometer. We cannot assume that all commands sent by the algorithm are precisely materialized in due time, as there are always delays in the system response and inertias to overcome caused by the interaction of the tire with the terrain. FIG. 15 plots the comparison of calculated angular commands and real angles for Series C. As desired, the average angle commanded by the algorithm is 0, which is a clear indication that the robot travelled along the centerline between the adjacent vineyard rows. However, while the robot moved straightforwardly, the actual angles measured at the front wheels had an average of 0.4°, which reveals that the steering linkage had a slight misalignment of +0.4°. The plot also shows that angles are slightly larger at the entrance maneuver of each new row when the wheels have to recover the alignment after the 180° turn at the headlands, except for two occasions in the $2^{nd}$ and $6^{th}$ rows where an angular correction of 4° was necessary in the middle of the run.

Figure 16:
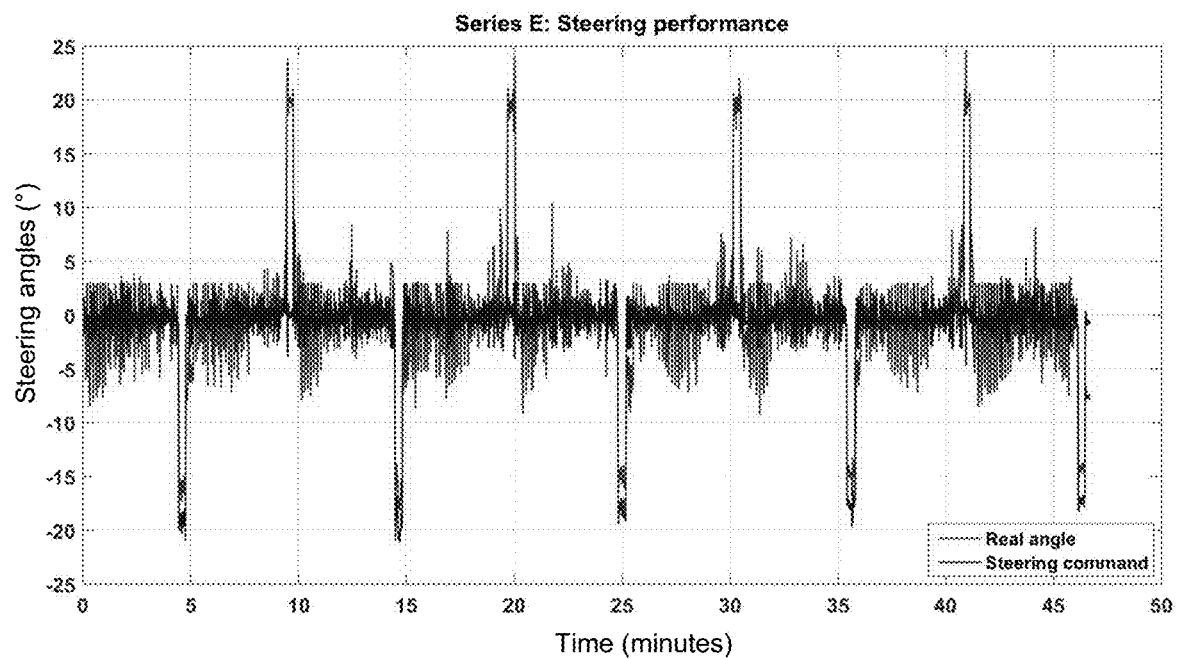
FIG. 16. Analysis of steering stability for Series E of Table 5

The limitations introduced by the mechanical embodiment of the steering system not only affect permanent misalignments caused by systematic offsets, but also a lack of symmetry in the execution of turns, which is more acute at the sharp angles required for changing rows. FIG. 16 plots the steering angles (actual and commanded) for Series E, including the nine turns at the headlands. In addition to show a misalignment when the robot moves inside the row, with an average real angle of −0.6° when the commanded angles are 0° in average, the turning capacity of the robot was asymmetrical and limiting. The graph reveals that the maximum right angles (positive angles) were around 20°, which were quickly reached with commanded angles of 15°. However, left angles were physically constrained by −15°, and could never exceed this limit in spite of recurrent commands of −20°. Although headland turns (where extreme turning is necessary) fall outside the scope of this example, it is worth mentioning the capacity of this evaluation method to locate important sources of problems and malfunctioning, especially in automated equipment where constant supervision is no longer present.

G. Self-Assessment of Augmented Perception

After developing a methodology to evaluate the performance of a perception system for guiding a vehicle inside rows, and taking advantage of the fact that this methodology can be applied to any vehicle operating in any relevant environment (specialty crops under vertical trellises), the goal of this section was to apply such methodology to different configurations of the perception system for a quantitative evaluation. The first case is represented by Series E (Table 5), which features a perception system based on the 3D stereoscopic camera (Sensor A) used in series C and AA but augmented with a forward looking 11-beam 2D LIDAR (Sensor B) (OMD 8000-R2100-R2-2V15, Pepperl+Fuchs, Manheim, Germany). Series E was recorded in Portugal on 16 Jul. 2018, and portrays a vineyard with the typical challenges of commercial plots: canopy gaps, long shoots, mild slope (up to 100), and a terrain of varying conditions.

Figure 17:
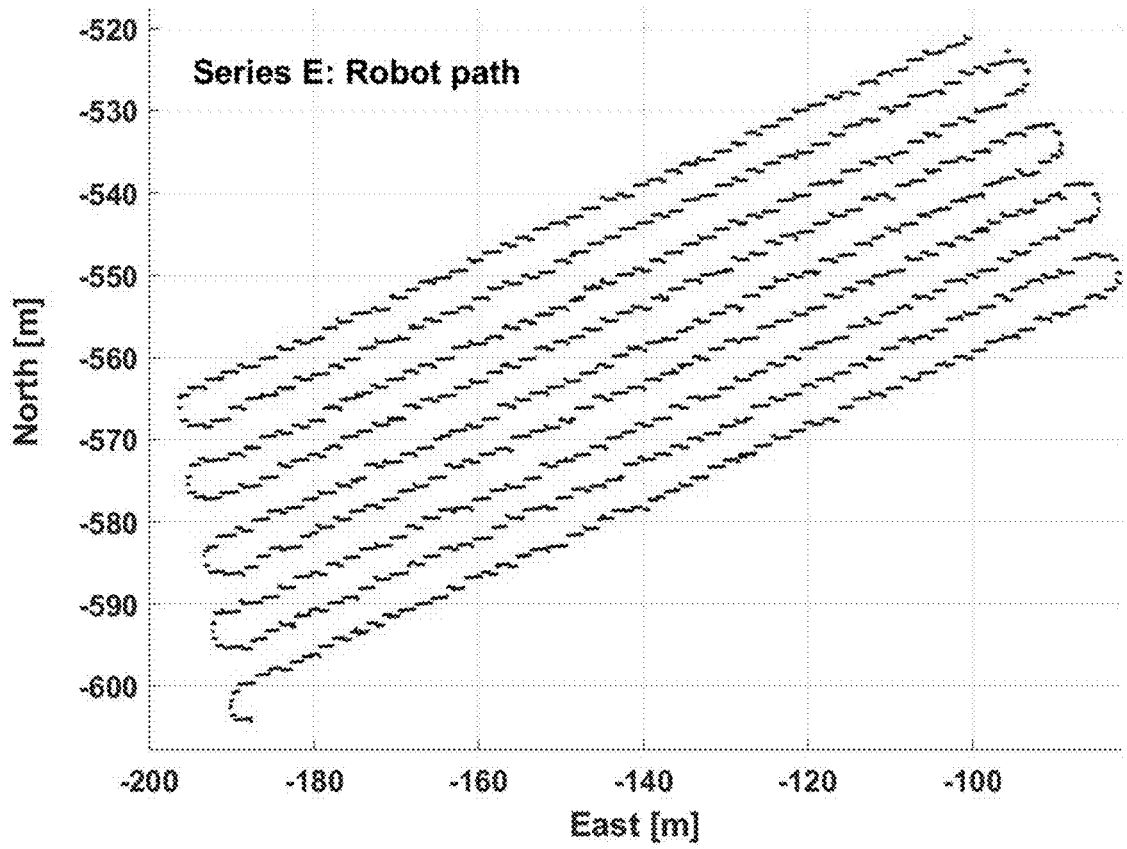
FIG. 17. Trajectory followed by the robot in Series E of Table 5.

The specifications of the series are included in Table 5, and FIG. 17 plots the trajectory followed by the robot in autonomous mode.

Figure 18:
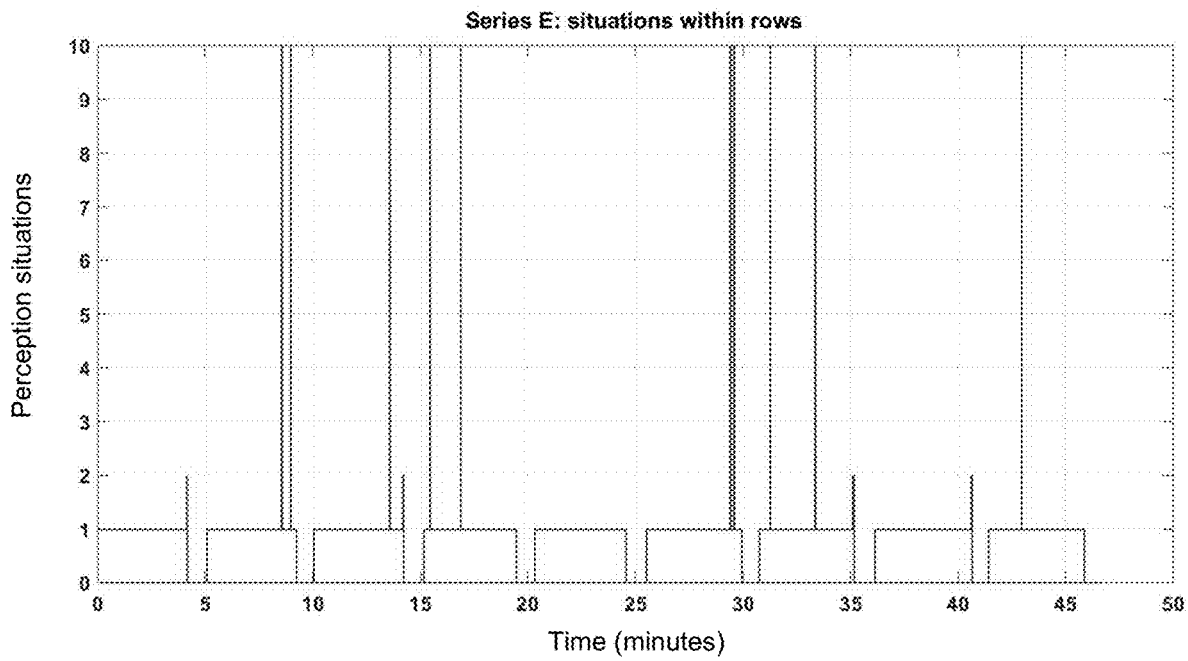
FIG. 18. Perception situations for Series E of Table 5.

As there were no lateral sonars in the robot when Series E was recorded, the evaluation based on the left-right offset ratio ρ cannot be carried out for this data series. As a result, navigation stability will be assessed by the analysis of perception situations, as outlined in Example 2D. FIG. 18 depicts the perception situations monitored over the nine straight paths of FIG. 17, in which the summation of situations was 11476/11176 points=1.02. The number of situations 10-11 for Series E was 30, and the percentage of alerts recorded for inside row guidance was 0.27% as detailed in formula (24).

$$S_E = \frac{30 \text{ situations } 10\text{-}11}{11176 \text{ points}} \cdot 100 = 0.27\% \tag{24}$$

The Series B was recorded with the prototype of FIG. 1, and featured the full-perception augmented approach consisting of the 3D stereo camera already used in Series E, amplified with three ultrasonic sensors (UC2000-30GM-IUR2 V15, Pepperl+Fuchs, Manheim, Germany) and the forward looking 11-beam 2D LIDAR (OMD 8000-R2100-R2-2V15, Pepperl+Fuchs, Manheim, Germany). The forward-looking sonar was only used for obstacle detection and headland turning, therefore only the lateral sonars (left and right) were actually used for inside row guidance. FIG. 2 indicates the position and range of the ultrasonic sensors. Series B data were recorded in Quinta do Ataide, Portugal, on 5 Sep. 2019, which is the same vineyard used for Series E. The specifications of Series B are included in Table 5, and FIG. 19 plots the trajectory followed by the robot in autonomous mode.

Figure 19:
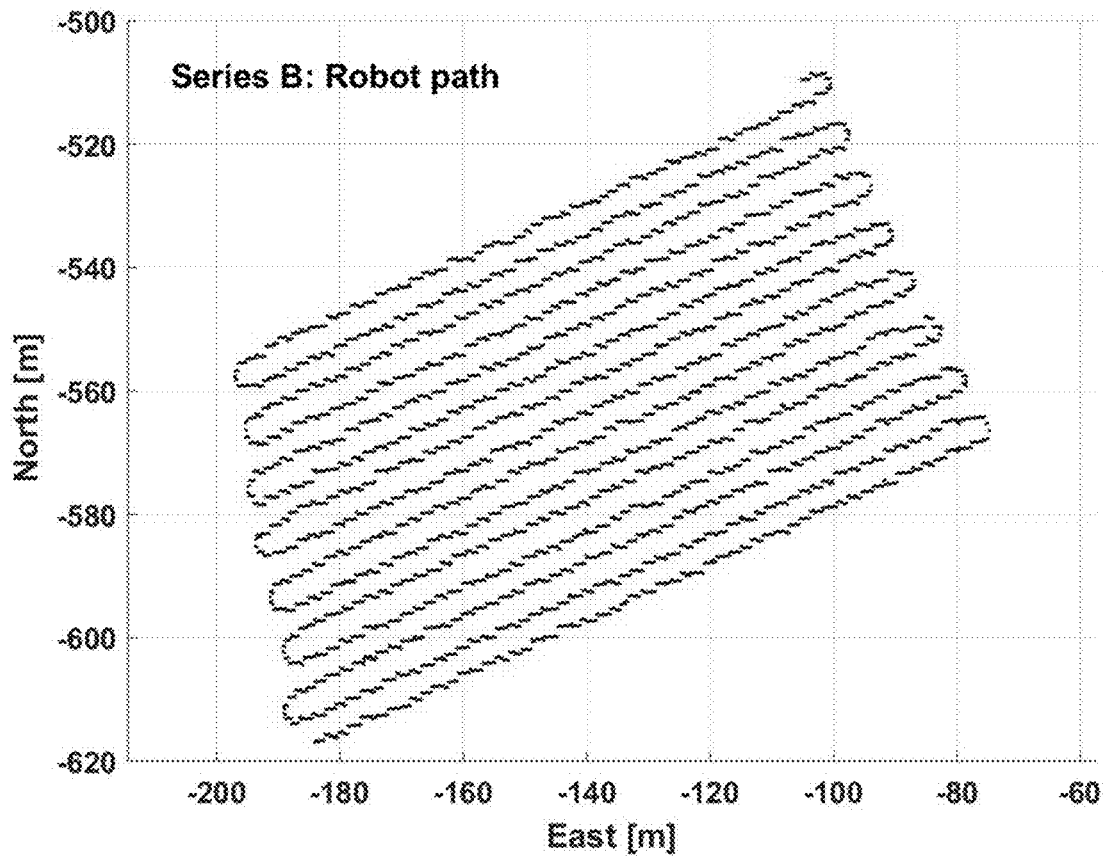
FIG. 19. Trajectory followed by the robot in Series B of Table 5.
Figure 20:
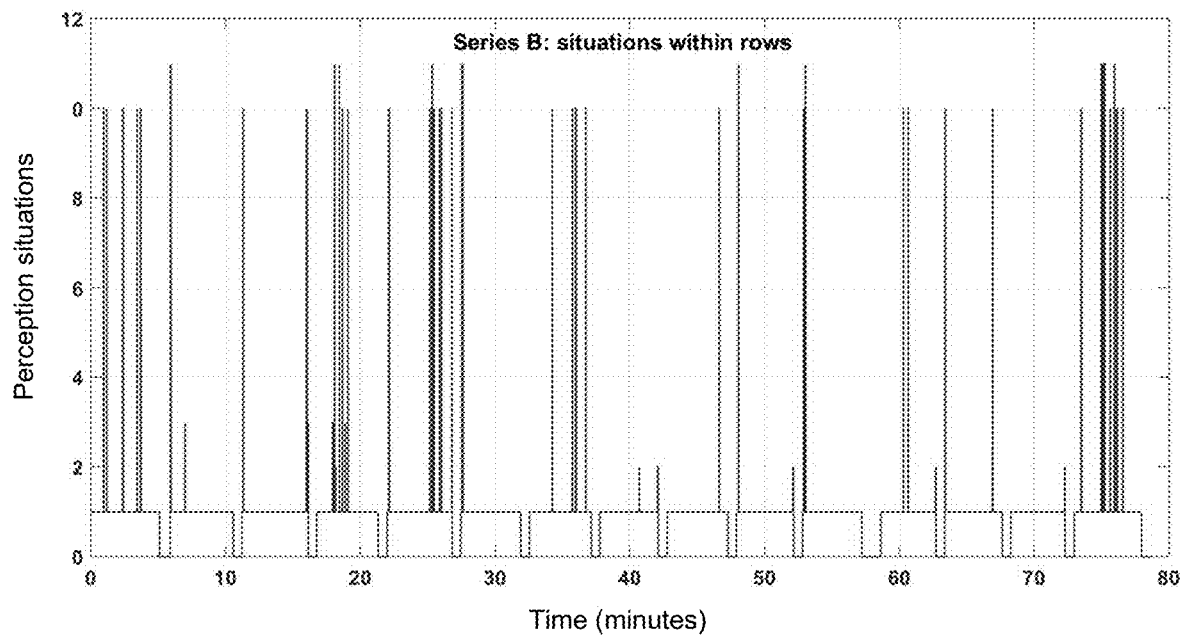
FIG. 20. Perception situations for Series B of Table 5.

The first analysis centers on the perception situations tracked along the 15 rows plotted in FIG. 19. The summation of situations for this series, derived from FIG. 20, was 12070/10914=1.1, whereas the number of situations 10-11 was 119, leading to a percentage of alerts for inside row guidance of 1.1% as detailed in formula (25).

$$S_B = \frac{119 \text{ situations } 10\text{-}11}{10914 \text{ points}} \cdot 100 = 1.1\% \tag{25}$$

Figure 21:
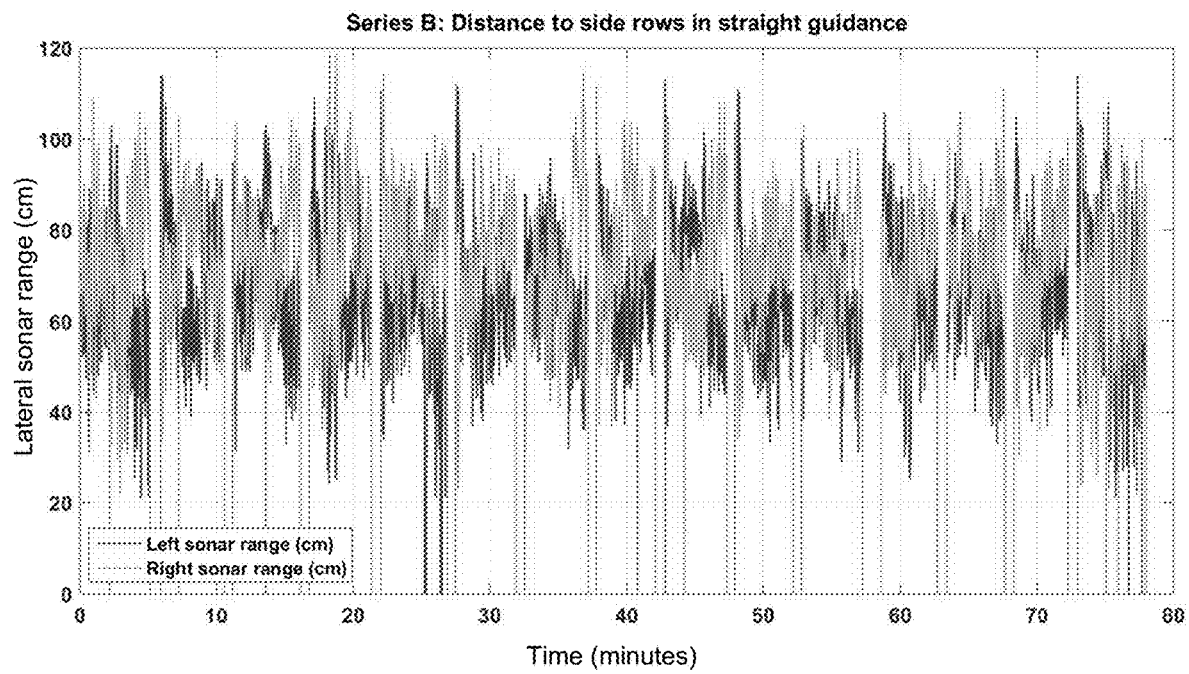
FIG. 21. Distance to side rows in straight guidance for Series B of Table 5.
Figure 22:
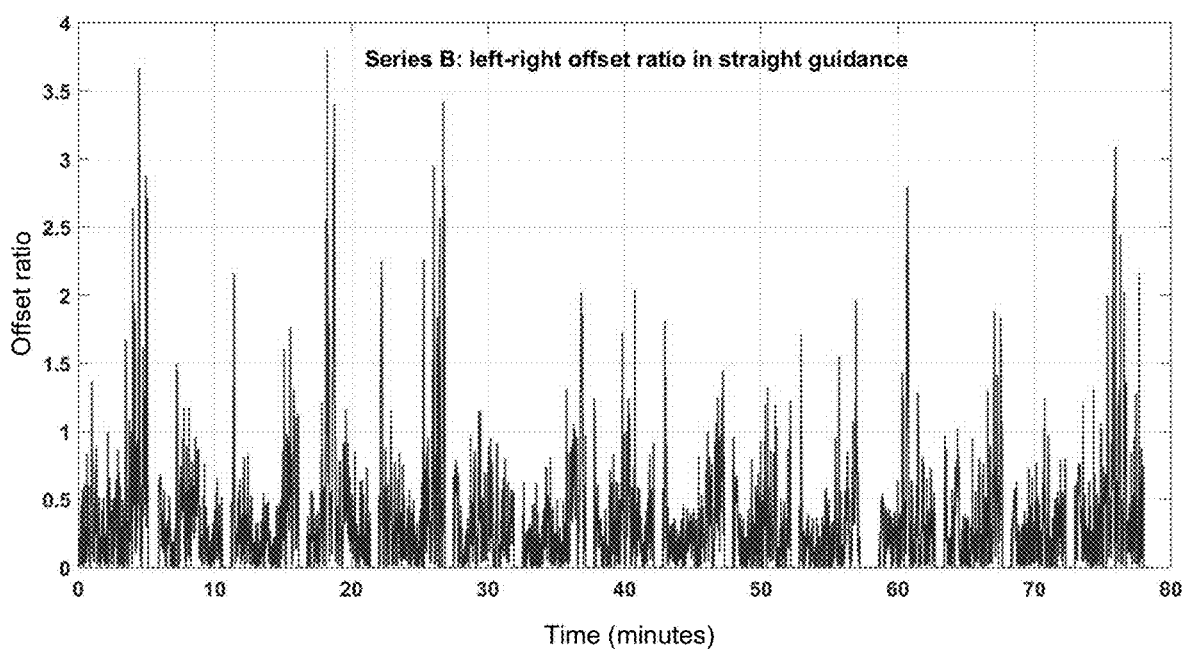
FIG. 22. Left-right offset ratio ρ for Series B of Table 5.

The analysis of the navigation stability based on the offset ratio ρ results from the lateral distances of FIG. 21 and the subsequent ratio of FIG. 22. Specifically, the average left separation measured with the lateral sonar was 67 cm whereas the average right separation was 73 cm. The summation of the offset ρ for Series B was 3636/10914 points=0.33. As usual, stability increases as the summation of ρ approaches to 0. After removing the points associated with the headlands and other null values, the average offset ratio $R_B$ for this series was obtained as detailed in formula (26). The median of offset ratio ρ for Series B was Med($ρ_B$)=0.25.

$$R_B = \frac{\sum \rho}{\sum \rho \neq 0} = \frac{3636}{10700 \text{ points}} = 0.34 \tag{26}$$

Figure 23:
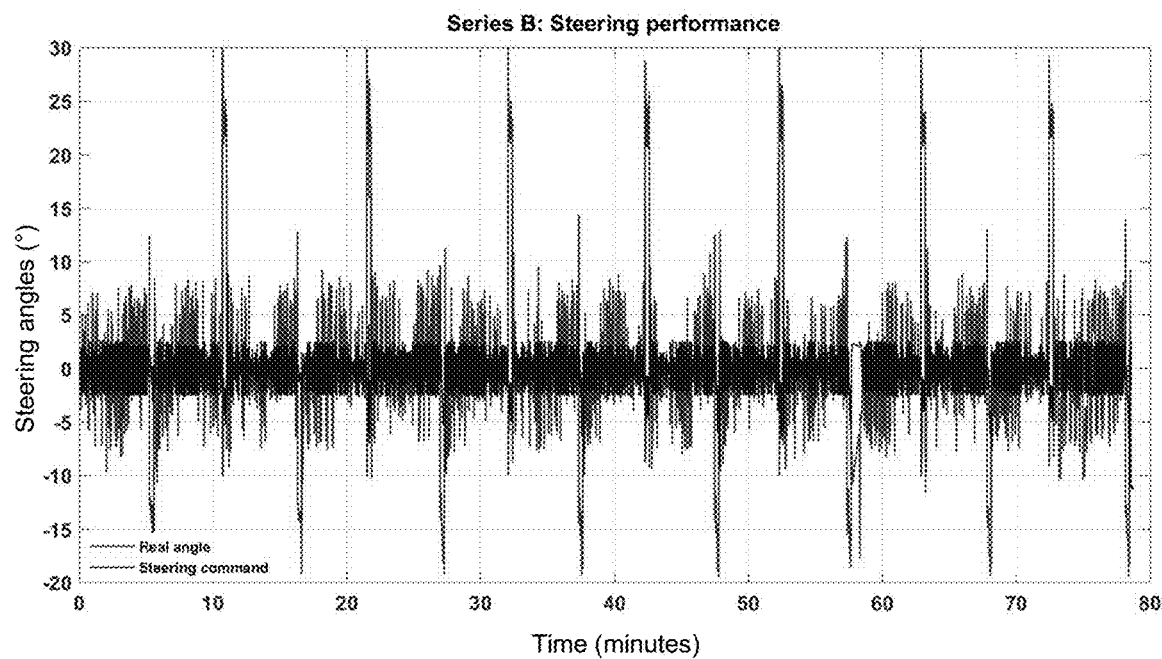
FIG. 23. Analysis of steering stability for Series B of Table 5.

The steering performance for Series B can be deduced from the profiles plotted in FIG. 23. The average real angle measured by the potentiometer was −0.2° whereas the average commanded angle was 0.1°. Both are close, and close to 0, but the profile of real angles in FIG. 23 shows larger corrections than in FIG. 15, which implies a less stable navigation performance. Mathematically, these fluctuations around the centerline can be estimated through the standard deviation, being 2.6° for the actual angles steered and 1.3° for the angular commands sent by the controller to the steering motor. FIG. 23 also indicates that the front wheels turned sharper to the right than to the left.

Figure 24:
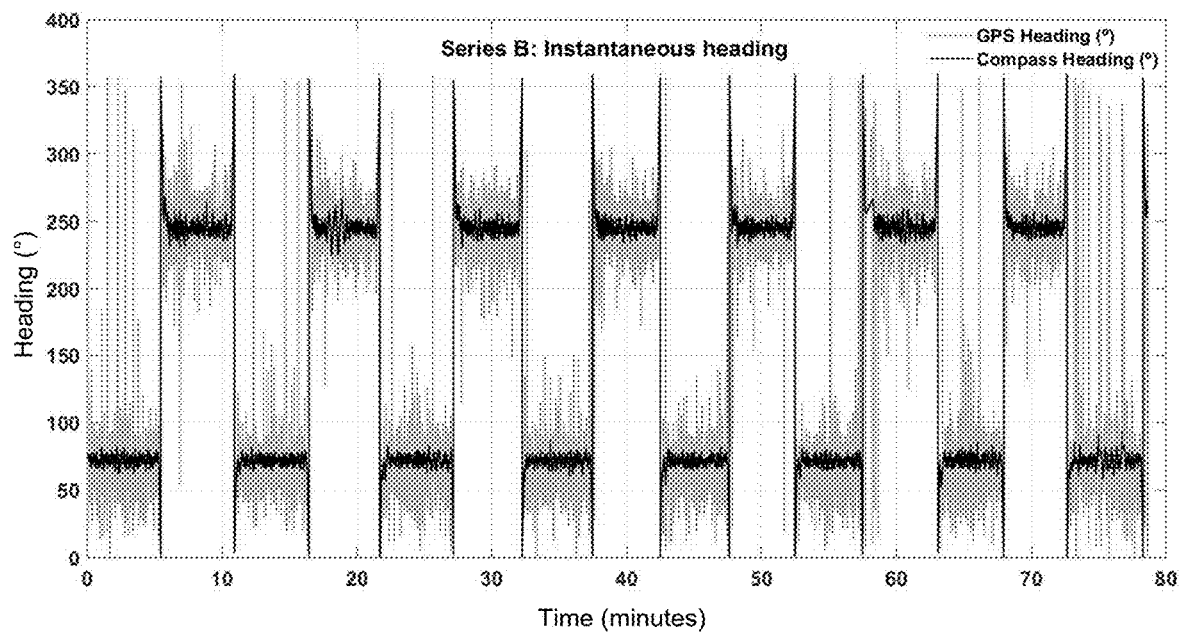
FIG. 24. Analysis of heading stability for Series B of Table 5.

The last comparison uses an onboard electronic compass (SEC385, Bewis Sensing Technology LLC, Wuxi City, China) to assess heading stability, by associating smooth rides to small yaw fluctuations around the average heading of each row. FIG. 24 overlays the instantaneous heading measured by the electronic compass and, at the same time, by the onboard GPS. As shown in the plot, the GPS estimates have so much variability due to noise that they do not reflect the behavior of the robot, and therefore cannot be used in the stability analysis. The standard deviation registered for the rows whose heading averaged 720 was $\sigma_{72}$=3.7°, and the dispersion for the rows of average heading 245° was $\sigma_{245}$=4.7°.

H. Discussion

The procedure (first evaluation method) to evaluate the navigation performance of an autonomous vehicle by tracing its trajectory with lime turned out to be cumbersome, impractical, and inaccurate. Lime dust had to be under constant stirring to avoid clogging, and a manageable tank size only reached for 16 m. The measurement of deviations from the centerline resulted time-consuming, physically-demanding, and prone to error as it was not always clear to identify the precise boundaries defining the deviations with a lime line several cm wide. The average deviation of 7.6 cm, however, is comparable with other estimates based on the analysis of the lateral distances to the canopies. Thus, for example, the average deviation for Series C was 2 cm, for Series AA was 4.5 cm, and for Series B was 3 cm. With a longer run, one row at least, the deviations measured with lime would probably have been smaller once the vehicle reached its regular traveling velocity, but this method is not applicable in a regular basis, and therefore cannot be considered an option for evaluating navigation performance.

The analysis (second evaluation method) of the situations defined in Table 2 provided a convenient self-assessment tool to evaluate navigation stability; it was not the summation of all situations but the normalized counting of situations 10-11 what resulted useful. The summation of situations, even after normalization with the number of measurements, was biased by population size, that is, the length of the series. The reason is that the majority of situations are 1, and if the series is long, the occasional summation of 10 or 11, even if these situations are weighted ten times, will have an overall mild effect. The counting of alerting situations, by contrast, allows the grading of navigation stability. Section V-C provides a reference range, where the same robot was tested under mild (Series C) and challenging (Series AA) environments. The most favorable outcome was $S_C$=0.22% (18) whereas the more complex scenario was quantified with $S_{AA}$=2.2% (18). Series E and B represent an intermediate case, i. e., a commercial vineyard with typical challenges, but with a robot endowed with augmented perception capabilities. $S_E$=0.27% (20) indicates a very stable navigation, but $S_B$=1.1% (21), even running the robot in the same plot as Series E, reveals a more oscillating behavior. The reasons for this may be various; one could be the fact that Series B was recorded after 6 pm, where batteries were at low charge. Other reason could be the vines or the terrain being in different conditions (E was recorded in July and B in September). Overall, even though it resulted quite complex to quantify the behavior of a vehicle in real time before a changing environment, according to the field results it seems reasonable to expect good performance when S is below or around 1%.

The third evaluation method based on the study of left-right offset ratio ρ has a key advantage over the previous method: simplicity. The definition and verification of the perception situations of Table 2 is elaborate, including multiple conditions to meet that differ according to the perception sensors on board. The measurement of lateral distances and its corresponding calculation of ρ through formula (21), on the contrary, is straightforward, and only requires the side sonars to estimate $R_S$ and $L_S$. The average values of $R_S$ and $L_S$ provide an estimate of the deviations from the centerlines, as shown in the discussion of the lime-based evaluation. As for ρ, the normalized summation suffers from the same disadvantage detected in the summation of perception situations; a masking effect as the population size grows. Therefore, even though the monitoring of ρ is quite simple, the normalized summation is not very helpful. However, the most significant parameter in relation to the offset ratio was the median. The same divergence found for Series C and AA regarding the perception situations was also found for the analysis of the offset ratio, specifically yielding Med($\rho_c$)=0.12 and Med($\rho_{AA}$)=0.29. For Series B, as expected, the outcome fell within that interval. A median above 0.3 would recommend a deeper examination of the navigation stability before proceeding further.

The analysis of steering performance (fourth evaluation method) was also revealing, which makes it attractive due to its simplicity. Only the real-time measurement of the front wheels Ackerman angle suffices to track what is occurring at the steering mechanism. With only basic inference statistics it was possible to detect slight misalignments—under 1°—of the steering linkage, asymmetrical performance of the front wheels, and an oscillating-steady execution of guiding commands. More advanced analysis tools applied to the profiles of FIGS. 15, 16 and 23 may bring a more complete picture of how efficiently the autonomous vehicle is executing automatic steering.

Finally, the assessment of heading stability (fifth evaluation method) with the on-board electronic compass showed potential, but could not be extensively analyzed with the detail of all other methods because it was implemented in the robots in 2019, and heading data was available only for Series B out of the rest of series cited in Table IV. A conclusion was straightforward, though: GPS instantaneous heading extracted from VTG NMEA messages resulted so unstable that it was actually useless. However, the standard deviations of compass-determined heading for two rows at 3.7° and 4.7° show what seems to be a stable behavior, although more data series will be needed for a consistent comparison.

I. Conclusions

Autonomous navigation in the open environments of trellis-supported orchards such as vineyards is a challenging feat, and its performance evaluation is equally demanding. To face the former, navigation has been split into two mutually exclusive tasks: inside-row guidance and headland turning, with this invention focusing on the first task. To confront the latter while supporting the benefits of the invention, a set of complementary methods were enunciated and demonstrated for a variety of scenarios. These methods are based on the measurements exerted by local perception sensors, an electronic compass, and a potentiometer to estimate the front wheels angle. The measurement of vehicle deviations with a lime dust dispenser makes no sense for common field extensions, but the permanent monitoring of the row-matching perception algorithm, the continuous logging of the lateral distance of the vehicle to the surrounding canopies, and the profile of the steering actuation allow for the calculation of various quality indices to assess the behavior of an autonomous vehicle. It is clear from this study that self-assessment is the most practical option, and to do so, we only need to use the sensors (A, B, C . . . ) already onboard for navigation.

The goal of this example was not to identify an evaluating method but to reliably assess guidance results when the robot encounters any previously unknown possible situation because training the system always for the same row is unrealistic and misleading. Once a general methodology to evaluate results in real environments has been established, various perception configurations have been examined. By fusing different—but complementary—technologies, the outcomes are more consistent and fail-safe, as shown in FIG. 3. For the strategy proposed in this example, the suite of sensors selected was 3D stereovision, multi-beam lidar, and sonar, chosen on the grounds of reliability under harsh environments and cost-efficiency (key in agricultural applications). However, for agricultural robots, and for specialty crops in particular, it is important to rely on on-vehicle perception solutions for navigation that offer stability and safety with independence to the availability of global positioning signals such as GPS, GALILEO, GLONASS, BEIDOU, etc.

The invention claimed is:

1. A method for autonomous navigation of a robot between two rows of plants spaced Q metres apart, wherein said robot comprises two sensing devices, sensor A and sensor B, mounted at a position O thereon and moves forward along a y-axis being autonomously steered by exerting angular corrections to place the robot as close as possible to the centerline, wherein each sensing device is a device which detects electromagnetic waves or detects sound waves, and wherein when both devices detect:

(A) electromagnetic waves, sensor A detects said waves at a frequency and/or field-of-view different from that of the waves detected by sensor B; and (B) sound waves, sensor A detects said waves at a frequency and/or field-of-view different from that of the waves detected by sensor B, and wherein said y-axis is a horizontal axis and a x-axis is a horizontal axis perpendicular to said y-axis, and wherein said method comprises the following steps:

(i) defining a two-dimensional grid of square cells in said plane, wherein said grid is $X_G$ cells in width and $Y_G$ cells in length, and said cells have sides of length c, wherein:

(a) said width extends horizontally $|X_{min}|$ metres away from O to the left along said x-axis and horizontally $X_{max}$ metres away from O to the right along said x-axis; and (b) said length extends horizontally $Y_{max}$ metres away from O along said y-axis;

wherein:

$X_{min} = -X_G \cdot c/2$;

$X_{max} = X_G \cdot c/2$;

$Y_{max} = Y_G \cdot c$;

$X_G$ is a whole number selected from between 2 and 1000;
$Y_G$ is a whole number selected from between 3 and 1500; and
c is a number selected from between 0.01 and 0.5 m; and (c) each cell (h,v) is assigned a coordinate comprising a first number, h, and a second number, v, wherein h is a number from 1 to $X_G$ and v is a number from 1 to $Y_G$, wherein:

$h = h' + 1$; and $v = v' + 1$;

wherein:
h' is the number of said cells, counted along said x-axis starting from the left-most cell, which separate said cell (h,v) from the outside of said two-dimensional grid; and
v' is the number of said cells, counted along said y-axis starting from the cell that is most remote from said robot, which separate said cell (h,v) from the outside of said two-dimensional grid;

(ii) dividing the two-dimensional grid of square cells into $I_G \cdot J_G$ groups of cells, wherein each group is $X_G/J_G$ cells in width and $Y_G/I_G$ cells in length, wherein:
(a) $I_G$ is 3;
(b) $J_G$ is 2; and
(c) each group of cells (i,j) ($om_{ij}$) is assigned a coordinate comprising a first number, i, and a second number, j, wherein i is a number from 1 to $I_G$ and j is a number from 1 to $J_G$, wherein $i = i' + 1$, and $j = j' + 1$, wherein:
i' is the number of said groups of cells, counted along said y-axis starting from the group of cells that is most remote from said robot, which separate said group of cells from the outside of said two-dimensional grid; and
j' is the number of said groups of cells, counted along said x-axis starting from the left-most group of cells, which separate said group of cells (i,j) ($om_{ij}$) from the outside of said two-dimensional grid;

(iii) obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max} - Z_{min}$ metres along a z-axis, wherein said z-axis is a vertical axis perpendicular to said x-axis and said y-axis, and said surface is the surface of an object, wherein:
$Z_{min}$ is a value selected from −0.5 to 0.5 metres;
$Z_{max}$ is a value selected from 1 to 5 metres;
wherein:
(a) each data point obtained using sensor A is assigned a coordinate comprising a first number, $x^L$, and a second number, $y^L$ wherein:
$x^L$ is the distance along the x-axis from said data point to O; and
$y^L$ is the distance along the y-axis from said data point to O,
wherein the coordinate of position O is (0,0); and
(b) each data point obtained using sensor B is assigned a coordinate comprising a first number, $x^V$, and a second number, $y^V$ wherein:
$x^V$ is the distance along the x-axis from said data point to O; and
$y^V$ is the distance along the y-axis from said data point to O,
wherein the coordinate of position O is (0,0);

(iv) converting each data point into a discretized data point, wherein:
(a) data point $(x^L, y^L)$ is converted to a discretized data point $(L_V, L_H)$, according to the following formulae:

$L_V = \|y^L/C\|$; and $L_H = \|(x^L - X_{min})/C\|$;

(b) data point $(x^V, y^V)$ is converted to a discretized data point $(V_V, V_H)$ according to the following formulae:

$V_V = \|y^V/C\|$; and $V_H = \|(x^V - X_{min})/C\|$;

(v) calculating a fusion function value, $\Gamma(h,v)$, for each cell (h,v) of said two-dimensional grid according to the following formula 1):

$$\Gamma(h,v) = K_V \cdot \gamma^V(V_V, V_H) + K_L \cdot \gamma^L(L_V, L_H) \qquad (1)$$

wherein:
$K_L$ is a non-negative integer selected from between 0 and 5;
$\gamma^L(L_V, L_H)$ is a whole number calculated from the number $D_N(L_H, L_V)$ of discretized data points ($L_V$, $L_H$) for which $L_V = v$ and $L_H = h$;
$K_V$ is a non-negative integer selected from between 0 and 5;
$\gamma^V(V_V, V_H)$ is a whole number calculated from the number $D_N(V_H, V_V)$ of discretized data points ($V_V$, $V_H$) for which $V_V = v$ and $V_H = h$;

(vi) calculating for each group of cells (i,j) ($om_{ij}$):
(a) the cumulative total of fusion function values, $CUM_{ij}(h)$, of all cells in said group of cells which have a coordinate with the same h value; and
(b) the sum of all cumulative totals of fusion function values, $SUM_{ij}$, in said group of cells;
wherein when:
$SUM_{ij} \geq \|0.4 \cdot \overline{OM}\|$ said group of cells is classified as high-activated; and
$SUM_{ij} \geq \|0.2 \cdot \overline{OM}\|$ and $< \|0.4 \cdot \overline{OM}\|$ said sub-volume is classified as low-activated,
wherein $\overline{OM}$ is the maximum $SUM_{ij}$ value determined for any group of cells (i,j) ($om_{ij}$) in said two-dimensional grid;
wherein
(vii) the robot moves:
(a) through a plane defined by said y-axis and said x-axis towards a target point $P_t$ placed ahead of the robot, on the centerline parallel to the detected left row and separated from it by a distance Q/2:
when out of the set $S_R$ consisting of the groups of cells (1,1), (2,1), (3,1) and (1,2):
$om_{11}$ is high-activated, or
$om_{11}$ is high-activated and $om_{21}$ is low-activated, or $om_{11}$ is low-activated and $om_{21}$ is high-activated, or $om_{21}$ is low-activated, or $om_{21}$ is low-activated and $om_{31}$ is low-activated, or $om_{31}$ is low-activated, or $om_{12}$ is low-activated and $om_{21}$ is high-activated, and no other group of cells in said set $S_R$ or the groups of cells (2,2) or (3,2) is activated; or (b) through a plane defined by said y-axis and said x-axis towards a target point $P_t$ placed ahead of the robot, on the centerline parallel to the detected right row and separated from it by a distance Q/2:

when out of the set $S_L$ consisting of the groups of cells (1,2), (2,2), (3,2) and (1,1):

$om_{12}$ is high-activated, or $om_{12}$ is high-activated and $om_{22}$ is low-activated, or $om_{12}$ is low-activated and $om_{22}$ is high-activated, or $om_{22}$ is low-activated, or $om_{22}$ is low-activated and $om_{32}$ is low-activated, or $om_{32}$ is low-activated, or $om_{11}$ is low-activated and $om_{22}$ is high-activated, and no other group of cells in said set $S_L$ or the groups of cells (2,1) or (3,1) is activated; or (c) through a plane defined by said y-axis and said x-axis towards a target point $P_t$ placed ahead of the robot, on the centerline equidistant to both detected rows:

when out of the set $S_R$ consisting of the groups of cells (1,1), (2,1), (3,1) and (1,2):

$om_{11}$ is high-activated, or $om_{11}$ is high-activated and $om_{21}$ is low-activated, or $om_{11}$ is low-activated and $om_{21}$ is high-activated, or $om_{21}$ is low-activated, or $om_{21}$ is low-activated and group of cells (3,1) is low-activated, or $om_{31}$ is low-activated, or $om_{31}$ is low-activated and $om_{21}$ is high-activated, and no other group of cells in said set $S_R$ or the groups of cells (2,2) or (3,2) is activated; and when out of the set $S_L$ consisting of the groups of cells (1,2), (2,2), (3,2) and (1,1):

$om_{12}$ is high-activated, or $om_{12}$ is high-activated and $om_{22}$ is low-activated, or $om_{12}$ is low-activated and $om_{22}$ is high-activated, or $om_{22}$ is low-activated, or $om_{22}$ is low-activated and $om_{32}$ is low-activated, or $om_{32}$ is low-activated, or $om_{11}$ is low-activated, $om_{22}$ is high-activated, and no other group of cells in said set $S_L$ or the groups of cells (2,1) or (3,1) is activated.

2. The method according to claim 1, wherein step (vi) also comprises calculating for each group of cells (i,j) ($om_{ij}$) for which $SUM_{ij} \geq 1$, an expected row position value, $L_{ij}$, according to the following formula (2):

$$L_{ij} = \|X_G/J_G - M_{ij}/SUM_{ij}\| \qquad (2)$$

wherein $M_{ij}$, is the sum of t values of all cells in said group of cells which have a coordinate with the same h value, wherein said t values are calculated according to the following formula (3):

$$t = (\|X_G/J_G\| - h) \cdot CUM_{ij}(h) \qquad (3)$$

wherein:

(a) when the robot moves through a plane defined by said y-axis and said x-axis by turning towards the target point $P_t$ which is Q/2 metres to the right of row boundary $RB_L$ at a look-ahead distance of $Y_{max} \cdot r$ metres from O, wherein:

$RB_L$ is the weighted average $L_{ij}$ of the groups of cells (i,j) which have a coordinate with the j value of 1; and r is between 0.5 and 0.9;

(b) when the robot moves through a plane defined by said y-axis and said x-axis by turning towards the target point $P_t$ which is Q/2 metres to the left of row boundary $RB_R$ at a look-ahead distance of $Y_{max} \cdot r$ metres from O, wherein:

$RB_R$ is the weighted average $L_{ij}$ of the groups of cells (i,j) which have a coordinate with the j value of 2;

(c) when the robot moves through a plane defined by said y-axis and said x-axis by turning towards the target point $P_t$ which is placed equidistant between $RB_L$ and $RB_R$.

3. The method according to claim 1, wherein sensor A is a multi-beam lidar and sensor B is a stereoscopic or time-of-flight 3D camera.

4. The method according claim 3, wherein:

(a) $\gamma^L(L_V, L_H)$ is the whole number $D_N(L_H, L_V)$ of discretized data points $(L_V, L_H)$ for which $L_V = v$ and $L_H = h$; and (b) $\gamma^V(V_V, V_H)$ is:

1 when $D_N(V_H, V_V) > TH_V \, D_N(V_H, V_V)max$; or 0 when $D_N(V_H, V_V) \leq TH_V \, D_N(V_H, V_V)max$ wherein $D_N(V_H, V_V)$ is:

the whole number of discretized data points $(V_V, V_H)$ when $V_{V \cdot C} \leq 3$; or a whole number calculated from the number of discretized data points $(V_V, V_H)$ for which $V_V = v$, $V_H = h$ and $V_{V \cdot C} > 3$, multiplied by $(V_{V \cdot C}/3)^2$;

and wherein:

$TH_V$ is a threshold value, wherein $0 \leq TH_V \leq 1$; and $D_N(V_H, V_V)max$ is the maximum value of $D_N(V_H, V_V)$ determined for any cell (h,v) in said two-dimensional grid.

5. The method according to claim 1, wherein the robot additionally comprises a sonar sensor mounted at the position O thereon for safeguarding against collisions, which obtains a front range and/or a rear range wherein:

(a) each front range is the point in space at which sound is reflected from a surface located to the front of said robot within a spherical sector of radius $|X_{max}|$ metres having a cone angle of less than 45° centred along the y-axis, and wherein $F_S'$ is the distance along the y-axis from said range to O; and (b) each rear range is the point in space at which sound is reflected from a surface located to the back of said robot within a spherical sector of radius $|X_{max}|$ metres having a cone angle of less than 45° centred along the y-axis, and wherein $B_S'$ is the distance along the y-axis from said range to O, and said method additionally comprises determining $F_S$ and $B_S$, wherein $F_S$ is the minimum $F_S'$, and $B_S$ is the minimum $B_S'$, and the robot stops moving forward when $F_S$ is $<F_{TH}$; or
the robot stops moving backward when $B_S$ is $<B_{TH}$,
wherein:
$F_{TH} = F_{TH}' + e$, wherein $F_{TH}'$ is a value selected from between 0.1 and 1 metres and e is the distance from position O to the front of the robot along the y axis; and $B_{TH} = B_{TH}' + e'$, wherein $B_{TH}'$ is a value selected from between 0.1 and 1 metres and e' is the distance from position O to the back of the robot along the y axis.

6. The method according to claim 1, wherein $X_G$ is between 20 and 70, $Y_G$ is between 40 and 100, and c is a number selected from between 0.05 and 0.2 m.

7. A system for autonomous navigation of a robot between two rows of plants spaced Q metres apart, wherein said robot comprises two sensing devices, sensor A and a sensor B, mounted at a position O thereon and moves forward along a y-axis being autonomously steered by exerting angular corrections to place the robot as close as possible to the centerline, wherein each sensing device is a device which detects electromagnetic waves or detects sound waves, and wherein when both devices detect:
(A) electromagnetic waves, sensor A detects said waves at a frequency and/or field-of-view different from that of the waves detected by sensor B; and
(B) sound waves, sensor A detects said waves at a frequency and/or field-of-view different from that of the waves detected by sensor B, and
wherein said y-axis is a horizontal axis and a said x-axis is a horizontal axis perpendicular to said y-axis,
and wherein said system comprises the following:
(i) means for defining a two-dimensional grid of square cells in said plane, wherein said grid is $X_G$ cells in width and $Y_G$ cells in length, and said cells have sides of length c, wherein:
(a) said width extends horizontally $|X_{min}|$ metres away from O to the left along said x-axis and horizontally $X_{max}$ metres away from O to the right along said x-axis; and
(b) said length extends horizontally $Y_{max}$ metres away from O along said y-axis;
wherein:

$X_{min} = -X_G \cdot c / 2$;

$X_{max} = X_G \cdot c / 2$;

$Y_{max} = Y_G \cdot c$;

$X_G$ is a whole number selected from between 2 and 1000
$Y_G$ is a whole number selected from between 3 and 1500; and
c is a number selected from between 0.01 and 0.5 m, and
(c) each cell (h,v) is assigned a coordinate comprising a first number, h, and a second number, v, wherein h is a number from 1 to $X_G$ and v is a number from 1 to $Y_G$, wherein:

$h = h' + 1$; and $v = v' + 1$;

wherein:
h' is the number of said cells, counted along said x-axis starting from the left-most cell, which separate said cell (h,v) from the outside of said two-dimensional grid; and
v' is the number of said cells, counted along said y-axis starting from the cell that is most remote from said robot, which separate said cell (h,v) from the outside of said two-dimensional grid;
(ii) means for dividing the two-dimensional grid of square cells into six groups of cells, wherein each group is $X_G/J_G$ cells in width and $Y_G/I_G$ cells in length, wherein:
(a) $I_G$ is 3;
(b) $J_G$ is 2; and
(c) each group of cells (i,j) ($om_{ij}$) is assigned a coordinate comprising a first number, i, and a second number, j, wherein i is a number from 1 to $I_G$ and j is a number from 1 to $J_G$, wherein $i = i' + 1$, and $j = j' + 1$, wherein:
i' is the number of said groups of cells, counted along said y-axis starting from the groups of cell that is most remote from said robot, which separate said group of cells from the outside of said two-dimensional grid; and
j' is the number of said groups of cells, counted along said x-axis starting from the left-most group of cells, which separate said group of cells (i,j) ($om_{ij}$) from the outside of said two-dimensional grid;
(iii) means for obtaining data points using sensor A and data points using sensor B, wherein each data point is the point in space at which electromagnetic or sound waves are reflected from a surface located within the rectangular cuboid volume bounded by the dimensions of said two-dimensional grid in the x-axis and y-axis and having a height of $Z_{max} - Z_{min}$ metres along a z-axis, wherein said z-axis is a vertical axis perpendicular to said x-axis and said y-axis, and said surface is the surface of an object, wherein:
$Z_{min}$ is a value selected from $-0.5$ to $0.5$ metres;
$Z_{max}$ is a value selected from 1 to 5 metres;
wherein:
(a) each data point obtained using sensor A is assigned a coordinate comprising a first number, $x^L$, and a second number, $y^L$ wherein:
$x^L$ is the distance along the x-axis from said data point to O; and
$y^L$ is the distance along the y-axis from said data point to O,
wherein the coordinate of position O is (0,0); and
(b) each data point obtained using sensor B is assigned a coordinate comprising a first number, $x^V$, and a second number, $y^V$ wherein:
$x^V$ is the distance along the x-axis from said data point to O; and
$y^V$ is the distance along the y-axis from said data point to O,
wherein the coordinate of position O is (0,0);
(iv) means for converting each data point into a discretized data point, wherein:
(a) data point ($x^L, y^L$) is converted to a discretized data point ($L_V, L_H$), according to the following formulae:

$L_V = \|y^L / C\|$; and $L_H = \|(x^L - X_{min})/C\|$;

(b) data point ($x^V, y^V$) is converted to a discretized data point ($V_V, V_H$) according to the following formulae:

$V_V = \|y^V / C\|$; and $V_H = \|(x^V - X_{min})/C\|$;

(v) means for calculating a fusion function value, Γ(h,v), for each cell (h,v) of said two-dimensional grid according to the following formula (1):

$$\Gamma(h,v) = K_V \gamma^V(V_V, V_H) + K_L \gamma^L(L_V, L_H) \quad (1)$$

wherein:
 $K_L$ is a non-negative integer selected from between 0 and 5;
 $\gamma^L(L_V, L_H)$ is a whole number calculated from the number $D_N(L_H, L_V)$ of discretized data points $(L_V, L_H)$ for which $L_V = v$ and $L_H = h$;
 $K_V$ is a non-negative integer selected from between 0 and 5;
 $\gamma^V(V_V, V_H)$ is a whole number calculated from the number $D_N(V_H, V_V)$ of discretized data points $(V_V, V_H)$ for which $V_V = v$ and $V_H = h$;
(vi) means for calculating for each group of cells (i,j) ($om_{ij}$):
 (a) the cumulative total of fusion function values, $CUM_{ij}(h)$, of all cells in said group of cells which have a coordinate with the same h value; and
 (b) the sum of all cumulative totals of fusion function values, $SUM_{ij}$, in said group of cells;
 wherein when:
  $SUM_{ij} \geq \|0.4 \cdot \overline{OM}\|$ said group of cells is classified as high-activated; and
  $SUM_{ij} \geq \|0.2 \cdot \overline{OM}\|$ and $< \|0.4 \cdot \overline{OM}\|$ said sub-volume is classified as low-activated,
   wherein OM is the maximum $SUM_{ij}$ value determined for any group of cells (i,j) ($om_{ij}$) in said two-dimensional grid;
(vii) means for moving the robot, wherein the robot moves:
 (a) through a plane defined by said y-axis and said x-axis towards a target point $P_t$ placed ahead of the robot, on the centerline parallel to the detected left row and separated from it by a distance Q/2:
  when out of the set $S_R$ consisting of the groups of cells (1,1), (2,1), (3,1) and (1,2):
   $om_{11}$ is high-activated, or
   $om_{11}$ is high-activated and $om_{21}$ is low-activated, or
   $om_{11}$ is low-activated and $om_{21}$ is high-activated, or
   $om_{21}$ is low-activated, or
   $om_{21}$ is low-activated and $om_{31}$ is low-activated, or
   $om_{31}$ is low-activated, or
   $om_{12}$ is low-activated and $om_{21}$ is high-activated,
   and no other group of cells in said set $S_R$ or the groups of cells (2,2) or (3,2) is activated; or
 (b) through a plane defined by said y-axis and said x-axis towards a target point $P_t$ placed ahead of the robot, on the centerline parallel to the detected right row and separated from it by a distance Q/2:
  when out of the set $S_L$ consisting of the groups of cells (1,2), (2,2), (3,2) and (1,1):
   $om_{12}$ is high-activated, or
   $om_{12}$ is high-activated and $om_{22}$ is low-activated, or
   $om_{12}$ is low-activated and $om_{22}$ is high-activated, or
   $om_{22}$ is low-activated, or
   $om_{22}$ is low-activated and $om_{32}$ is low-activated, or
   $om_{32}$ is low-activated, or
   $om_{11}$ is low-activated, $om_{22}$ is high-activated,
   and no other group of cells in said set $S_L$ or the groups of cells (2,1) or (3,1) is activated; or
 (c) through a plane defined by said y-axis and said x-axis towards a target point $P_t$ placed ahead of the robot, on the centerline equidistant to both detected rows:
  when out of the set $S_R$ consisting of the groups of cells (1,1), (2,1), (3,1) and (1,2):
   $om_{11}$ is high-activated, or
   $om_{11}$ is high-activated and $om_{21}$ is low-activated, or
   $om_{11}$ is low-activated and $om_{21}$ is high-activated, or
   $om_{21}$ is low-activated, or
   $om_{21}$ is low-activated and $om_{31}$ is low-activated, or
   $om_{31}$ is low-activated, or
   $om_{12}$ is low-activated and $om_{21}$ is high-activated,
   and no other group of cells in said set $S_R$ or the groups of cells (2,2) or (3,2) is activated; and
  when out of the set $S_L$ consisting of the groups of cells (1,2), (2,2), (3,2) and (1,1):
   $om_{12}$ is high-activated, or
   $om_{12}$ is high-activated and $om_{22}$ is low-activated, or
   $om_{12}$ is low-activated and $om_{22}$ is high-activated, or
   $om_{22}$ is low-activated, or
   $om_{22}$ is low-activated and $om_{32}$ is low-activated, or
   $om_{32}$ is low-activated, or
   $om_{11}$ is low-activated, $om_{22}$ is high-activated,
   and no other group of cells in said set $S_L$ or the groups of cells (2,1) or (3,1) is activated.

8. The system according to claim 7, wherein (vi) also comprises means for calculating for each group of cells (i,j) ($om_{ij}$) for which $SUM_{ij}$ 1, an expected row position value, $L_{ij}$, according to the following formula (2):

$$L_{ij} = \|X_G / J_G - M_{ij} / SUM_{ij}\| \quad (2)$$

wherein $M_{ij}$ is the sum of t values of all cells in said group of cells which have a coordinate with the same h value, wherein said t values are calculated according to the following formula (3):

$$t = (\|X_G / J_G\| - h) \cdot CUM_{ij}(h) \quad (3)$$

wherein:
(a) when the robot moves through a plane defined by said y-axis and said x-axis by turning towards the target point $P_t$ which is Q/2 metres to the right of row boundary $RB_L$ at a look-ahead distance of $Y_{max} \cdot r$ metres from O, wherein:
 $RB_L$ is the weighted average $L_{ij}$ of the groups of cells (i,j) which have a coordinate with the j value of 1; and
 r is between 0.5 and 0.9;
(b) when the robot moves through a plane defined by said y-axis and said x-axis by turning towards the target point $P_t$ which is Q/2 metres to the left of row boundary $RB_R$ at a look-ahead distance of $Y_{max} \cdot r$ metres from O, wherein:
 $RB_R$ is the weighted average $L_{ij}$ of the groups of cells (i,j) which have a coordinate with the j value of 2;
(c) when the robot moves through a plane defined by said y-axis and said x-axis by turning towards the target point $P_t$ which is placed equidistant between $RB_L$ and $RB_R$.

9. The system according to claim 7, wherein sensor A is a multi-beam lidar and sensor B is a stereoscopic or time-of-flight 3D camera.

10. The system according claim 9, wherein:
(a) $\gamma^L(L_V,L_H)$ is the whole number $D_N(L_H,L_V)$ of discretized data points $(L_V,L_H)$ for which $L_V=v$ and $L_H=h$; and
(b) $\gamma^V(V_V,V_H)$ is:
1 when $D_N(V_H,V_V) > TH_V \, D_N(V_H,V_V)max$; or
0 when $D_N(V_H,V_V) \leq TH_V \, D_N(V_H,V_V)max$
wherein $D_N(V_H,V_V)$ is:
the whole number of discretized data points $(V_V,V_H)$ when $V_{V \cdot C} \leq 3$; or
a whole number calculated from the number of discretized data points $(V_V,V_H)$ for which $V_V=v$, $V_H=h$ and $V_{V \cdot C} > 3$, multiplied by $(V_{V \cdot C}/3)^2$;
and wherein:
$TH_V$ is a threshold value, wherein $0 \leq TH_V \leq 1$; and
$D_N(V_H,V_V)max$ is the maximum value of $D_N(V_H,V_V)$ determined for any cell (h,v) in said two-dimensional grid.

11. The system according to claim 7, wherein the robot additionally comprises a sonar sensor mounted at the position O thereon for safeguarding against collisions, which obtains a front range and/or a rear range wherein:
(a) each front range is the point in space at which sound is reflected from a surface located to the front of said robot within a spherical sector of radius $|X_{max}|$ metres having a cone angle of less than 45° centred along the y-axis, and wherein $F_S'$ is the distance along the y-axis from said range to O; and
(b) each rear range is the point in space at which sound is reflected from a surface located to the back of said robot within a spherical sector of radius $|X_{max}|$ metres having a cone angle of less than 45° centred along the y-axis, and wherein $B_S'$ is the distance along the y-axis from said range to O, and said method additionally comprises determining $F_S$ and $B_S$, wherein $F_S$ is the minimum $F_S'$, and $B_S$ is the minimum $B_S'$, and the robot stops moving forward when $F_S$ is $<F_{TH}$; or
the robot stops moving backward when $B_S$ is $<B_{TH}$,
wherein:
$F_{TH}=F_{TH}'+e$, wherein $F_{TH}'$ is a value selected from between 0.1 and 1 metres and e is the distance from position O to the front of the robot along the y axis; and
$B_{TH}=B_{TH}'+e'$, wherein $B_{TH}'$ is a value selected from between 0.1 and 1 metres and e' is the distance from position O to the back of the robot along the y axis.

12. The system according to claim 7, wherein:
(a) the means for:
defining the two-dimensional grid of square cells;
dividing the two-dimensional grid of square cells into six groups of cells;
converting each data point into a discretized data point; and
calculating $\Gamma(h,v)$, $\gamma^L(L_V,L_H)$, $\gamma^V(V_V,V_H)$, $CUM_{ij}(h)$ and $SUM_{ij}$,
comprise a computer program product;
(b) the means for obtaining a maximum of k data points comprises sensor A and the means for obtaining m data points comprises sensor B;
(c) the means for moving the robot comprise a motor.

13. A robot for navigating between two rows of plants comprising the system according to claim 7.

* * * * *